(12) United States Patent
Roberts et al.

(10) Patent No.: US 9,699,856 B2
(45) Date of Patent: Jul. 4, 2017

(54) UPGRADEABLE LIGHTING FIXTURE

(71) Applicant: Cree, Inc., Durham, NC (US)

(72) Inventors: John Roberts, Durham, NC (US);
James Michael Lay, Apex, NC (US);
Michael James Harris, Cary, NC (US);
Randy Bernard, Cary, NC (US);
Nathan R. Snell, Raleigh, NC (US);
Ethan Creasman, Morrisville, NC (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 14/874,099

(22) Filed: Oct. 2, 2015

(65) Prior Publication Data

US 2016/0286619 A1     Sep. 29, 2016

Related U.S. Application Data

(60) Provisional application No. 62/138,209, filed on Mar. 25, 2015.

(51) Int. Cl.

| H05B 33/08 | (2006.01) |
|---|---|
| F21S 8/02 | (2006.01) |
| F21V 5/04 | (2006.01) |
| H05B 37/02 | (2006.01) |
| F21V 3/02 | (2006.01) |
| F21V 23/04 | (2006.01) |
| F21Y 103/10 | (2016.01) |
| F21Y 115/10 | (2016.01) |

(52) U.S. Cl.
CPC ......... *H05B 33/0854* (2013.01); *F21S 8/026* (2013.01); *F21V 3/02* (2013.01); *F21V 5/04* (2013.01); *F21V 23/0442* (2013.01); *H05B 33/0803* (2013.01); *H05B 33/0827* (2013.01); *H05B 37/0218* (2013.01); *H05B 37/0227* (2013.01); *H05B 37/0272* (2013.01); *F21Y 2103/10* (2016.08); *F21Y 2115/10* (2016.08); *Y02B 20/42* (2013.01)

(58) Field of Classification Search
CPC ............ H05B 33/0854; H05B 37/0218; H05B 37/0227; H05B 37/0272; F21S 8/026; F21V 5/04; F21Y 2101/02; F21Y 2103/003
USPC ....................................................... 315/307
See application file for complete search history.

(56) References Cited

U.S. PATENT DOCUMENTS

| 8,829,800 B2 | 9/2014 | Harris |
| 9,022,601 B2 | 5/2015 | Lu et al. |

(Continued)

*Primary Examiner* — Daniel D Chang
(74) *Attorney, Agent, or Firm* — Withrow & Terranova, P.L.L.C.

(57) ABSTRACT

A lighting fixture includes an outer frame, a solid-state light source, a lens, and a sensor module connector. Driver circuitry is coupled to the outer frame and provides one or more drive signals for powering the light source. The lens is supported by and attached to the outer frame. The solid-state light source is mounted to the outer frame and at least partially surrounded by the lens, such that at least a portion of the light provided by the solid-state light source is transmitted through the lens towards an area of interest. The sensor module connector is mounted to the outer frame and configured to accept a connector from a sensor module such that when the sensor module is installed in the lighting fixture, a surface of the sensor module faces the area of interest towards which light from the solid-state light source is provided.

17 Claims, 37 Drawing Sheets

(56) References Cited

U.S. PATENT DOCUMENTS

| | | |
|---|---|---|
| 2012/0018129 A1 | 1/2012 | Ushijima et al. |
| 2013/0265772 A1 | 10/2013 | Lu et al. |
| 2014/0001962 A1 | 1/2014 | Harris |
| 2014/0070710 A1 | 3/2014 | Harris |
| 2014/0268790 A1* | 9/2014 | Chobot ............... F21V 23/0464 362/276 |
| 2015/0351187 A1* | 12/2015 | McBryde ........... H05B 33/0857 315/185 R |
| 2016/0047537 A1* | 2/2016 | Stolte ................. F21V 23/0435 362/276 |

\* cited by examiner

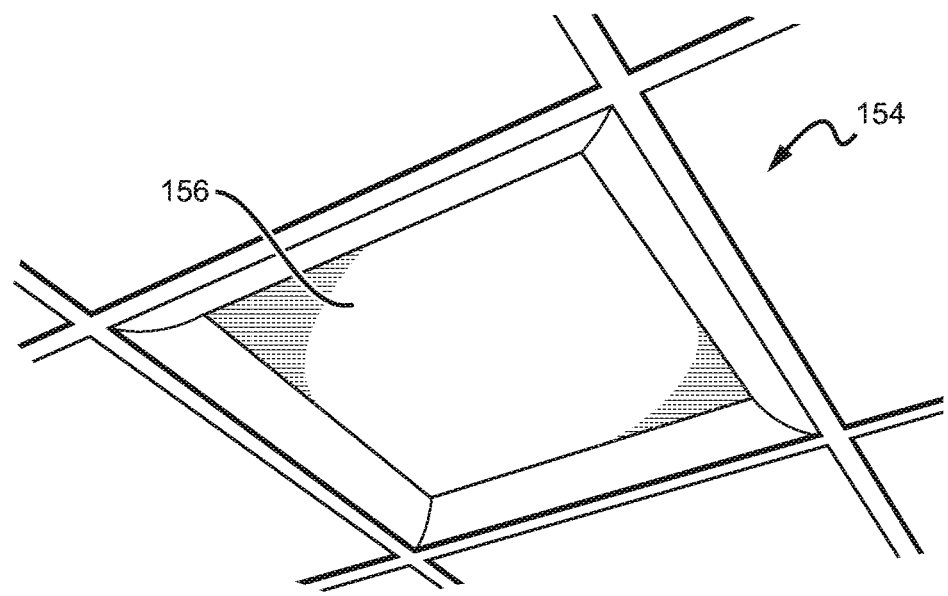
FIG. 21
FIG. 22
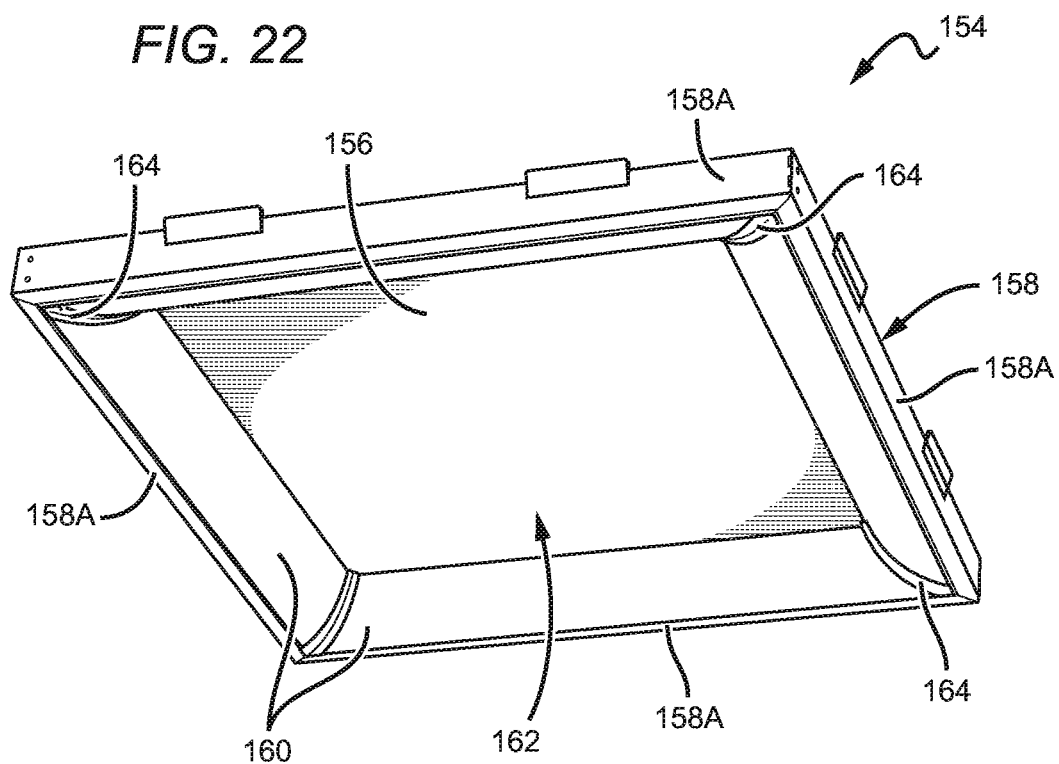

UPGRADEABLE LIGHTING FIXTURE

RELATED APPLICATIONS

This application claims the benefit of provisional patent application Ser. No. 62/138,209, filed Mar. 25, 2015, the disclosure of which is hereby incorporated herein by reference in its entirety.

FIELD OF THE DISCLOSURE

The present disclosure relates to lighting fixtures, and in particular to lighting fixtures including one or more supplemental sensor modules that add functionality to the lighting fixture.

BACKGROUND

In recent years, a movement has gained traction to replace incandescent light bulbs with lighting fixtures that employ more efficient lighting technologies as well as to replace relatively efficient fluorescent lighting fixtures with lighting technologies that produce a more pleasing, natural light. One such technology that shows tremendous promise employs light emitting diodes (LEDs). Compared with incandescent bulbs, LED-based light fixtures are much more efficient at converting electrical energy into light, are longer lasting, and are also capable of producing light that is very natural. Compared with fluorescent lighting, LED-based fixtures are also very efficient, but are capable of producing light that is much more natural and more capable of accurately rendering colors. As a result, lighting fixtures that employ LED technologies are replacing incandescent and fluorescent bulbs in residential, commercial, and industrial applications.

Unlike incandescent bulbs that operate by subjecting a filament to a desired current, LED-based lighting fixtures require electronics to drive one or more LEDs. The electronics generally include a power supply and special control circuitry to provide uniquely configured signals that are required to drive the one or more LEDs in a desired fashion. The presence of the control circuitry adds a potentially significant level of intelligence to the lighting fixtures that can be leveraged to employ various types of lighting control. Such lighting control may be based on various environmental conditions, such as ambient light, occupancy, temperature, and the like.

SUMMARY

The present disclosure relates to lighting fixtures including one or more supplemental sensor modules that add functionality to the lighting fixture. In one embodiment, a lighting fixture includes an outer frame, a solid-state light source, a lens, and a sensor module connector. Driver circuitry is coupled to the outer frame and provides one or more drive signals for powering the light source. The lens is supported by and attached to the outer frame. The solid-state light source is mounted to the outer frame and at least partially surrounded by the lens, such that at least a portion of the light provided by the solid-state light source is transmitted through the lens towards an area of interest. Further, the solid-state light source provides light based on the one or more drive signals from the driver circuitry. The sensor module connector is mounted to the outer frame and configured to accept a connector from a sensor module in order to provide additional functionality to the lighting fixture. Specifically, the sensor module connector may be located such that when the sensor module is installed in the lighting fixture, a surface of the sensor module faces the area of interest towards which light from the solid-state light source is provided.

The sensor module for the lighting fixture may include a communications module, one or more sensors, and a connector. The communications module may provide wired and/or wireless communications capability for the lighting fixture. The one or more sensors may provide feedback to the lighting fixture that is used to adjust the light emitted from a light source therein. The one or more sensors may include an imaging sensor such as a camera, an ambient light sensor, an occupancy sensor, a microphone, a temperature and/or humidity sensor, a barometric pressure sensor, a vibration sensor, or the like. The sensor module may visually blend with the lens such that an outer surface of the sensor module is contoured to an outer surface of the lens and/or the outer frame. The connector on the sensor module may mate with the sensor module connector in order to interface with the driver circuitry and provide additional functionality to the lighting fixture. Using the sensor module with the lighting fixture may allow the core components of the lighting fixture to be retained while adding additional functionality to the lighting fixture as it is developed, resulting in cost savings and environmental benefits.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 21 illustrates a lighting fixture according to one embodiment of the present disclosure.

FIG. 22 illustrates a lighting fixture according to one embodiment of the present disclosure.

DETAILED DESCRIPTION

Figure 1A:
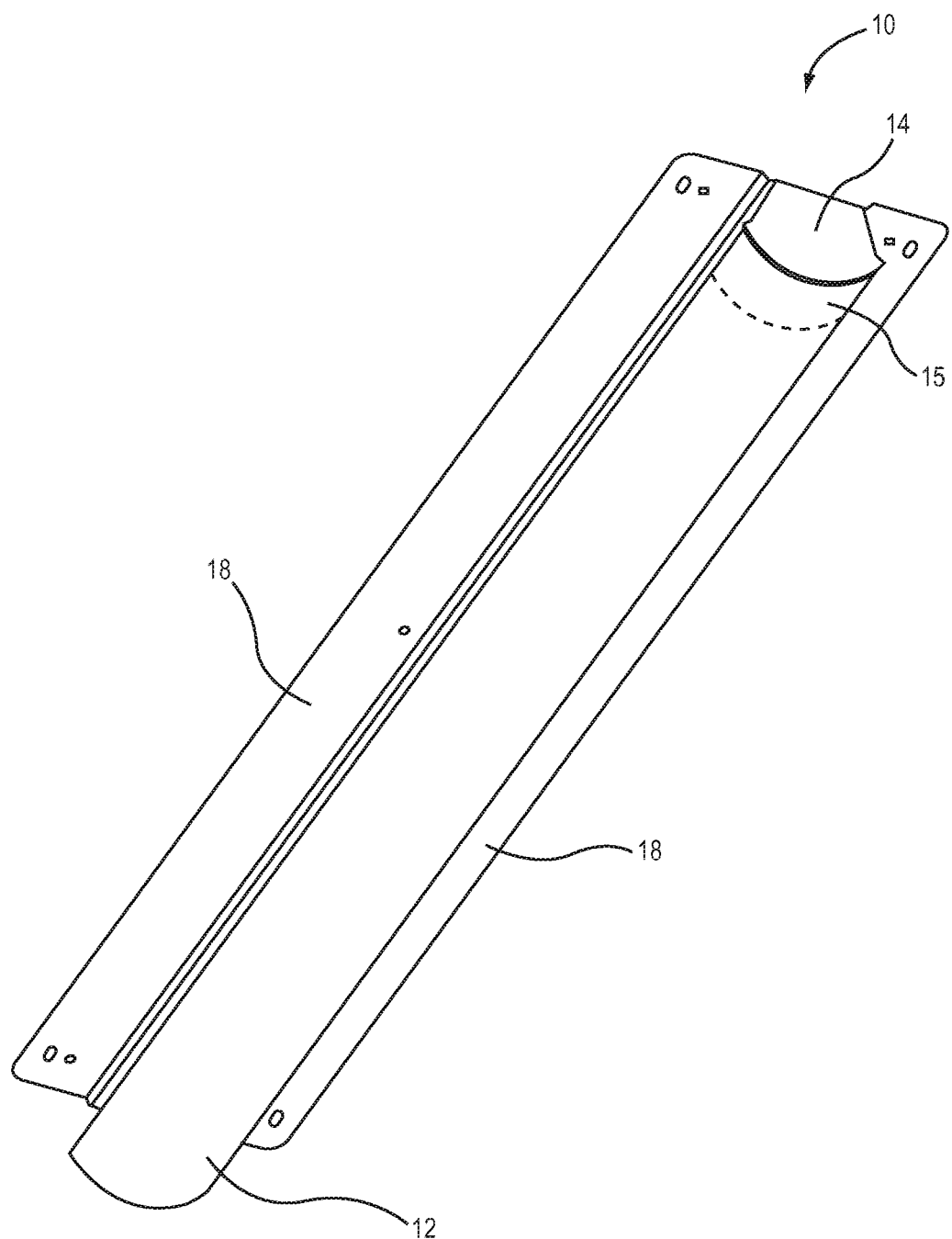
FIGS. 1A through 1C illustrate a lighting fixture according to one embodiment of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Prior to delving into the details of the present disclosure, an overview of an exemplary lighting fixture is provided. While the concepts of the present disclosure may be employed in any type of lighting system, the immediately following description describes these concepts in a ceiling-mount lighting fixture, such as the lighting fixture 10 illustrated in FIGS. 1A-3B. This particular lighting fixture is substantially similar to the LS series of lighting fixtures sold by Cree, Inc. of Durham, N.C.

While the disclosed lighting fixture 10 employs a direct lighting configuration wherein light is emitted directly down through a lens 12, indirect lighting fixtures may also take advantage of the concepts of the present disclosure. In addition to ceiling-mount lighting fixtures, the concepts of the present disclosure may also be employed in recessed lighting configurations, wall mount lighting configurations, outdoor lighting configurations, and the like. Further, the functionality and control techniques described below may be used to control different types of lighting fixtures, as well as different groups of the same or different types of lighting fixtures at the same time.

Figure 1B:
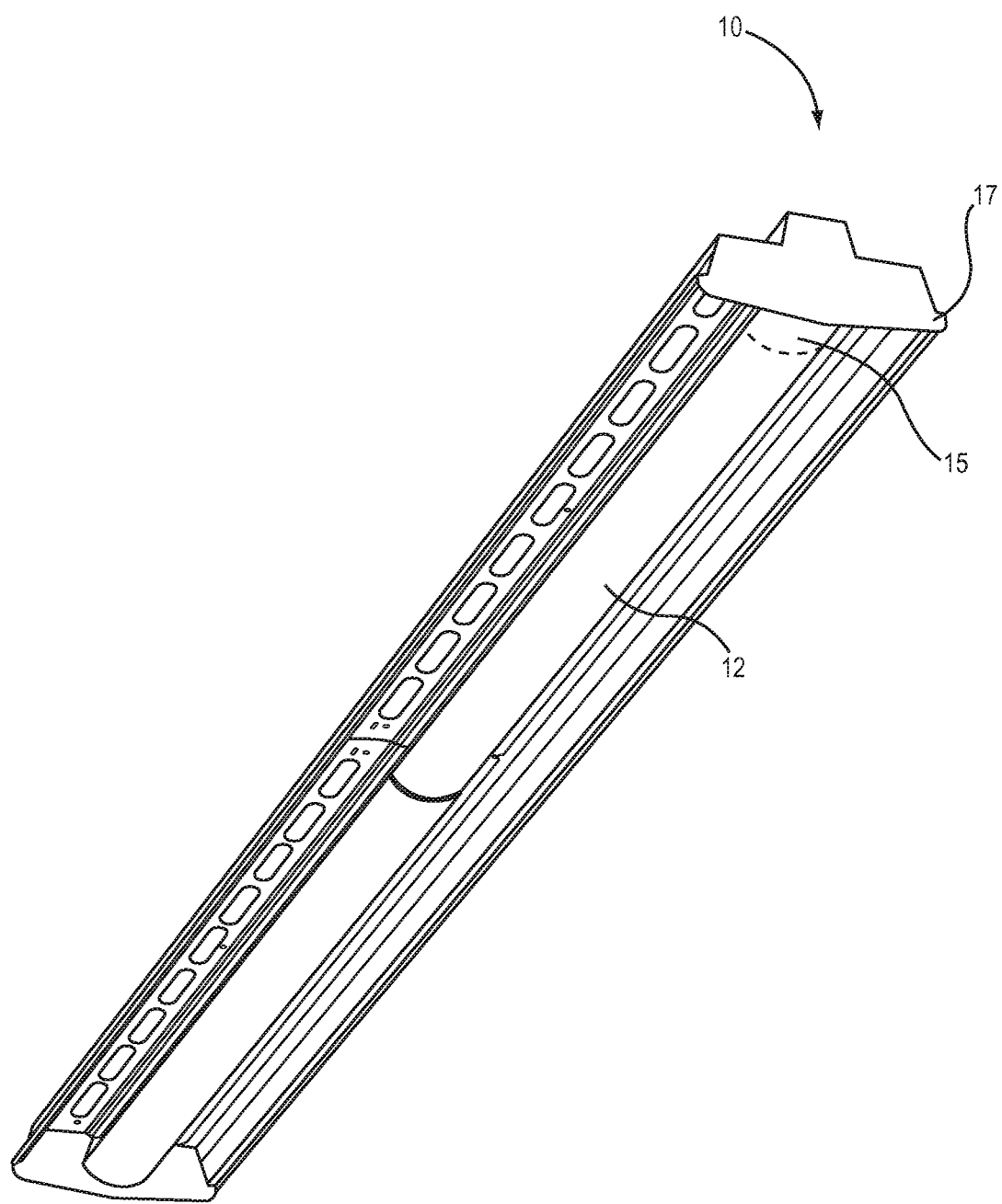

In general, ceiling-mount lighting fixtures, such as the lighting fixture 10, are designed to mount on or hang from a ceiling. As illustrated in FIGS. 1A-3B, the lighting fixture 10 includes the lens 12 and a square or rectangular outer frame 14. The lens 12 is coupled to and extends between opposite sides of the outer frame 14, and may be substantially arc-shaped, such that an outer surface of the lighting fixture 10 appears as a half-circle. Further, the lens 12 may include a sensor module cover 15, which is a portion of the lens 12 that is removable in order to provide access to a sensor module connector 16 and space for a sensor module (not shown) to be connected to the lighting fixture 10. The outer frame 14 may optionally be surrounded by a shroud 17, which gives the light a troffer-style appearance and may provide additional mounting options for the lighting fixture 10, as shown in FIG. 1B. Further, the outer frame 14 may include a number of flat mounting surfaces 18, which extend outwards and include one or more mounting holes for mounting the lighting fixture 10, for example, to a ceiling.

Figure 1C:
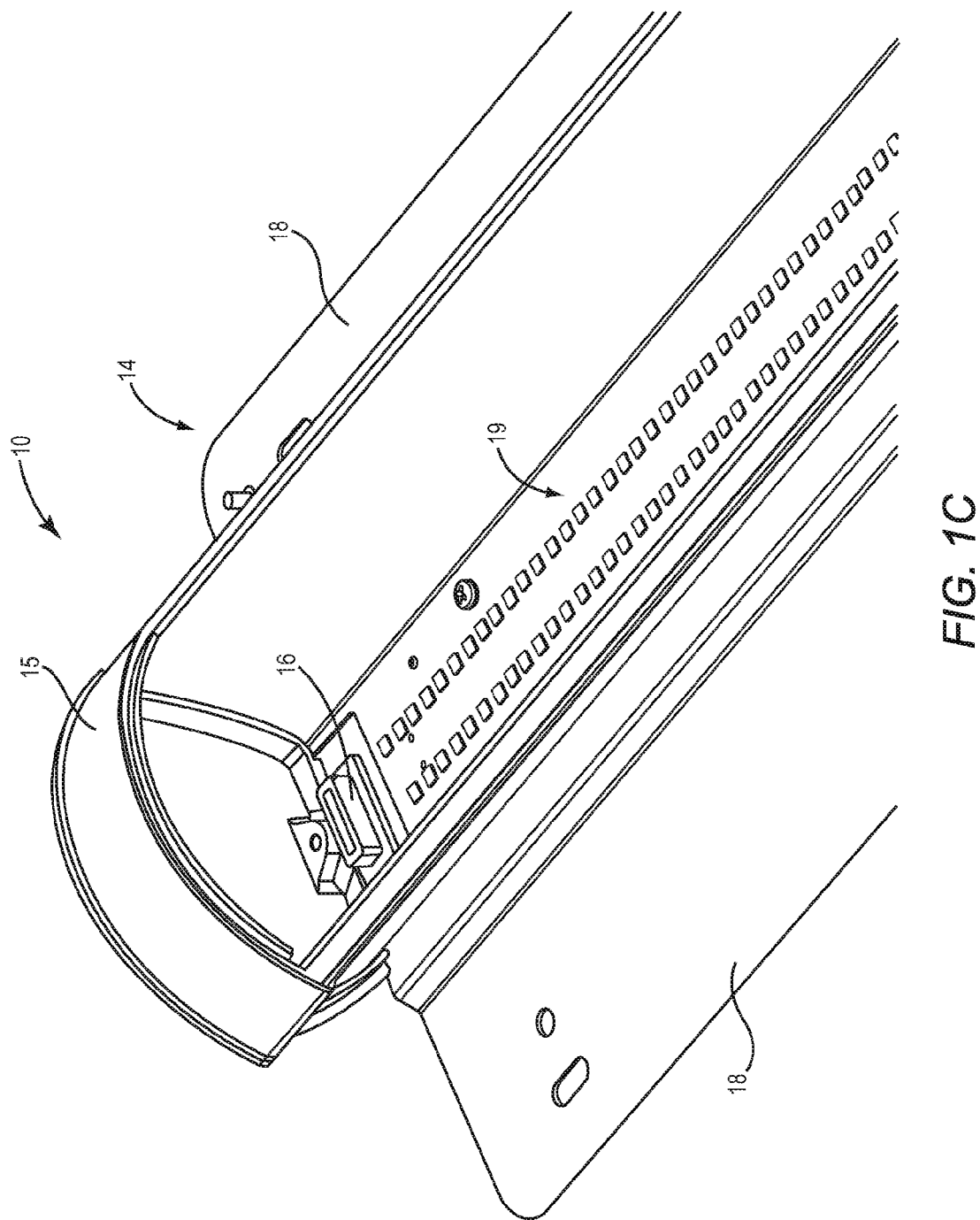

FIG. 1C shows details of an LED array 19 mounted to the outer frame 14 and directed at the lens 12, which is not shown. The LED array 19 includes a number of LEDs, which may be mounted in any number of patterns to produce a desired device density and thus provide a desired amount of light. A sensor module connector 16 is also shown coupled to the outer frame 14, and may be configured to mate with a connector of a sensor module (not shown), as discussed in detail below. The sensor module cover 15 covers the sensor module connector 16 and blends with the visual appearance of the outer surface of the lighting fixture 10.

Figure 2A:
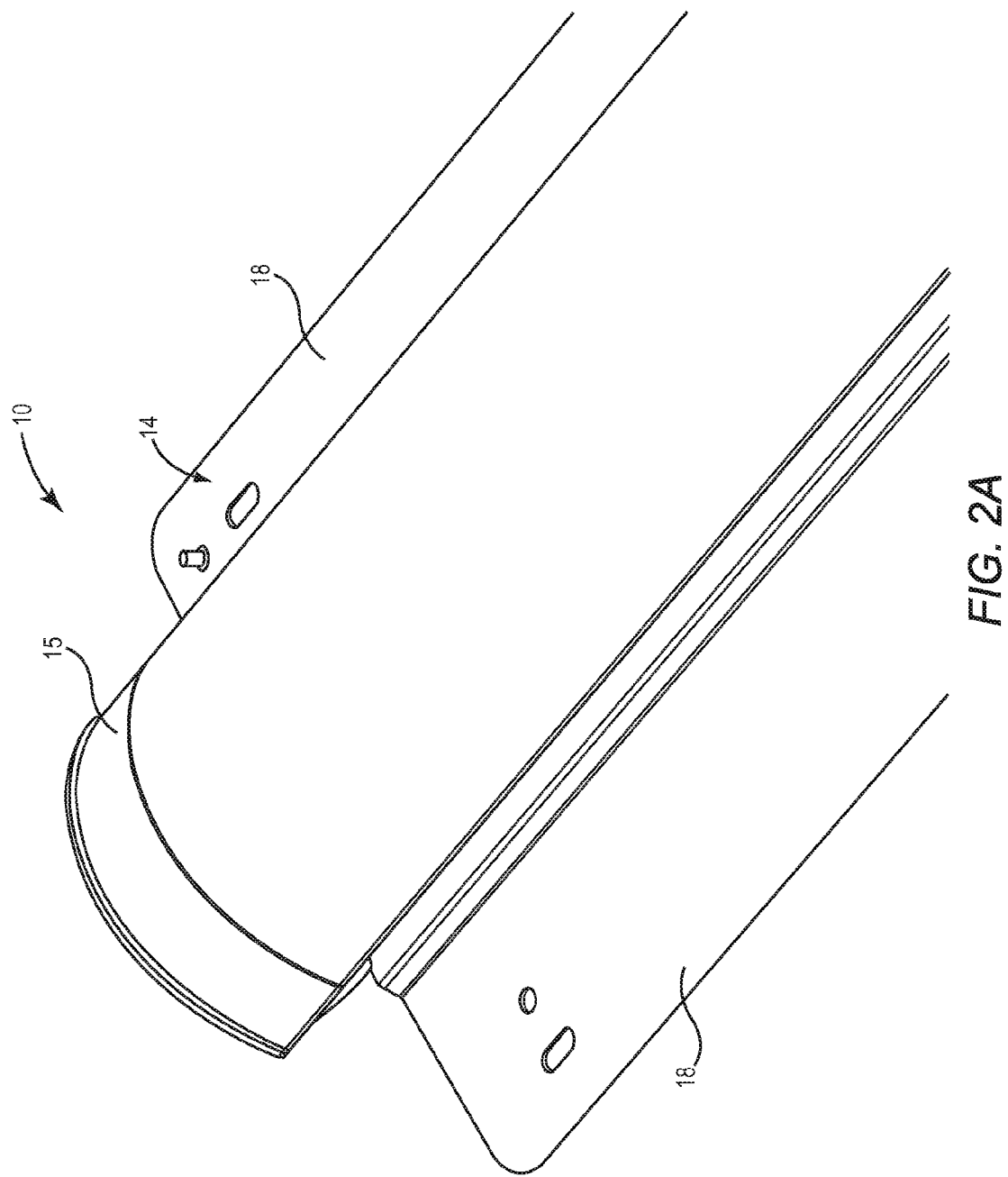
FIGS. 2A and 2B illustrate details of the lighting fixture shown in FIG. 1 according to one embodiment of the present disclosure.
Figure 2B:
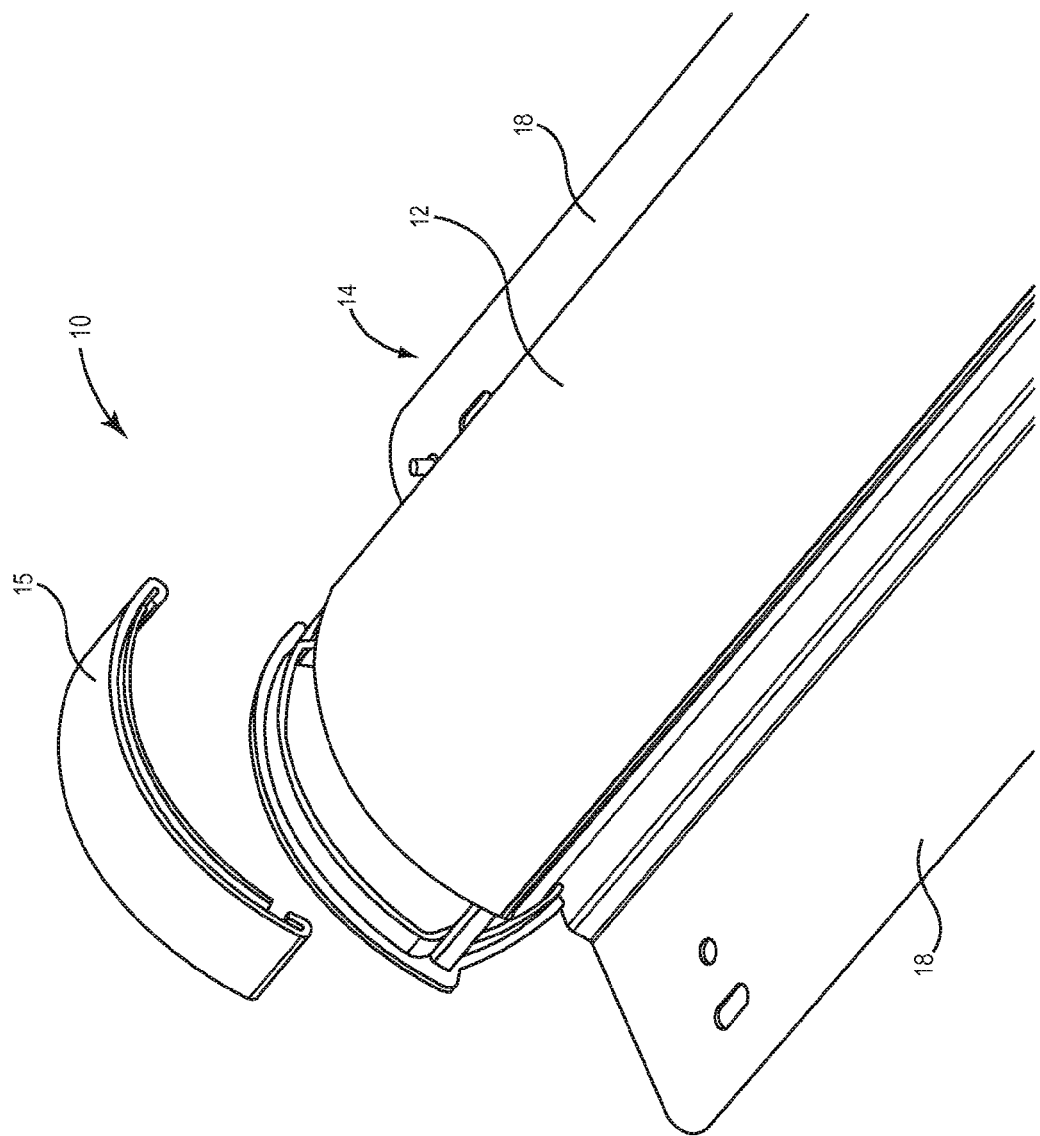

Turning now to FIGS. 2A and 2B in particular, the sensor module cover 15 is shown coupled to the outer frame 14 in FIG. 2A and separated from the outer frame 14 in FIG. 2B.

When the sensor module cover 15 is coupled to the outer frame 14, the sensor module cover 15 blends in with the lens 12 and thus may conceal one or more internal components of the lighting fixture 10 that are located behind the lens 12, such as the led array 19, which is configured to emit light towards the lens 12. The sensor module cover 15 may be the same or a substantially similar material to that of the lens 12 such that the sensor module cover 15 is practically indistinguishable from the lens 12 when coupled to the outer frame 14. The lens 12 may diffuse the light from the LED array 19 in order to evenly distribute the light provided from the lighting fixture 10. Those of ordinary skill in the art will recognize that the type of lens 12, the type of LEDs in the led array 19, and the shape of the lens 12, among other variables, will affect the quantity and quality of light emitted by the lighting fixture 10. As will be discussed in greater detail below, the LED array 19 may include LEDs of different colors, wherein the light emitted from the various LEDs mixes together to from a white light having a desired characteristic, such as spectral content (color or color temperature), color rendering index (CRI), output level, and the like based on the design parameters for the particular embodiment, environmental conditions, or the like.

Figure 3A:
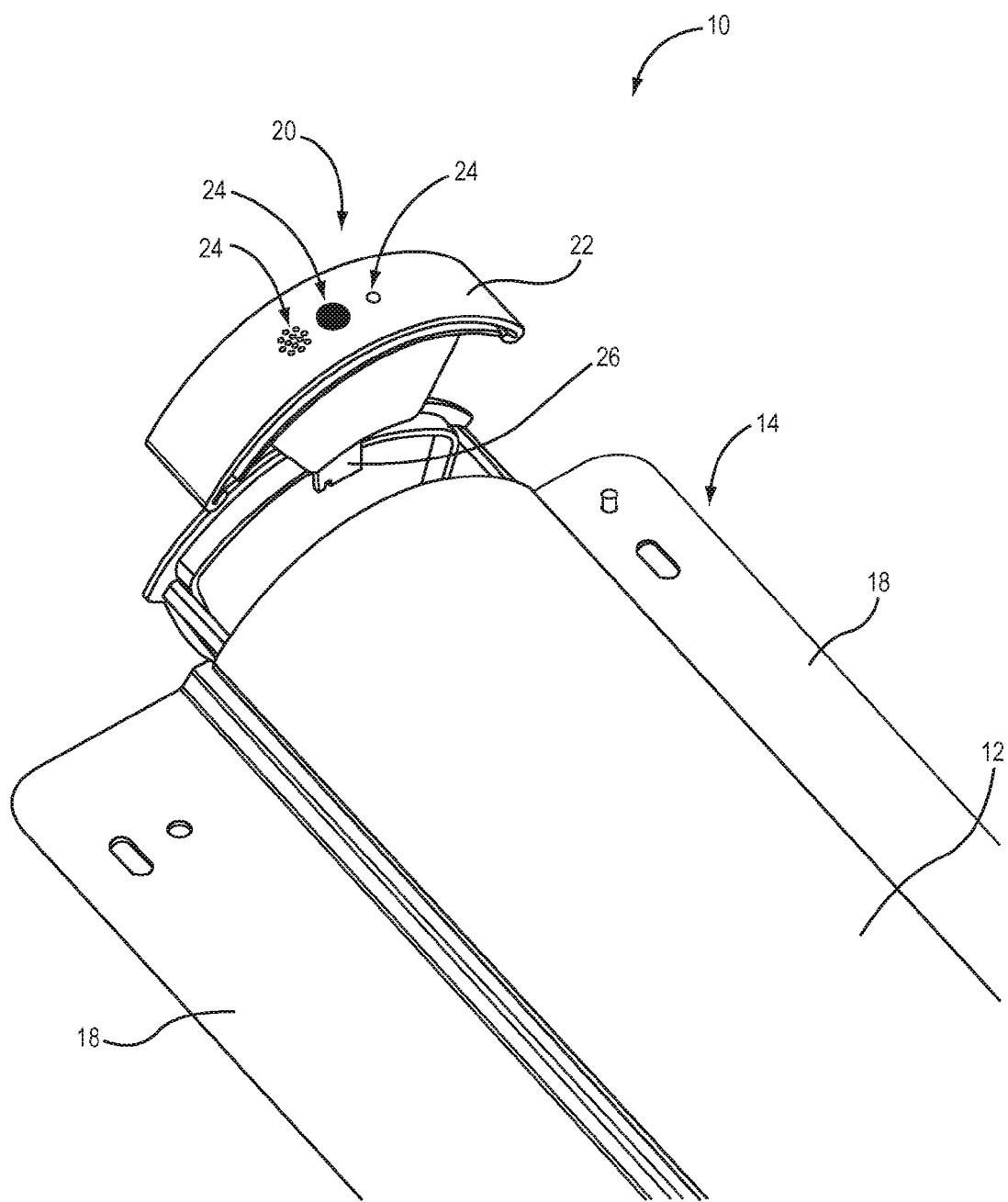
FIGS. 3A through 3C illustrate details of the lighting fixture shown in FIG. 1 further including a sensor module according to one embodiment of the present disclosure.
Figure 3B:
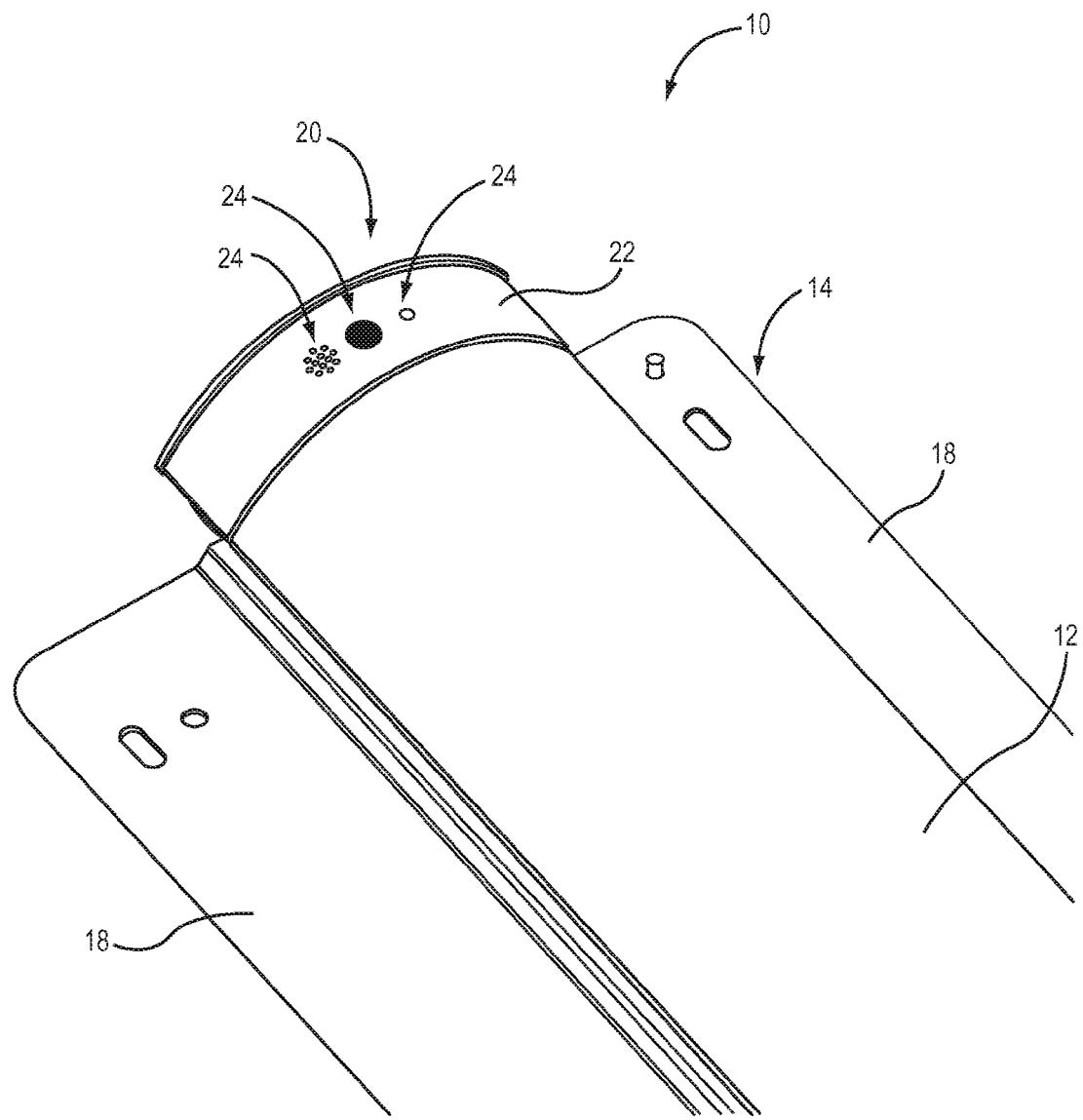
Figure 3C:
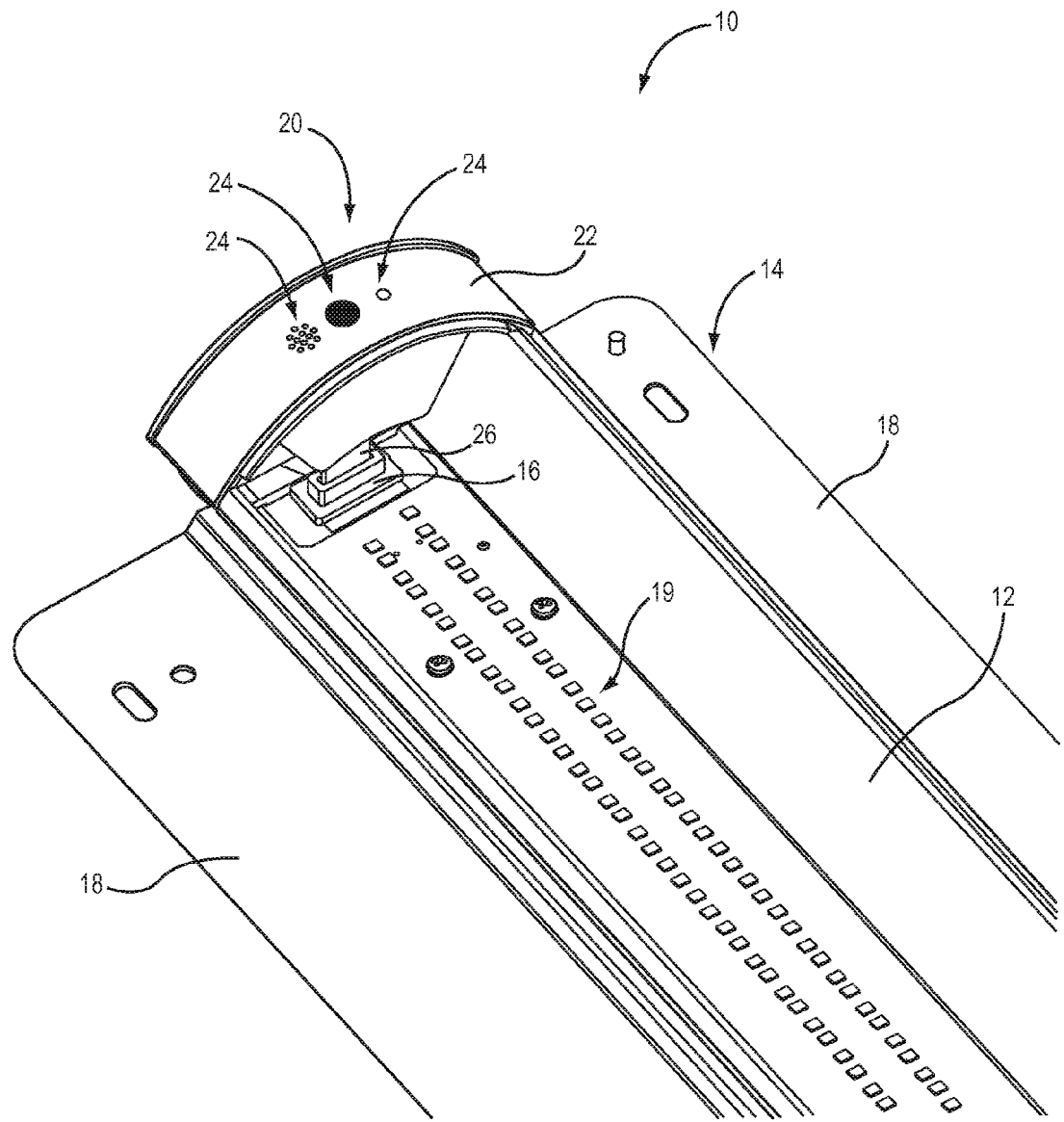

With reference to FIGS. 3A-3C, a sensor module 20 is shown separated from the lighting fixture 10 in FIG. 3A and coupled to the lighting fixture 10 in FIGS. 3B and 3C. The sensor module 20 includes a module housing 22, which is shaped in substantially the same manner as an outer surface of the lens 12 such that when the sensor module 20 is coupled to the lighting fixture 10, the outer surface of the lighting fixture 10 that is viewable by an observer appears substantially uniform. The module housing 22 includes a number of openings 24, which provide access to the surrounding environment for one or more sensors (not shown) and or one or more visual indicators (e.g., an LED light indicator) in the sensor module 20. Notably, the particular number and pattern of the openings 24 may vary in different embodiments as required by the particular sensors in the sensor module 20. Further, the openings 24 may be sized and/or otherwise configured to accept one or more lenses or protective covers, which may focus and/or filter light or any other environmental variable as required by a particular sensor in the sensor module 20. The sensor module 20 also includes a connector 26, which is configured to mate with the sensor module connector 16 on the lighting fixture 10 such that the internal components of the sensor module 20 can interface with a driver module (not shown) in the lighting fixture 10 and receive power therefrom as shown in FIG. 3C.

Figure 4:
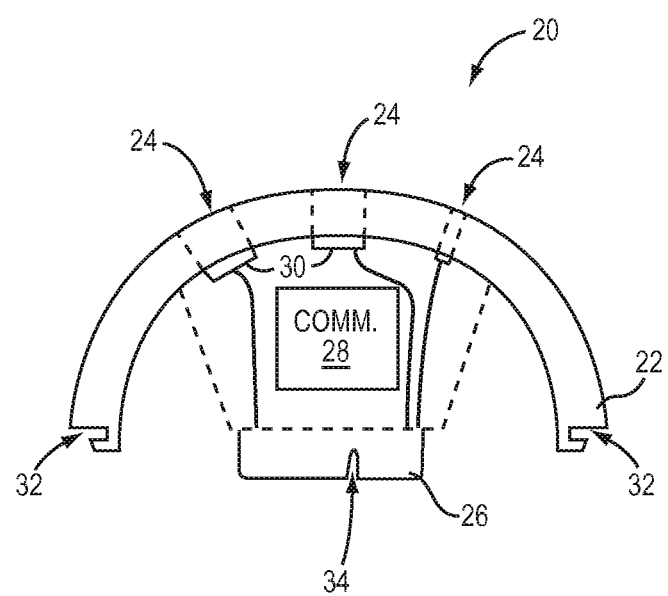
FIG. 4 illustrates a cross-section of a sensor module according to one embodiment of the present disclosure.

FIG. 4 is a cross-sectional view of the sensor module 20 according to one embodiment of the present disclosure. As shown in FIG. 4, the sensor module 20 includes the module housing 22, which provides support for the connector 26, communications circuitry 28, and one or more sensors 30. The communications circuitry 28 and the sensors 30 may be coupled to the connector 26 such that the communications circuitry 28 and the sensors 30 receive power from the connector and communicate with external circuitry, such as a driver module in the lighting fixture 10, via the connector 26. As discussed above, an outer surface of the module housing 22 may be arc-shaped such that the outer surface forms a half-circle, which corresponds with the shape of the lens 12 on the lighting fixture 10. Further, the module housing 22 may include a number of mounting notches 32, which are configured to mate with a corresponding mounting lip on the outer frame 14 in order to secure the sensor module 20 to the lighting fixture 10. The connector 26 may include an orientation notch 34, which is offset from the center of the sensor module 20 and corresponds with an orientation lip in a connector within the lighting fixture 10 such that the sensor module 20 is only capable of mating with the lighting fixture 10 in a single orientation. While the connector 26 is shown in FIG. 4, any other suitable means may be used to connect the sensor module 20 to the lighting fixture 10 without departing from the principles of the present disclosure. For example, a cable may be used to connect the sensor module 20 to the lighting fixture 10 without departing from the principles of the present disclosure.

Figure 5:
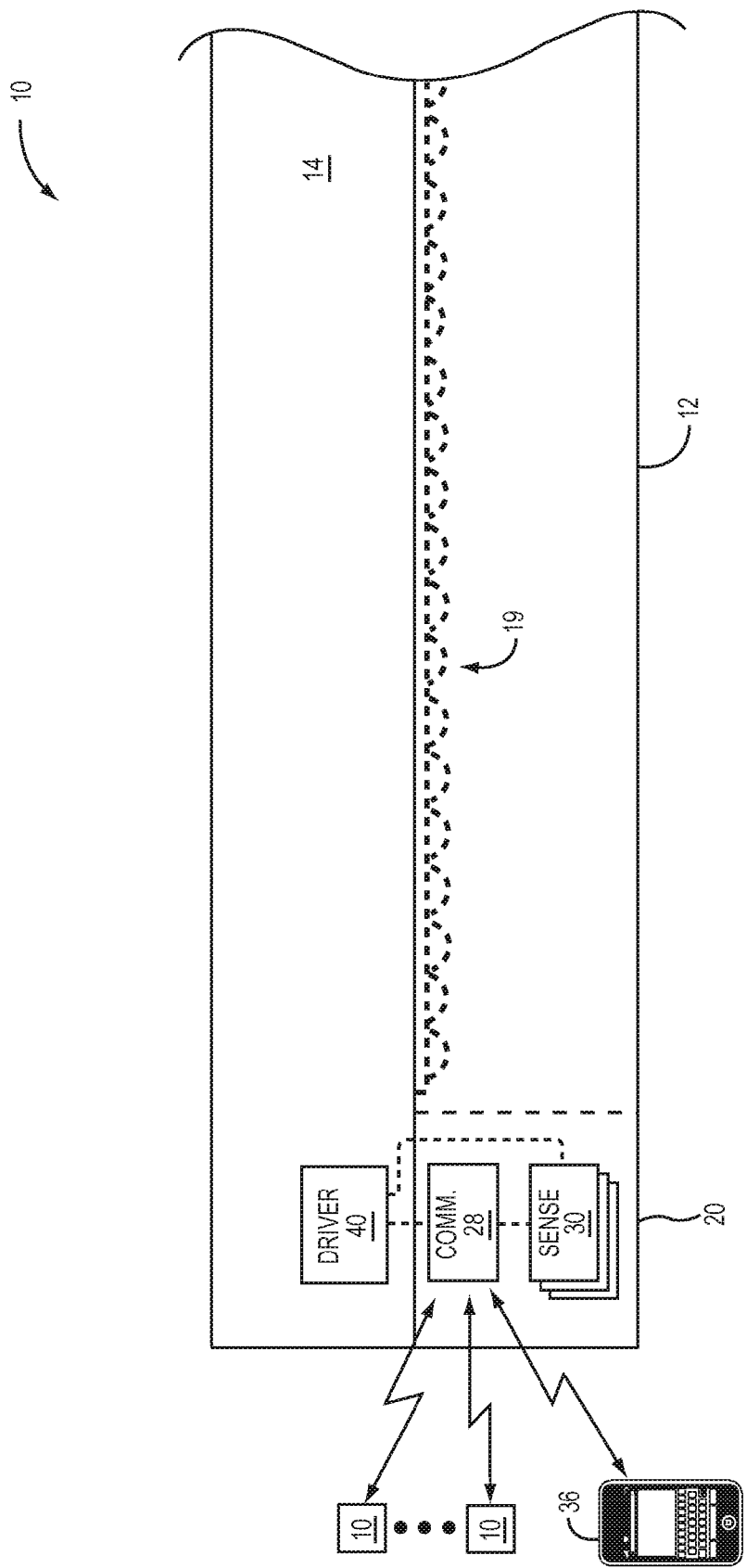
FIG. 5 illustrates a cross-section of the lighting fixture shown in FIG. 1 and including the sensor module according to one embodiment of the present disclosure.

FIG. 5 is a cross-section of the lighting fixture 10 according to one embodiment of the present disclosure. The lighting fixture 10 includes the lens 12, the outer frame 14, the LED array 19, and the sensor module 20. Further, driver circuitry 40 is shown located in the outer frame 14 of the lighting fixture 10 and coupled to the communications circuitry 28 and the one or more sensors 30 within the sensor module 20 via the connector (not shown). The communications circuitry 28 may allow the lighting fixture 10 to communicate with one or more additional lighting fixtures 10 and/or one or more mobile devices 36, such as a mobile phone, via a wired and/or wireless connection. The one or more sensors 30 may include an image sensor such as a camera, an ambient light sensor, an occupancy sensor, a microphone, a temperature and/or humidity sensor, a barometric pressure sensor, a vibration sensor, or the like. The particular sensors used in the sensor module 20 may depend on the particular lighting fixture 10 in which the sensor module 20 is to be used, the environment in which the lighting fixture 10 is deployed, or any number of other design factors. In some embodiments, an imaging sensor in the sensor module 20 may be used to perform several sensing functions such as ambient light sensing, occupancy sensing, and the like, as discussed in detail below.

In particular, the communications circuitry 28 may enable the lighting fixture 10 to join a wired and/or wireless communications network including multiple lighting fixtures, sensors, or other devices such as a SmartCast® network created by Cree, Inc. of Durham, N.C. Details of wired and/or wireless communications network that may be used along with the principles of the present disclosure are detailed in U.S. patent application Ser. No. 13/782,068, now U.S. Pat. No. 9,433,061, the contents of which are hereby incorporated by reference in their entirety.

Notably, any desired functionality may be placed into the sensor module 20 without departing from the principles of the present disclosure. For example, varying forms of the communication circuitry 28, any number of sensors 30, and any type of processors or other devices may be provided in the sensor module 20 and interfaced with the lighting fixture 10. Accordingly, the core components of the lighting fixture 10 may be kept over time while upgrading the functionality of the lighting fixture 10 via the sensor module 20, which may save cost and prevent the need for complete replacement of one or more lighting fixtures when new functionality is desired.

Figure 6:
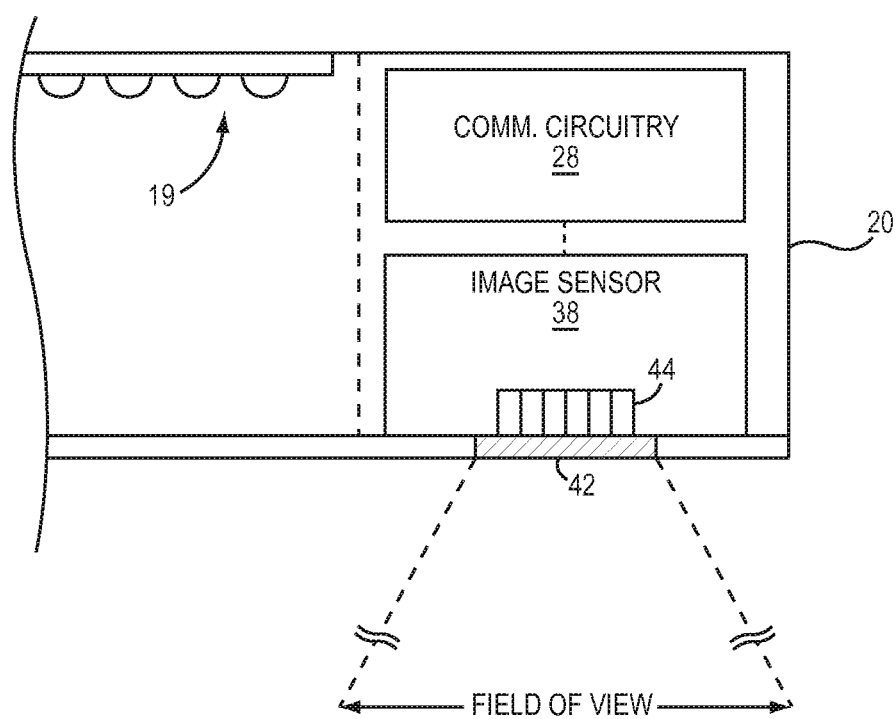
FIG. 6 illustrates an image module installed in a lighting fixture according to one embodiment of the disclosure.

With reference to FIG. 6, one embodiment of the lighting fixture 10 is illustrated where an image sensor 38 is integrated with the module housing 22 of the sensor module 20. The image sensor 38 is shown mounted to the back (top) side of the module housing 22. A lens or opening 24 is provided in the module housing 22 such that a front surface of the image sensor 38 or a lens (not shown) covering the image sensor 38 is flush with the front surface of the module housing 22. A pixel array 44 of the image sensor 38 is exposed to a field of view through the opening 24 in the module housing 22. Notably, while the image sensor 38 is shown mounted in a particular manner within the sensor module 20, the image sensor 38 may be mounted in any configuration and/or location that provides an appropriate field of view without departing from the principles of the present disclosure.

Figure 7A:
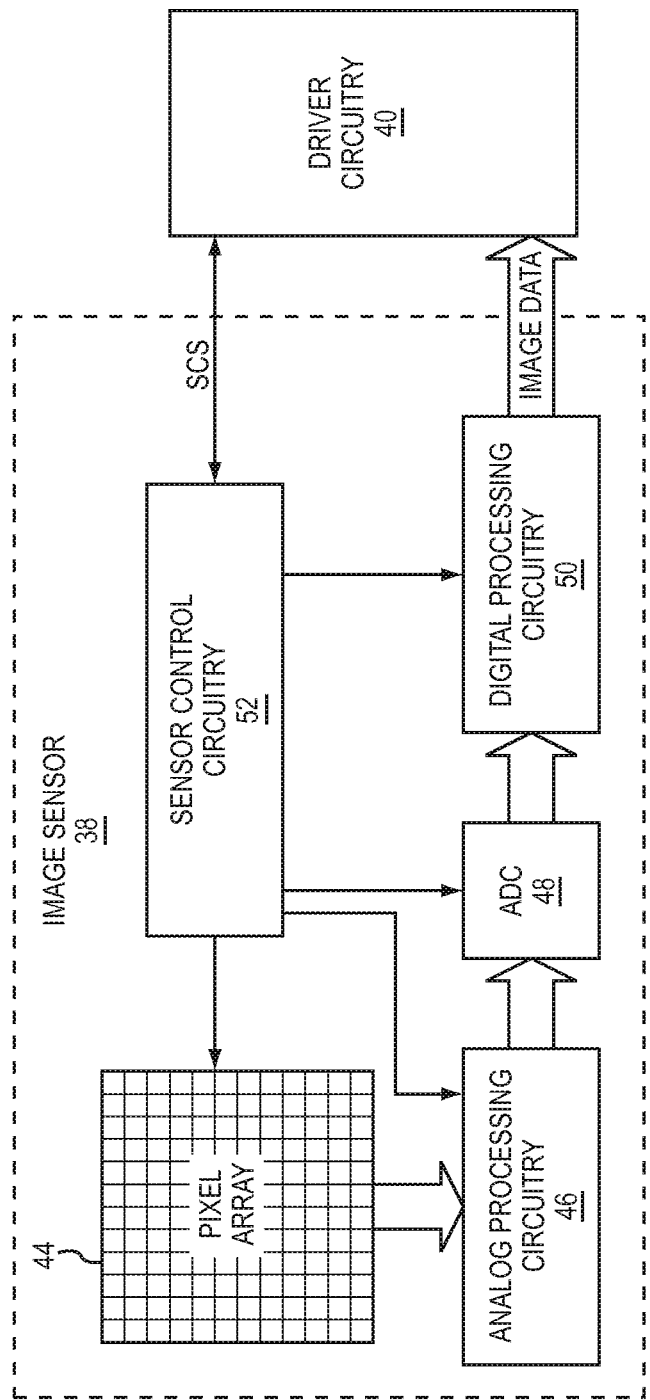
FIG. 7A illustrates an image sensor according to one embodiment of the disclosure.
Figure 7B:
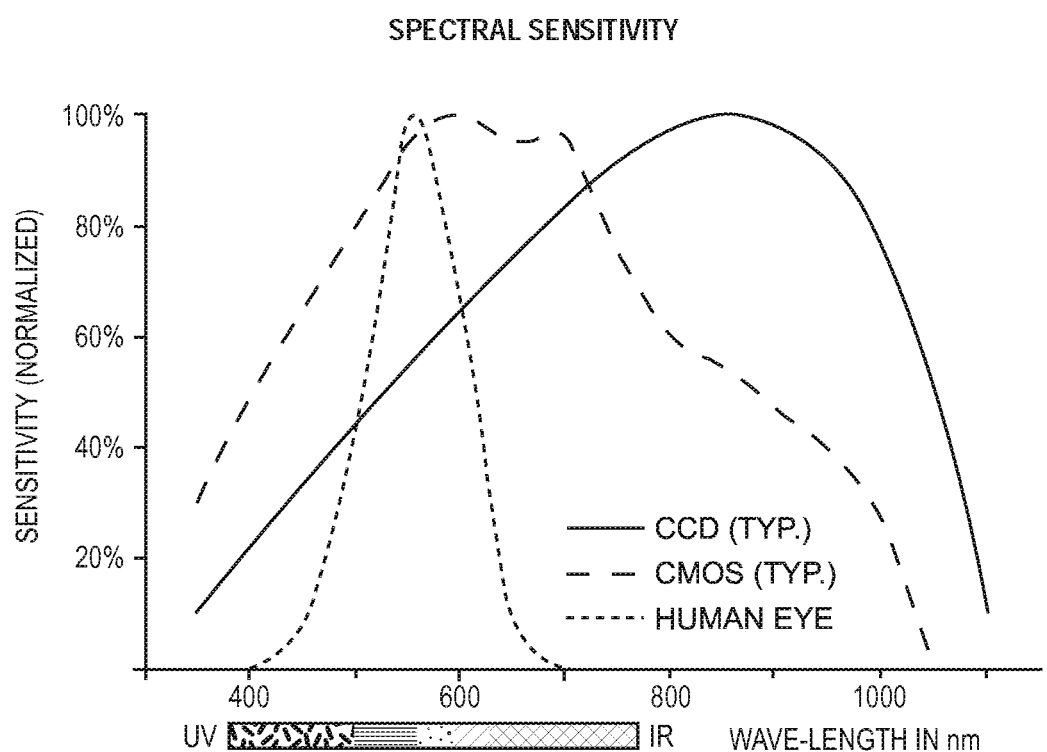
FIG. 7B is a graph of spectral sensitivity with respect to light for a typical CCD image sensor, and typical CMOS image sensor, and the human eye.

An exemplary CMOS-based image sensor 38 that may be used in the sensor module 20 is shown in FIG. 7A. While a CMOS-based image sensor 38 is illustrated, those skilled in the art will appreciate that other types of image sensors 38, such as CCD-based sensors, may be employed. CMOS-based image sensors 38 are particularly useful in lighting applications because they have a broad spectral sensitivity that overlaps that of the human eye. As illustrated in FIG. 7B, the spectral sensitivity of the human eye is relatively narrow and centered around 560 nm. The spectral sensitivity of CMOS-based image sensors 38 is much broader, yet substantially overlaps that of the human eye and extends toward the red and infrared (IR) end of the spectrum. The spectral sensitivity of the CCD-based image sensor 38 is relatively broad, but does not overlap that of the human eye as well as its CMOS counterpart.

The image sensor 38 generally includes the pixel array 44, analog processing circuitry 46, an analog-to-digital converter (ADC) 48, digital processing circuitry 50, and sensor control circuitry 52. In operation, the pixel array 44 will receive an instruction to capture an image from the sensor control circuitry 52. In response, the pixel array 44 will transform the light that is detected at each pixel into an analog signal and pass the analog signals for each pixel of the pixel array 44 to the analog processing circuitry 46. The analog processing circuitry 46 will filter and amplify the analog signals to create amplified signals, which are converted to digital signals by the ADC 48. The digital signals are processed by the digital processing circuitry 50 to create image data for the captured image. The image data is passed to the driver circuitry 40 for analysis, storage, or delivery to another lighting fixture 10 or remote entity via the communications circuitry 28.

The sensor control circuitry 52 will cause the pixel array 44 to capture an image in response to receiving an instruction via a sensor control signal (SCS) from the driver circuitry 40 or other control entity. The sensor control circuitry 52 controls the timing of the image processing provided by the analog processing circuitry 46, ADC 48, and digital processing circuitry 50. The sensor control circuitry 52 also sets the image sensor's processing parameters, such as the gain and nature of filtering provided by the analog processing circuitry 46 as well as the type of image processing provided by the digital processing circuitry 50. These processing parameters may be dictated by information provided by the driver circuitry 40.

Figure 8:
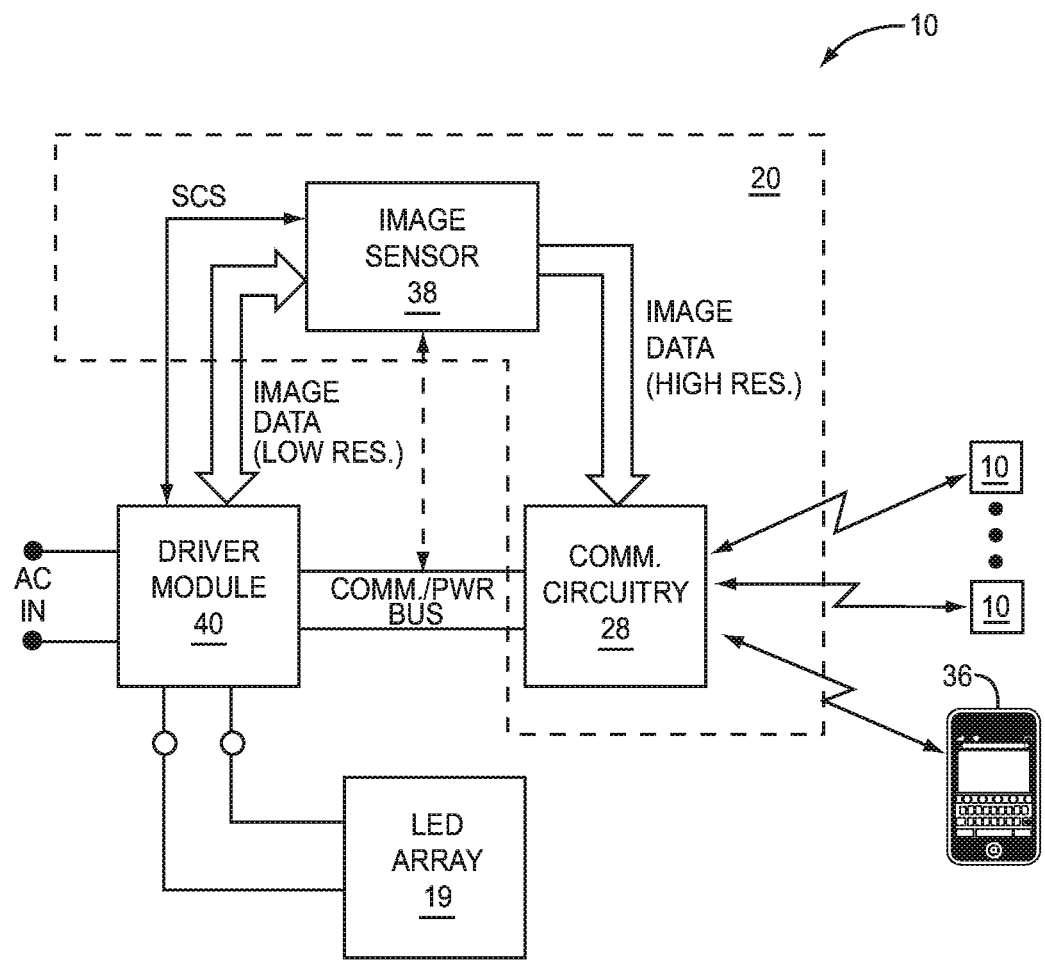
FIG. 8 is a block diagram of a lighting system according to one embodiment of the disclosure.

Turning now to FIG. 8, an electrical block diagram of a lighting fixture 10 is provided according to one embodiment. Assume for purposes of discussion that the driver circuitry 40, communications circuitry 28, and LED array 19 are ultimately connected to form the core electronics of the lighting fixture 10, and that the communications circuitry 28 is configured to bidirectionally communicate with other lighting fixtures 10, the commissioning tool 42, or other control entity through wired or wireless techniques. In this embodiment, a standard communication interface and a first, or standard, protocol are used between the driver circuitry 40 and the communications circuitry 28. This standard protocol allows different driver circuitry 40 to communicate with and be controlled by different communications circuitry 28, assuming that both the driver circuitry 40 and the communications circuitry 28 are operating according to the standard protocol used by the standard communication interface. The term "standard protocol" is defined to mean any type of known or future developed, proprietary, or industry-standardized protocol.

In the illustrated embodiment, the driver circuitry 40 and the communications circuitry 28 are coupled via communication and power buses, which may be separate or integrated with one another. The communication bus allows the communications circuitry 28 to receive information from the driver circuitry 40 as well as control the driver circuitry 40. An exemplary communication bus is the well-known inter-integrated circuitry ($I^2C$) bus, which is a serial bus and is typically implemented with a two-wire interface employing data and clock lines. Other available buses include: serial peripheral interface (SPI) bus, Dallas Semiconductor Corporation's 1-Wire serial bus, universal serial bus (USB), RS-232, Microchip Technology Incorporated's UNI/O®' and the like.

In certain embodiments, the driver circuitry 40 includes sufficient electronics to process an alternating current (AC) input signal (AC IN) and provide an appropriate rectified or direct current (DC) signal sufficient to power the communications circuitry 28, and perhaps the LED array 19. As such, the communications circuitry 28 does not require separate AC-to-DC conversion circuitry to power the electronics residing therein, and can simply receive DC power from the driver circuitry 40 over the power bus. Similarly, the image sensor 38 may receive power directly from the driver circuitry 40 or via the power bus, which is powered by the driver circuitry 40 or other source. The image sensor 38 may also be coupled to a power source (not shown) independently of the driver circuitry 40 and the communications circuitry 28.

In one embodiment, one aspect of the standard communication interface is the definition of a standard power delivery system. For example, the power bus may be set to a low voltage level, such as 5 volts, 12 volts, 24 volts, or the like. The driver circuitry 40 is configured to process the AC input signal to provide the defined low voltage level and provide that voltage over the power bus, thus the communications circuitry 28 or auxiliary devices, such as the image sensor 38, may be designed in anticipation of the desired low voltage level being provided over the power bus by the driver circuitry 40 without concern for connecting to or processing an AC signal to a DC power signal for powering the electronics of the communications circuitry 28 or the image sensor 38.

Figure 9:
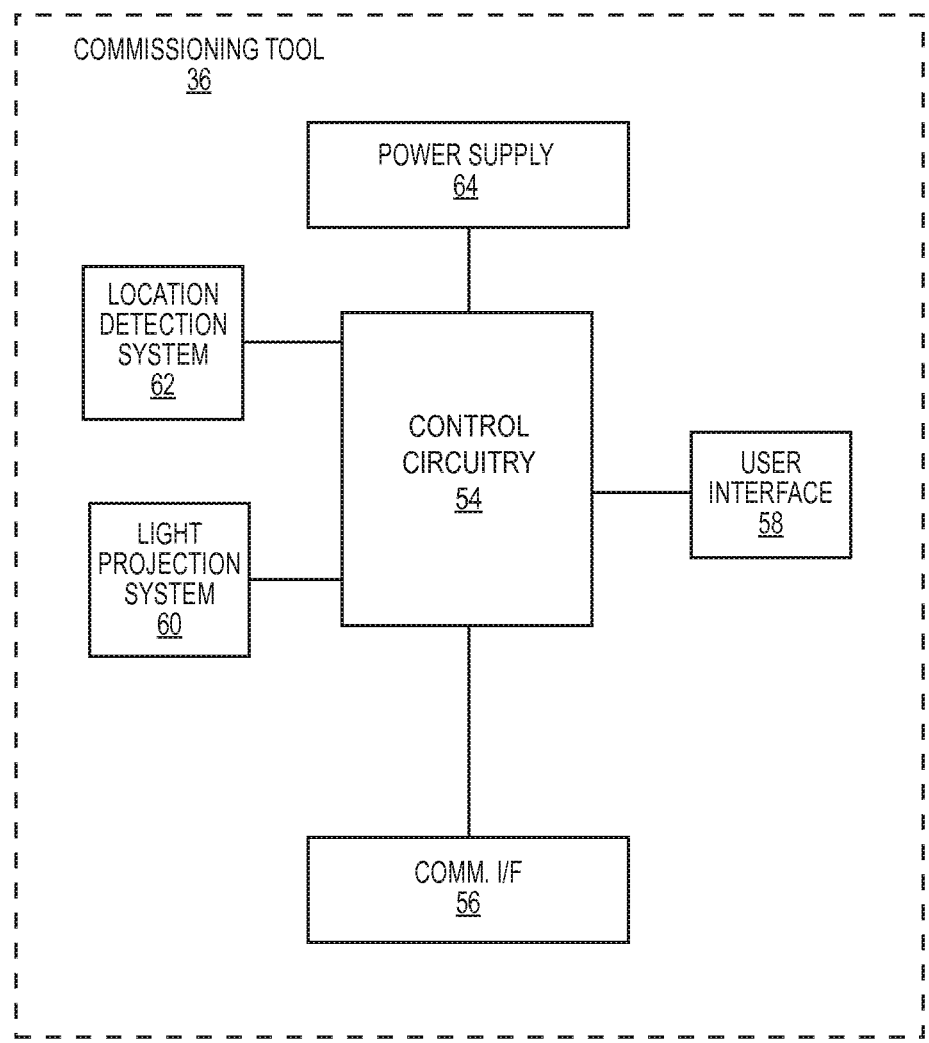
FIG. 9 is a block diagram of a communications module according to one embodiment of the disclosure.

With reference to FIG. 9, electronics for the commissioning tool 42 may include control circuitry 54 that is associated with a communication interface 56, a user interface 58, a light projection system 60, a location detection system 62, and a power supply 64. The control circuitry 54 is based on one or more application-specific integrated circuits, microprocessors, microcontrollers, or like hardware, which are associated with sufficient memory to run the firmware, hardware, and software necessary to impart the functionality described herein.

Everything may be powered by the power supply 64, which may include a battery and any necessary DC-DC conversion circuitry to convert the battery voltage to the desired voltages for powering the various electronics. The user interface 58 may include any combination of buttons, keypads, displays, or touch screens that supports the display of information to the user and the input of information by a user.

The communication interface 56 may facilitate wired or wireless communications with the lighting fixtures 10 directly or indirectly via an appropriate wireless network. The communication interface 56 may also be used to facilitate wireless communications with a personal computer, wireless network (WLAN), and the like. Virtually any communication standard may be employed to facilitate such communications, including Bluetooth, IEEE 802.11 (wireless LAN), near field, cellular, and the like wireless communication standards. For wired communications, the communication interface 56 may be used to communicate with a personal computer, wired network (LAN), lighting fixtures 10, and the like via an appropriate cable.

The light projection system 60 may take various forms, such as a laser diode or light emitting diode that is capable of emitting a light signal that can be received by the lighting fixtures 10 via the image sensor 38, a traditional ambient light sensor, or the like. The light projection system 60 may be used to transmit a focused light signal that can be directed at and recognized by a specific lighting fixture 10 to select the lighting fixture 10. The selected lighting fixture 10 and the commissioning tool 42 can then start communicating with each other via the communication interface 56 to exchange information and allow the instructions and data to be uploaded to the lighting fixture 10. In other embodiments, the commissioning tool 42 may query the addresses of the lighting fixtures 10 and systematically instruct the lighting fixtures 10 to control their light outputs to help identify each lighting fixture 10. Once the right lighting fixture 10 is identified, the commissioning tool 42 can begin configuring or controlling the lighting fixture 10 as desired. All of the control circuitry discussed herein for the lighting fixtures 10 and commissioning tool 42 is defined as hardware based and configured to run software, firmware, and the like to implement the described functionality.

Figure 10:
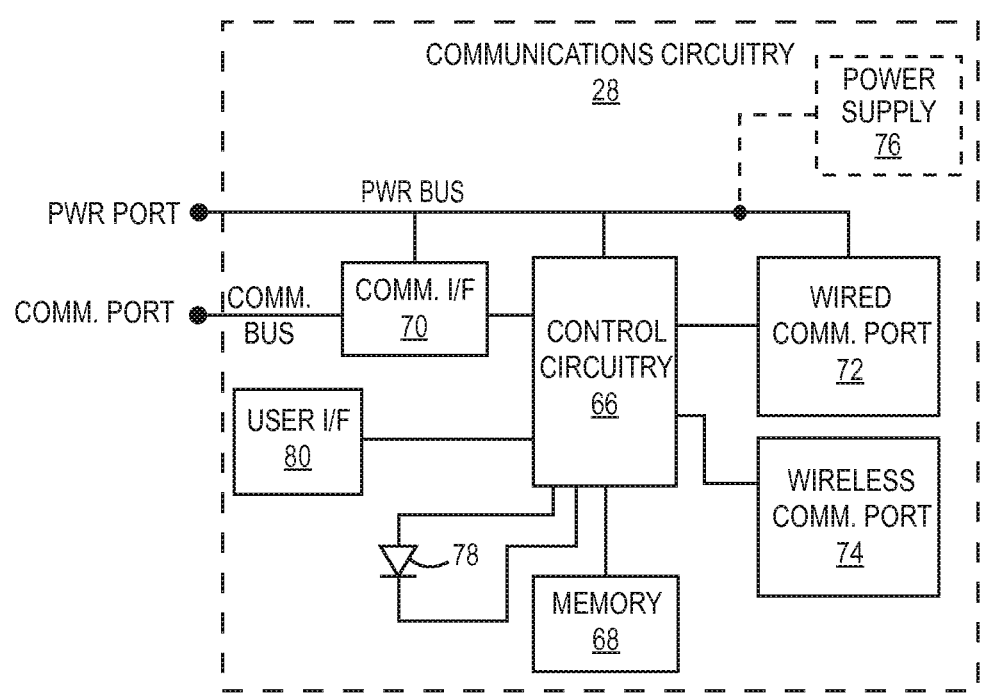
FIG. 10 is a cross section of an exemplary LED according to a first embodiment of the disclosure.

With reference to FIG. 10, a block diagram of one embodiment of the communications circuitry 28 is illustrated. The communications circuitry 28 includes control circuitry 66 and associated memory 68, which contains the requisite software instructions and data to facilitate operation as described herein. The control circuitry 66 may be associated with a communication interface 70, which is to be coupled to the driver circuitry 40, directly or indirectly via the communication bus. The control circuitry 66 may be associated with a wired communication port 72, a wireless communication port 74, or both, to facilitate wired or wireless communications with other lighting fixtures 10, the commissioning tool 42, and remote control entities. The wireless communication port 74 may include the requisite transceiver electronics to facilitate wireless communications with remote entities. The wired communication port 72 may support universal serial (USB), Ethernet, or like interfaces.

Image data may be provided directly to the driver circuitry 40, communications circuitry 28, or both. For example, low resolution image data for ambient light or occupancy determination may be provided to the driver circuitry 40 for processing. High resolution image data could be sent to the communications circuitry 28 for delivery to a security center so that security personnel can monitor high resolution images.

The capabilities of the communications circuitry 28 may vary greatly from one embodiment to another and from one type of sensor module 20 to another. For example, the communications circuitry 28 may act as a simple bridge between the driver circuitry 40 and the other lighting fixtures 10 or remote control entities. In such an embodiment, the control circuitry 66 will primarily pass data and instructions received from the other lighting fixtures 10 or remote control entities to the driver circuitry 40, and vice versa. The control circuitry 66 may translate the instructions as necessary based on the protocols being used to facilitate communications between the driver circuitry 40 and the communications circuitry 28 as well as between the communications circuitry 28 and the remote control entities.

In other embodiments, the control circuitry 66 plays an important role in coordinating intelligence and sharing data among the lighting fixtures 10 as well as providing significant, if not complete, control of the driver circuitry 40. While the communications circuitry 28 may be able to control the driver circuitry 40 by itself, the control circuitry 66 may also be configured to receive data and instructions from the other lighting fixtures 10 or remote control entities and use this information to control the driver circuitry 40. The communications circuitry 28 may also provide instructions to other lighting fixtures 10 and remote control entities based on the sensor data from the associated driver circuitry 40 as well as the sensor data and instructions received from the other lighting fixtures 10 and remote control entities.

Power for the control circuitry 66, memory 68, the communication interface 70, and the wired communication ports 72 and/or the wireless communication ports 74 may be provided over the power bus via the power port. As noted above, the power bus may receive its power from the driver circuitry 40, which generates the DC power signal. As such, the communications circuitry 28 may not need to be connected to AC power or include rectifier and conversion circuitry. The power port and the communication port may be separate or may be integrated with the standard communication interface. The power port and communication port are shown separately for clarity. In one embodiment, the communication bus is a 2-wire serial bus, wherein the connector or cabling configuration may be configured such that the communication bus and the power bus are provided using four wires: data, clock, power, and ground. In alternative embodiments, an internal power supply 76, which is associated with AC power or a battery is used to supply power.

The communications circuitry 28 may have a status indicator, such as an LED 78 to indicate the operating state of the communication module. Further, a user interface 80 may be provided to allow a user to manually interact with the communications circuitry 28. The user interface 80 may include an input mechanism, an output mechanism, or both. The input mechanism may include one or more of buttons, keys, keypads, touchscreens, or the like. The output mechanism may include one more LEDs, a display, or the like. For the purposes of this application, a button is defined to include a push button switch, all or part of a toggle switch, rotary dial, slider, or any other mechanical input mechanism.

Figure 11:
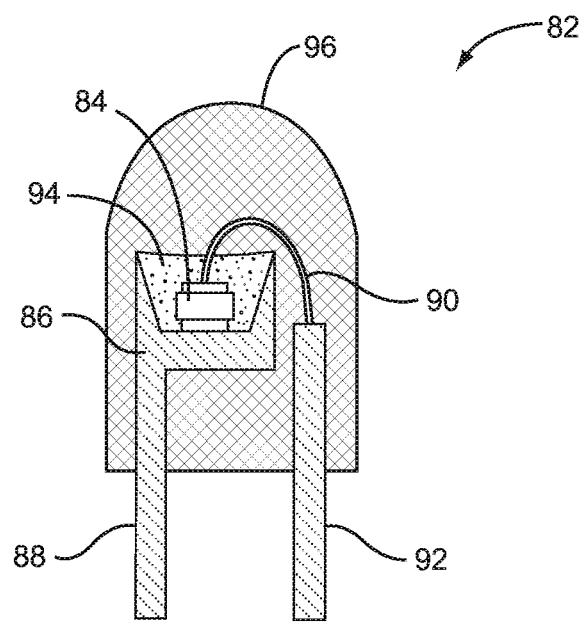
FIGS. 11 and 12 are cross sections of an exemplary LED according to a second embodiment of the disclosure.

A description of an exemplary embodiment of the LED array 19, driver circuitry 40, and the communications circuitry 28 follows. As noted, the LED array 19 includes a plurality of LEDs, such as the LEDs 82 illustrated in FIGS. 11 and 12. With reference to FIG. 11, a single LED chip 84 is mounted on a reflective cup 86 using solder or a conductive epoxy, such that ohmic contacts for the cathode (or anode) of the LED chip 84 are electrically coupled to the bottom of the reflective cup 86. The reflective cup 86 is either coupled to or integrally formed with a first lead 88 of the LED 82. One or more bond wires 90 connect ohmic contacts for the anode (or cathode) of the LED chip 84 to a second lead 92.

The reflective cup 86 may be filled with an encapsulant material 94 that encapsulates the LED chip 84. The encapsulant material 94 may be clear or contain a wavelength conversion material, such as a phosphor, which is described in greater detail below. The entire assembly is encapsulated in a clear protective resin 96, which may be molded in the shape of a lens to control the light emitted from the LED chip 84.

Figure 12:
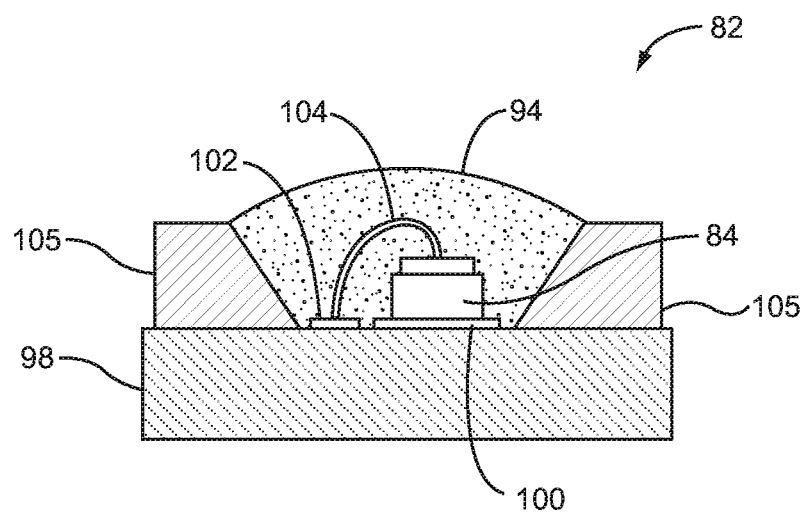

An alternative package for an LED 82 is illustrated in FIG. 12 wherein the LED chip 84 is mounted on a substrate 98. In particular, the ohmic contacts for the anode (or cathode) of the LED chip 84 are directly mounted to first contact pads 100 on the surface of the substrate 98. The ohmic contacts for the cathode (or anode) of the LED chip 84 are connected to second contact pads 102, which are also on the surface of the substrate 98, using bond wires 104. The LED chip 84 resides in a cavity of a reflector structure 105, which is formed from a reflective material and functions to reflect light emitted from the LED chip 84 through the opening formed by the reflector structure 105. The cavity formed by the reflector structure 105 may be filled with an encapsulant material 94 that encapsulates the LED chip 84. The encapsulant material 94 may be clear or contain a wavelength conversion material, such as a phosphor.

In either of the embodiments of FIGS. 11 and 12, if the encapsulant material 94 is clear, the light emitted by the LED chip 84 passes through the encapsulant material 94 and the protective resin 96 without any substantial shift in color. As such, the light emitted from the LED chip 84 is effectively the light emitted from the LED 82. If the encapsulant material 94 contains a wavelength conversion material, substantially all or a portion of the light emitted by the LED chip 84 in a first wavelength range may be absorbed by the wavelength conversion material, which will responsively emit light in a second wavelength range. The concentration and type of wavelength conversion material will dictate how much of the light emitted by the LED chip 84 is absorbed by the wavelength conversion material as well as the extent of the wavelength conversion. In embodiments where some of the light emitted by the LED chip 84 passes through the wavelength conversion material without being absorbed, the light passing through the wavelength conversion material will mix with the light emitted by the wavelength conversion material. Thus, when a wavelength conversion material is used, the light emitted from the LED 82 is shifted in color from the actual light emitted from the LED chip 84.

For example, the LED array 19 may include a group of BSY or BSG LEDs 82 as well as a group of red LEDs 82. BSY LEDs 82 include an LED chip 84 that emits bluish light, and the wavelength conversion material is a yellow phosphor that absorbs the blue light and emits yellowish light. Even if some of the bluish light passes through the phosphor, the resultant mix of light emitted from the overall BSY LED 82 is yellowish light. The yellowish light emitted from a BSY LED 82 has a color point that falls above the Black Body Locus (BBL) on the 1976 CIE chromaticity diagram wherein the BBL corresponds to the various color temperatures of white light.

Similarly, BSG LEDs 82 include an LED chip 84 that emits bluish light; however, the wavelength conversion material is a greenish phosphor that absorbs the blue light and emits greenish light. Even if some of the bluish light passes through the phosphor, the resultant mix of light emitted from the overall BSG LED 82 is greenish light. The greenish light emitted from a BSG LED 82 has a color point that falls above the BBL on the 1976 CIE chromaticity diagram wherein the BBL corresponds to the various color temperatures of white light.

The red LEDs 82 generally emit reddish light at a color point on the opposite side of the BBL as the yellowish or greenish light of the BSY or BSG LEDs 82. As such, the reddish light from the red LEDs 82 may mix with the yellowish or greenish light emitted from the BSY or BSG LEDs 82 to generate white light that has a desired color temperature and falls within a desired proximity of the BBL. In effect, the reddish light from the red LEDs 82 pulls the yellowish or greenish light from the BSY or BSG LEDs 82 to a desired color point on or near the BBL. Notably, the red LEDs 82 may have LED chips 84 that natively emit reddish light wherein no wavelength conversion material is employed. Alternatively, the LED chips 84 may be associated with a wavelength conversion material, wherein the resultant light emitted from the wavelength conversion material and any light that is emitted from the LED chips 84 without being absorbed by the wavelength conversion material mixes to form the desired reddish light.

The blue LED chip 84 used to form either the BSY or BSG LEDs 82 may be formed from a gallium nitride (GaN), indium gallium nitride (InGaN), silicon carbide (SiC), zinc selenide (ZnSe), or a like material system. The red LED chip 84 may be formed from an aluminum indium gallium nitride (AlInGaP), gallium phosphide (GaP), aluminum gallium arsenide (AlGaAs), or a like material system. Exemplary yellow phosphors include cerium-doped yttrium aluminum garnet (YAG:Ce), yellow BOSE (Ba, O, Sr, Si, Eu) phosphors, and the like. Exemplary green phosphors include green BOSE phosphors, Lutetium aluminum garnet (LuAg), cerium doped LuAg (LuAg:Ce), Maui M535 from Lightscape Materials, Inc. of 201 Washington Road, Princeton, N.J. 08540, and the like. The above LED architectures, phosphors, and material systems are merely exemplary and are not intended to provide an exhaustive listing of architectures, phosphors, and materials systems that are applicable to the concepts disclosed herein.

Figure 13:
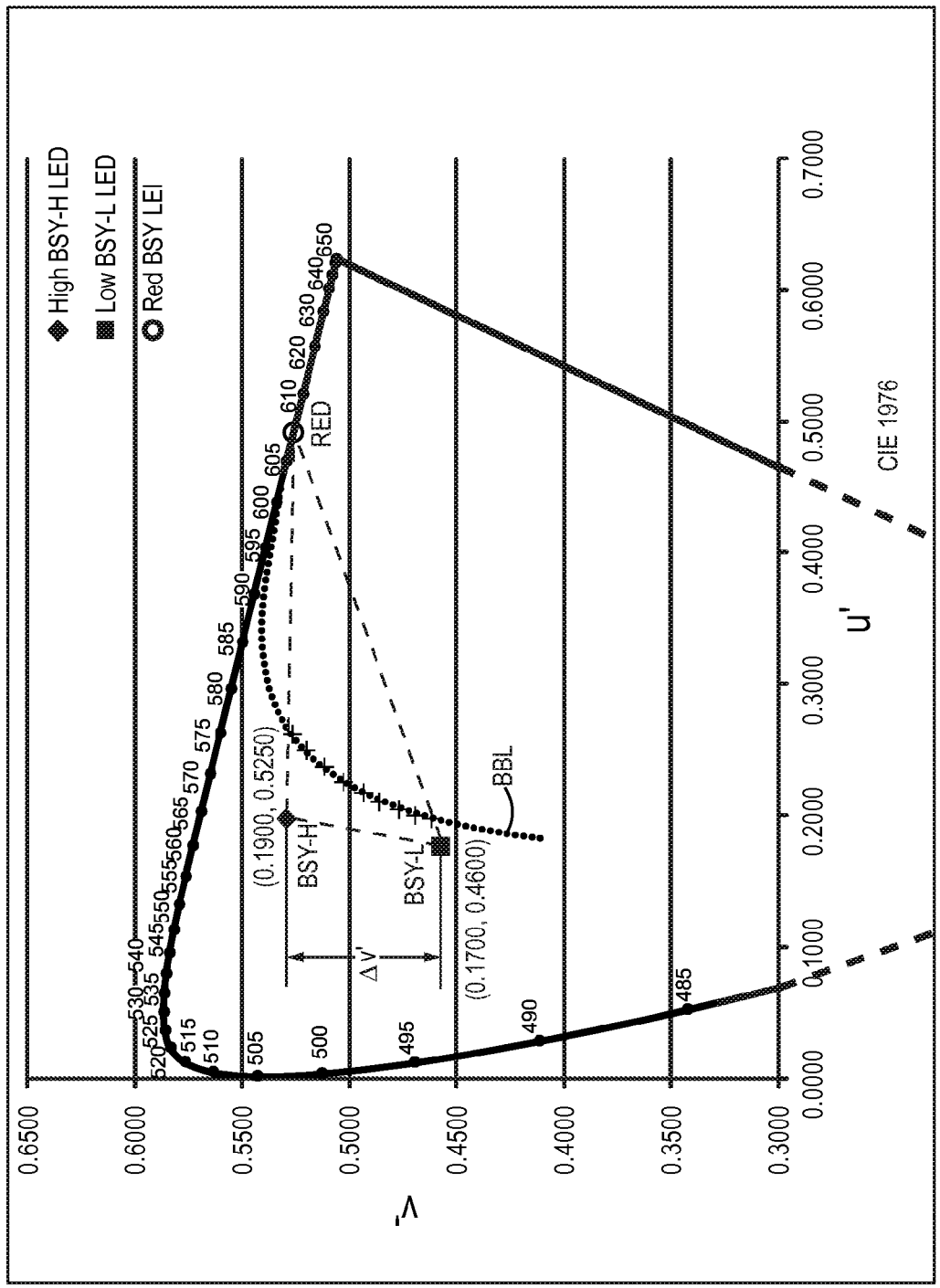
FIG. 13 is CIE 1976 chromaticity diagram that illustrates the color points for three different LEDs and a black body locus.

The International Commission on Illumination (Commission internationale de l'éclairage, or CIE) has defined various chromaticity diagrams over the years. The chromaticity diagrams are used to project a color space that represents all human perceivable colors without reference to brightness or luminance. FIG. 13 illustrates a CIE 1976 chromaticity diagram, which includes a portion of a Planckian locus, or black body locus (BBL). The BBL is a path within the color space that the color of an incandescent black body would travel as the temperature of the black body changes. While the color of the incandescent body may range from an orangish-red to blue, the middle portions of the path encompass what is traditionally considered as "white light."

Correlated Color Temperature (CCT), or color temperature, is used to characterize white light. CCT is measured in kelvin (K) and defined by the Illuminating Engineering Society of North America (IESNA) as "the absolute temperature of a blackbody whose chromaticity most nearly resembles that of the light source." Light output that is:
  i. below 3200 K is a yellowish white and generally considered to be warm (white) light;
  ii. between 3200 K and 4000 K is generally considered neutral (white) light; and
  iii. above 4000 K is bluish-white and generally considered to be cool (white) light.

In the following discussion, the focus is providing white light with a desired CCT, which is generally the primary goal for general illumination. However, the concepts discussed below equally apply to adjusting the overall color of the light provided by the lighting fixture 10 to colors that are not considered white or have color points that do not fall on or relatively close to the BBL.

The coordinates [u', v'] are used to define color points within the color space of the CIE 1976 chromaticity diagram. The v' value defines a vertical position and the u' value defines a horizontal position. As an example, the color points for a first BSY LED 82 is about (0.1900, 0.5250), a second BSY LED 82 is about (0.1700, 0.4600), and a red LED 82 is about (0.4900, 0.5600). Notably, the first and second BSY LEDs 82 are significantly spaced apart from one another along the v' axis. As such, the first BSY LED 82 is much higher than the second BSY LED 82 in the chromaticity diagram. For ease of reference, the higher, first BSY LED 82 is referenced as the high BSY-H LED, and the lower, second BSY LED 82 is referenced as the low BSY-L LED.

As such, the Δv' for the high BSY-H LED and the low BSY-L LED is about 0.065 in the illustrated example. In different embodiments, the Δv' may be greater than 0.025, 0.030, 0.033, 0.040 0.050, 0.060, 0.075, 0.100, 0.110, and 0.120, respectively. Exemplary, but not absolute upper bounds for Δv' may be 0.150, 0.175, or 0.200 for any of the aforementioned lower bounds. For groups of LEDs of a particular color, the Δv' between two groups of LEDs is the difference between the average v' values for each group of LEDs. As such, the Δv' between groups of LEDs of a particular color may also be greater than 0.030, 0.033, 0.040 0.050, 0.060, 0.075, 0.100, 0.110, and 0.120, respectively, with the same upper bounds as described above. Further, the variation of color points among the LEDs 82 within a particular group of LEDs may be limited to within a seven, five, four, three, or two-step MacAdam ellipse in certain embodiments. In general, the greater the delta v', the larger the range through which the CCT of the white light can be adjusted along the black body locus. The closer the white light is to the black body locus, the more closely the white light will replicate that of an incandescent radiator.

In one embodiment, the LED array 19 includes a first LED group of only low BSY-L LEDs, a second LED group of only high BSY-H LEDs, and a third LED group of only red LEDs. The currents used to drive the first, second, and third LED groups may be independently controlled such that the intensity of the light output from the first, second, and third LED groups is independently controlled. As such, the light output for the first, second, and third LED groups may be blended or mixed to create a light output that has an overall color point virtually anywhere within a triangle formed by the color points of the respective low BSY-L LEDs, high BSY-H LEDs, and the red LEDs. Within this triangle resides a significant portion of the BBL, and as such, the overall color point of the light output may be dynamically adjusted to fall along the portion of the BBL that resides within the triangle (as well as virtually anywhere within the triangle).

A crosshatch pattern highlights the portion of the BBL that falls within the triangle. Adjusting the overall color point of the light output along the BBL corresponds to adjusting the CCT of the light output, which as noted above is considered white light when falling on or close to the BBL. In one embodiment, the CCT of the overall light output may be adjusted over a range from about 2700 K to about 5700 K. In another embodiment, the CCT of the overall light output may be adjusted over a range from about 3000 K to 5000 K. In yet another embodiment, the CCT of the overall light output may be adjusted over a range from about 2700 K to 5000 K. In yet another embodiment, the CCT of the overall light output may be adjusted over a range from about 3000 K to 4000 K. These variations in CCT can be accomplished while maintaining a high color rendering index value (CRI), such as a CRI equal to or greater than 90.

To be considered "white" light, the overall color point does not have to fall precisely on the BBL. Unless defined otherwise and for the purposes of this application only, a color point within a five-step MacAdam ellipse of the BBL is defined as white light on the BBL. For tighter tolerances, four, three, and two-step MacAdam ellipses may be defined.

Figure 14:
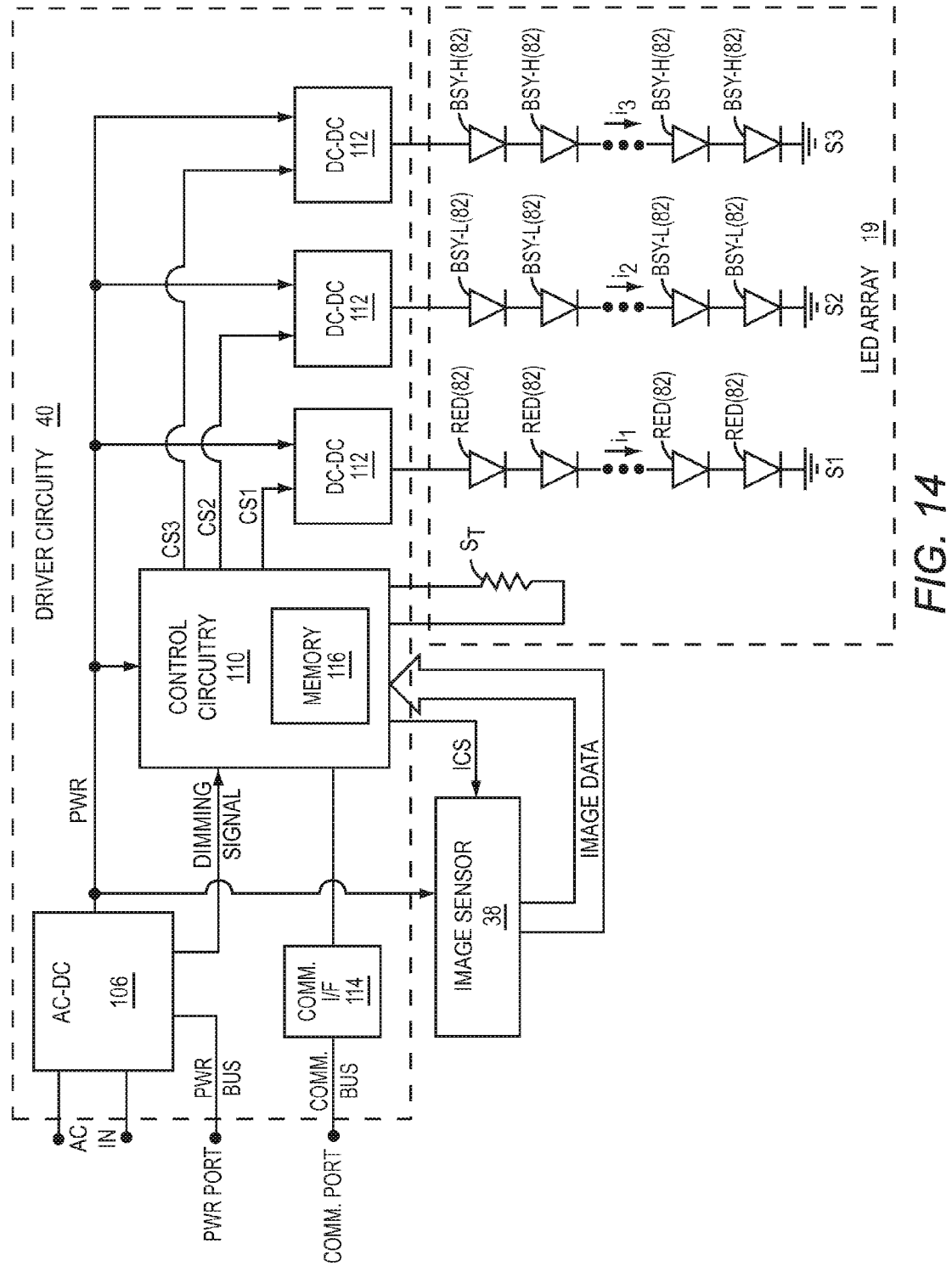
FIG. 14 is a schematic of a driver module with an image sensor and an LED array according to one embodiment of the disclosure.

In the illustrated embodiment, the LED array 19 may include a mixture of red LEDs 82, high BSY-H LEDs 82, and low BSY-L LEDs 82. The driver circuitry 40 for driving the LED array 19 is illustrated in FIG. 14, according to one embodiment of the disclosure. The LED array 19 may be divided into multiple strings of series connected LEDs 82. In essence, LED string S1, which includes a number of red LEDs (RED), forms a first group of LEDs 82. LED string S2, which includes a number of low BSY LEDs (BSY-L), forms a second group of LEDs 82. And, LED string S3, which includes a number of high BSY LEDs (BSY-H), forms a third group of LEDs 82.

For clarity, the various LEDs 82 of the LED array 19 are referenced as RED, BSY-L, and BSY-H in FIG. 14 to clearly indicate which LEDs are located in the various LED strings S1, S2, and S3. While BSY LEDs 82 are illustrated, BSG or other phosphor-coated, wavelength converted LEDs may be employed in analogous fashion. For example, a string of high BSG-H LEDs 82 may be combined with a string of low BSG-L LEDs 82, and vice versa. Further, a string of low BSY-H LEDs may be combined with a string of high BSG-H LEDs, and vice versa. Non-phosphor-coated LEDs, such as non-wavelength converted red, green, and blue LEDs, may also be employed in certain embodiments.

In general, the driver circuitry 40 controls the drive currents $i_1$, $i_2$, and $i_3$, which are used to drive the respective LED strings S1, S2, and S3. The ratio of drive currents $i_1$, $i_2$, and $i_3$ that are provided through respective LED strings S1, S2, and S3 may be adjusted to effectively control the relative intensities of the reddish light emitted from the red LEDs 82 of LED string S1, the yellowish/greenish light emitted from the low BSY-L LEDs 82 of LED string S2, and the yellow/greenish light emitted from the high BSY-H LEDs 82 of LED string S3. The resultant light from each LED string S1, S2, and S3 mixes to generate an overall light output that has a desired color, CCT, and intensity, the latter of which may also be referred to a dimming level. As noted, the overall light output may be white light that falls on or within a desired proximity of the BBL and has a desired CCT.

The number of LED strings Sx may vary from one to many and different combinations of LED colors may be used in the different strings. Each LED string Sx may have LEDs 82 of the same color, variations of the same color, or substantially different colors. In the illustrated embodiment, each LED string S1, S2, and S3 is configured such that all of the LEDs 82 that are in the string are all essentially identical in color. However, the LEDs 82 in each string may vary substantially in color or be completely different colors in certain embodiments. In another embodiment, three LED strings Sx with red, green, and blue LEDs may be used, wherein each LED string Sx is dedicated to a single color. In yet another embodiment, at least two LED strings Sx may be used, wherein the same or different colored BSY or BSG LEDs are used in one of the LED strings Sx and red LEDs are used in the other of the LED strings Sx. A single string embodiment is also envisioned, where currents may be individually adjusted for the LEDs of the different colors using bypass circuits, or the like.

The driver circuitry 40 depicted in FIG. 14 generally includes AC-DC conversion circuitry 106, control circuitry 110, and a number of current sources, such as the illustrated DC-DC converters 112. The AC-DC conversion circuitry 106 is adapted to receive an AC power signal (AC IN), rectify the AC power signal, correct the power factor of the AC power signal, and provide a DC output signal. The DC output signal may be used to directly power the control circuitry 110 and any other circuitry provided in the driver circuitry 40, including the DC-DC converters 112, a communication interface 114, as well as the image sensor 38.

The DC output signal may also be provided to the power bus, which is coupled to one or more power ports, which may be part of the standard communication interface. The DC output signal provided to the power bus may be used to provide power to one or more external devices that are coupled to the power bus and separate from the driver circuitry 40. These external devices may include the communications circuitry 28 and any number of auxiliary devices, such as the image sensor 38. Accordingly, these external devices may rely on the driver circuitry 40 for power and can be efficiently and cost effectively designed accordingly. The AC-DC conversion circuitry 108 of the driver circuitry 40 is robustly designed in anticipation of being required to supply power to not only its internal circuitry and the LED array 19, but also to supply power to these external devices. Such a design greatly simplifies the power supply design, if not eliminating the need for a power supply, and reduces the cost for these external devices.

As illustrated, the three respective DC-DC converters 112 of the driver circuitry 40 provide drive currents $i_1$, $i_2$, and $i_3$ for the three LED strings S1, S2, and S3 in response to control signals CS1, CS2, and CS3. The control signals CS1, CS2, and CS3 may be pulse width modulated (PWM) signals that effectively turn the respective DC-DC converters on during a logic high state and off during a logic low state of each period of the PWM signal. In one embodiment, the control signals CS1, CS2, and CS3 are the product of two PWM signals.

The first PWM signal is a higher frequency PWM signal that has a duty cycle that effectively sets the DC current level through a corresponding one of LED strings S1, S2, and S3, when current is allowed to pass through the LED strings S1, S2, and S3. The second PWM signal is a lower frequency signal that has a duty cycle that corresponds a desired dimming or overall output level. In essence, the higher frequency PWM signals set the relative current levels though each LED string S1, S2, and S3 while the lower frequency PWM signal determines how long the drive currents $i_1$, $i_2$, and $i_3$ are allowed to pass through the LED strings S1, S2, and S3 during each period of the lower frequency PWM signal. The longer the drive currents $i_1$, $i_2$, and $i_3$ are allowed to flow through the LED strings S1, S2, and S3 during each period, the higher the output level, and vice versa.

Figure 15:
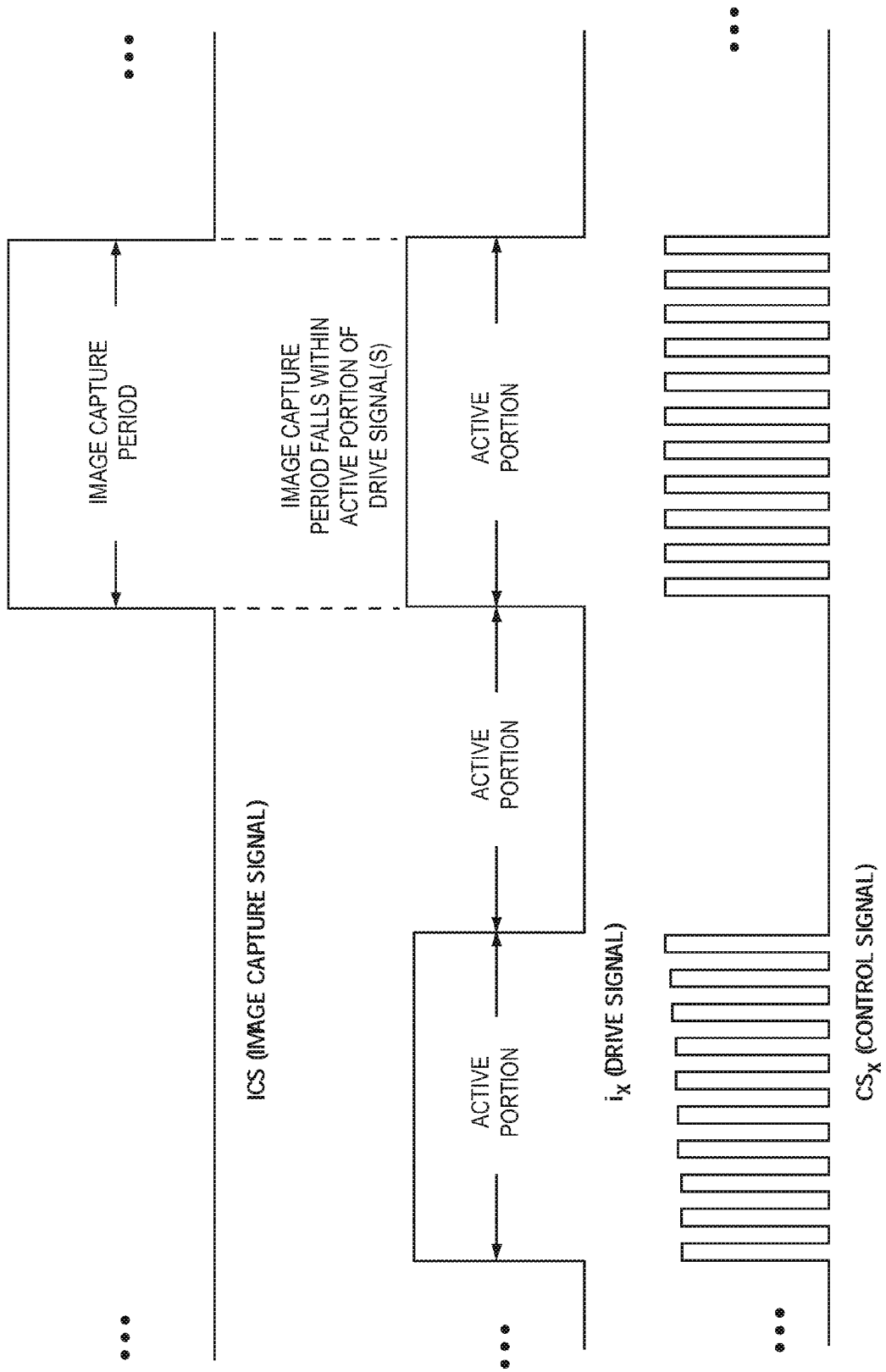
FIG. 15 is a timing diagram that shows the relationship of an image capture signal, a drive signal, and a control signal according to one embodiment of the disclosure.

Given the reactive components associated with the DC-DC converters 112, the relative current levels set with the higher frequency PWM signals may be filtered to a relative DC current. However, this DC current is essentially pulsed on and off based on the duty cycle of the lower frequency PWM signal. For example, the higher frequency PWM signal may have a switching frequency of around 200 KHz, while the lower frequency PWM signal may have a switching frequency of around 1 KHz. FIG. 15 illustrates a control signal $CS_X$, which has the higher and lower frequency PWM components, and a resultant drive current $i_X$. During the active portions, the LED array 19 will emit light. During the inactive portions, the LED array will not emit light. FIG. 15 is described below in greater detail in the discussion related to coordinating image capture periods with active portions of the currents $i_X$ (drive signal).

In certain instances, a dimming device may control the AC power signal. The AC-DC conversion circuitry 106 may be configured to detect the relative amount of dimming associated with the AC power signal and provide a corresponding dimming signal to the control circuitry 110. Based on the dimming signal, the control circuitry 110 will adjust the drive currents $i_1$, $i_2$, and $i_3$ provided to each of the LED strings S1, S2, and S3 to effectively reduce the intensity of the resultant light emitted from the LED strings S1, S2, and S3 while maintaining the desired CCT. As described further below, the color, CCT and dimming levels may be initiated internally or received from the commissioning tool 42, a wall controller, or another lighting fixture 10. If received from an external device via the communications circuitry 28, the color, CCT and/or dimming levels are delivered from the communications circuitry 28 to the control circuitry 110 of the driver circuitry 40 in the form of a command via the communication bus. The driver circuitry 40 will respond by controlling the drive currents $i_1$, $i_2$, and $i_3$ in the desired manner to achieve the requested color, CCT and/or dimming levels.

The color, CCT, and intensity of the light emitted from the LEDs 82 may be affected by temperature. If associated with a thermistor $S_T$ or other temperature-sensing device, the control circuitry 110 can control the drive currents $i_1$, $i_2$, and $i_3$ provided to each of the LED strings S1, S2, and S3 based on ambient temperature of the LED array 19 in an effort to compensate for temperature effects. The control circuitry 110 may also trigger image capture by and receive image data from the image sensor 38. The image data may be processed by the control circuitry 110 to make occupancy determinations, determine ambient light levels, and control the drive currents $i_1$, $i_2$, and $i_3$ in a desired fashion based on the occupancy conditions and ambient light levels. Each of the LED strings S1, S2, and S3 may have different temperature compensation adjustments, which may also be functions of the magnitude of the various drive currents $i_1$, $i_2$, and $i_3$.

The control circuitry 110 may include a central processing unit (CPU) and sufficient memory 116 to enable the control circuitry 110 to bidirectionally communicate with the communications circuitry 28 or other devices over the communication bus through an appropriate communication interface (I/F) 114 using a defined protocol, such as the standard protocol described above. The control circuitry 110 may receive data or instructions from the communications circuitry 28 or other device and take appropriate action to process the data and implement the received instructions. The instructions may range from controlling how the LEDs 82 of the LED array 19 are driven to returning operational data, such as image, temperature, occupancy, light output, or ambient light information, that was collected by the control circuitry 110 to the communications circuitry 28 or other device via the communication bus. Notably, the functionality of the communications circuitry 28 may be integrated into the driver circuitry 40, and vice versa.

Notably, when the term "control system" is used in the claims or generically in the specification, the term should be construed broadly to include the hardware and any additional software or firmware that is needed to provide the stated functionality. The term "control system" should not be construed as only software, but rather as electronics are needed to implement any control system that is defined herein. For example, a control system may, but does not necessarily, include the control circuitry 110, the DC-DC converters 112, the AC-DC conversion circuitry 106, and the like.

For occupancy or ambient light sensing, the image sensor 38 is configured to capture an image in response to an image capture signal ICS, which may be provided by the control circuitry 110. The image capture signal may be triggered on a rising edge, a falling edge, or during an active portion of the signal. As noted, the LED array 19 emits light in response to one or more drive signals, such as the drive currents $i_1$, $i_2$, $i_3$ that are shown driving the three LED strings S1, S2, and S3 in FIG. 14. The control circuitry 110 provides control signals CS1, CS2, and CS3 to the respective DC-DC converters 112, which in turn provide the drive currents $i_1$, $i_2$, $i_3$ that are shown driving the three LED strings S1, S2, and S3. These drive currents $i_1$, $i_2$, $i_3$ are individually and collectively referred to herein as a "drive signal," which is used to control the light emitted by the LED array 19.

When an image needs to be captured, the control circuitry 110 provides the image capture signal ICS. When capturing an image, the control circuitry 110 may coordinate the image capture signal ICS and the drive signal (via the control signals CS1, CS2, and CS3) so that the image sensor 38 captures the image when the LED array 19 is emitting light. The resulting image data is provided to the control circuitry 110 for further processing, storage, analysis, and/or distribution to other entities, such as other lighting fixtures 10, remote entities, etc.

The control circuitry 110 may also control the drive signal to control the light emitted by the LED array 19 based, at least in part, on information derived from one or more captured images. For example, the control circuitry 110 may use the image sensor 38 to facilitate occupancy detection, ambient light sensing, or both. As such, the image sensor 38 may replace a traditional occupancy detector, ambient light sensor, or both. For occupancy detection, periodically captured images may be analyzed by the control circuitry to determine whether someone is present or there is movement in a field of view that can be captured by the image sensor 38. For example, images captured over time may be analyzed for differences, wherein the presence of differences in successive images or differences between a current image and a reference image is indicative of occupancy. A lack of differences in the successive images or between a current image and reference image may be indicative of vacancy, or a lack of occupancy. The extent or type of differences required to be indicative of occupancy or vacancy may be varied to prevent false occupancy and vacancy determinations. Further, areas of the captured image may be ignored to prevent false detections.

If the field of view for the image sensor 38 covers an area of interest and an area of no interest, the portion of the image data that corresponds to the area of no interest may be ignored, while only the portion of the image data that corresponds to the area of interest is analyzed for occupancy and vacancy determinations. For example, if the field of view for the image sensor 38 covers a conference room (an area of interest) and extends through a window to cover an exterior sidewalk (an area of no interest), the portion of the image data that corresponds to the sidewalk or anywhere outside of the conference room may be ignored, while only the portion of the image data that corresponds to conference room is analyzed for occupancy and vacancy determinations.

If the lighting fixture 10 is in an off state in which light is not being emitted for general illumination, the control circuitry 110 may keep the lighting fixture 10 in the off state until occupancy (or motion) is detected. Once occupancy is detected, the control circuitry will transition the lighting fixture 10 to an on state in which light is emitted for general illumination at a desired output level. After occupancy is no longer detected (vacancy), the control circuitry may transition the lighting fixture 10 back to the off state. Various occupancy modes, or operating protocols, are known to those skilled in art.

To use the image sensor 38 for occupancy detection, images may need to be captured when the lighting fixture 10 is in the off state or the on state. In the off state, the lighting fixture 10 may be in an environment that is so dark that images captured by the image sensor 38 are effectively underexposed and have insufficient information to make occupancy decisions. Notably, images are not captured instantly. The image sensor 38 captures each image during a brief image capture period. In the off state, the control circuitry 110 may cause the LED array 19 to emit light for a brief period that substantially coincides with the image capture period. As such, the field of view is illuminated during the image capture period by the light emitted from the LED array 19 to make sure that the captured image is sufficiently exposed and is able to provide sufficient information to make occupancy decisions.

When the lighting fixture 10 is in the off state, the light emitted by the LED array 19 during an image capture period may differ from the light emitted for general illumination during the on state in output level, spectral content, or both. For example, light emitted during the image capture period may be emitted at a lower or higher lumen level than the light emitted for general illumination during the on state. The light emitted during the image capture period may also have a different color spectrum than the light emitted for general illumination during the on state. The different color spectrums may differ in width, location, or both. The different color spectrums may or may not overlap. For instance, the white light for general illumination may reside within a 2- or 4-step MacAdam Ellipse of the Black Body Locus (BBL) and have CCT between 2700 and 5700 K while the light emitted during the image capture period may be outside of this specification and optimized for the image sensor 38.

In one embodiment, the color spectrum for the light emitted during image capture is less visible or perceptible to humans than the light emitted during general illumination. For example, the light emitted during the image capture periods may be shifted toward red or infrared with respect to the color spectrum for the white light emitted during general illumination. In particular, white light may be used for general illumination, while red or infrared light may be used during the image capture periods. As such, the flashes of red or infrared light that occur during the image capture periods in darker or non-illuminated rooms are imperceptible, or at least less perceptible and distracting than if the white light that is emitted for general illumination was used during the image captures periods. The image sensor 38 may have a CCD or CMOS-based sensor and be responsive to both spectrums. The light emitted during image capture should include, but need not be limited to, light that resides in a spectrum in which the image sensor 38 is responsive.

When the lighting fixture 10 is in the on state, the control circuitry 110 will cause the LED array 19 to emit light at a desired output level, color, CCT, or a combination thereof for general illumination. For occupancy detection in the on state, periodically captured images may be analyzed by the control circuitry 110 to determine whether someone is present or there is movement in a field of view that can be captured by the image sensor 38. Occupancy determinations may dictate whether the lighting fixture 10 remains in the on state or transitions to the off state in traditional fashion. The control circuitry 110 may simply capture these images on a periodic basis while using the same white light that is emitted for general illumination for capturing images.

Alternatively, the control circuitry 110 may cause the LED array 19 to change a characteristic of the light that is emitted for general illumination during the brief image capture periods. The light emitted by the LED array 19 during the image capture periods may differ from the light emitted for general illumination in output level or spectral content. For instance, light emitted during the image capture period may be emitted at a lower or higher lumen level than the light emitted for general illumination. The light emitted during the image capture period may also have a different color spectrum than the light emitted during general illumination. The different color spectrums may differ in width, location, or both, such that the light differs in perceptibility, color, CCT, and the like. The different color spectrums may or may not overlap. For instance, the light for general illumination may reside within a 2- or 4-step MacAdam Ellipse of the Black Body Locus (BBL) and have CCT between 2700 and 5700 K while the light emitted during the image capture period may be outside of a 4-step MacAdam Ellipse of the BBL.

Further, the output level of the light emitted during the image capture periods may be reduced from the output level for general illumination to avoid an overexposed image when the image sensor 38 would be subjected to too much light at the general illumination levels. In contrast, the output level of the light emitted during the image capture periods may be increased from the output level for general illumination to avoid an underexposed image when the image sensor 38 would be subjected to too little light at the general illumination output levels. In the on state, any changes in the characteristics of the light during the image capture periods are preferably imperceptible or minimally perceptible to humans. The changes may be made imperceptible or minimally perceptible because the change in the light is for a relatively short duration that corresponds to the image capture period.

For lighting fixtures 10 that employ solid state lighting sources, such as the LEDs of the LED array 19, the drive signal may be pulse width modulated (PWM) for at least certain output levels. Typically, the duty cycle of the PWM drive signal dictates a relative dimming level of the light output of the LED array 19. For each period of the PWM signal, the LED array 19 outputs light during an active portion of the PWM drive signal and does not output light during an inactive portion of the PWM drive signal. In operation, the LED array 19 is turning on and off at a frequency that is essentially imperceptible to humans during general illumination at some or all output levels.

Due to the phenomena of visual persistence, humans will perceive the periodic light pulses as constant illumination. The longer that light is emitted during each PWM period, the higher the perceived output level of the light, and vice versa. In other words, the higher the duty cycle, the higher the perceived output level of the light, and vice versa.

While humans perceive these rapid pulses of light as constant illumination, the image sensor 38 does not. The image sensor 38 does not have visual persistence, and image capture is affected by transitions in light levels during image capture periods. For example, a captured image may be underexposed if the image is captured during an image capture period where the light is emitted for part of the image capture period and not emitted for another part of the image capture period. Depending on the light level selected for general illumination, the captured image may be overexposed if captured during the active portion of the PWM drive signal when light is being emitted, and underexposed during the inactive portion of the PWM drive signal when the light is not being emitted during general illumination.

Thus, when capturing an image, the control circuitry 110 provides the image capture signal ICS so that the image capture period falls within an active portion of the PWM drive signal such that the LED array 19 is emitting light during the image capture period. The control circuitry 110 may also alter the characteristic of the emitted light relative to the light emitted for general illumination during the image capture periods. For example, the light emitted for general illumination may be provided at a different output level, color spectrum (color, CCT, etc.), or both relative to the light emitted during the image capture periods to help ensure proper exposure of the captured image. Alternatively, the light emitted during the image capture periods may also have the same characteristics as the light emitted for general illumination. These concepts apply to both the on and off states.

Images may also be captured and analyzed to determine the characteristics of ambient light when light is and is not being emitted from the lighting fixture 10. The characteristics of the ambient light may be used in a variety of ways. For example, the ambient light characteristics may dictate the output level, color spectrum (i.e. color, CCT), or both of the light that is emitted for general illumination, during the image capture periods, or both. As such, the image sensor 38 may be used as an ambient light sensor. The control circuitry 110 can iteratively determine an actual ambient light level during general illumination from the captured images and regulate the output level of the emitted light up or down so that the actual ambient light level corresponds to a reference output level for both general illumination or image capture, even as light from other lighting sources, such as the sun or another lighting fixture 10 changes.

Similarly, the control circuitry 110 can iteratively determine the color spectrum of the ambient light during general illumination from the captured images and regulate the color spectrum of the emitted light so that the color spectrum of the ambient light corresponds to, or is at least shifted in the direction of, a reference color spectrum. The control circuitry 110 can also regulate the color spectrum and level of the emitted light so that the ambient light color spectrum corresponds to the reference color spectrum and the ambient light level corresponds to a reference output level at the same time. When the LED array 19 is emitting light, the ambient light represents a combination of the light emitted from the LED array 19 and any light provided by sources other than the lighting fixture 10.

For ambient light sensing, the images may be captured when light is being emitted from the LED array 19, when light is not being emitted from the LED array 19, or both. Images captured without light being emitted from the LED array 19 will provide ambient light information (i.e. output level, color spectrum) without the lighting contribution of the LED array 19. With this information, the control circuitry 110 can determine an output level, the color spectrum, or both for light to emit to achieve a desired reference when added to the ambient conditions. Alternatively, information from the images captured with light being emitted from the LED array 19 allow the control circuitry 110 to determine how to adjust the light being emitted from the LED array 19 in output level, color spectrum, or both to achieve a desired reference.

The images, information determined from the images, or instructions derived from the images may be sent to other lighting fixtures 10 and remote devices. For example, a first lighting fixture 10 may receive images or image information from one or more other lighting fixtures 10, and use the received images or image information alone or in conjunction with images or image information that was captured by the first lighting fixture 10 to control the light output of the first lighting fixture 10 as well as at least one of the one or more lighting fixtures 10. As such, the light emitted from the first lighting fixture 10 may be further controlled based on images or image information that was gathered from multiple lighting fixtures 10, including the first lighting fixture 10. Images from the various lighting fixtures 10 may be sent to a central security location for monitoring by security personnel or storage. As such, the same image sensor 38 may be used as an ambient light sensor, occupancy sensor, and a security camera. The images may represent still images as well as full or partial frames of a video.

The following provides some examples of the above-described concepts using the embodiment of FIG. 14. Assume the LED array 19 has three LED strings S1, S2, and S3. Each of the LED strings S1, S2, and S3 have multiple LEDs 82. LED strings S2 and S3 only have BSY LEDs 82 with the same or different color spectrums, while LED string S1 has only red LEDs 82 with generally the same color spectrum. For general illumination, the control circuitry 110 may provide the control signals CS1, CS2, and CS3 to provide drive currents $i_1$, $i_2$, and $i_3$ through the LED strings S1, S2, and S3 at ratios that result in white light at a desired output level and with a desired CCT. During each image capture period while providing general illumination in the on state, the control circuitry 110 may essentially turn off LED strings S2 and S3, which would normally provide bluish-yellow light and continue driving LED string S1, which continues to provide red light. As a result, the emitted light for the LED array 19 is red light instead of the white light that results from mixing the bluish-yellow light from LED strings S2 and S3 with the red light from LED string S1. Once the image capture period is over, the control circuitry 110 reverts to providing the control signals SC1, SC2, and SC3, which results in white light being emitted for the LED strings S1, S2, and S3 at the desired output level and with the desired CCT.

Assume the red LEDs 82 emit red light with a wavelength centered close to 630 nm. Further assume that the image sensor 38 is responsive to red light with wavelengths centered close to 630 nm. Since humans are not very sensitive to light with wavelengths centered at or above 610 nm, brief flashes of red light that is centered at 630 nm is not very perceptible to humans, especially for short periods of time, when the lighting fixture 10 is the on state during general illumination or in an off state. In the on state, the brief periods of red light interrupt the white light being provided for general illumination during image capture periods. In the off state, the LED array 19 is not outputting light for general illumination. However, LED string S1 with the red LEDs will be periodically flashed to emit red light during image capture periods in the off state. In a darkened room, the red flashes of light when the lighting fixture 10 is in the off state will be much less perceptible than flashes of white light, if not essentially imperceptible. The perceptibility will be a function of the color of the red light and length of the image capture periods.

The image sensor 38 is able to capture images that have sufficient information for occupancy detection using only the red light. Notably, the output level of the red light provide by the LED string S1 during the image capture periods may stay the same, be increased, or be decreased relative to output level of the red light required for general illumination. When the drive signals are PWM signals, the image capture signals and the drive signals are controlled such that each image capture period falls within an active portion of the PWM drive signal for the LED string S1 of red LEDs 82.

In other embodiments, the control circuitry 110 may adjust one, two, or all of the drive currents $i_1$, $i_2$, and $i_3$ for LED strings S1, S2 and S3 during the image capture periods relative to that which is used for general illumination. As a result, the emitted light for the LED array 19 during the image capture periods will have a different color spectrum, output level, or both relative to the white light that is used for general illumination, but will use light from each of the LED strings S1, S2, and S3.

FIG. 15 illustrates the relationship of the control signal $CS_X$, the drive current $i_X$ (drive signal), and the image capture signal ICS. As noted above, the control signals $CS_X$ control the DC-DC converters 112 to provide the PWM drive signals $i_X$. When the drive signals $i_X$ are PWM signals, the image capture signal ICS and the drive signals $i_X$ are controlled such that each image capture period falls within an active portion of the PWM drive current $i_X$ for those LED strings S1, S2, and S3 that are being used during the image capture period. This concept holds true when operating in both the on and off states. Notably, the image capture signal ICS is illustrated to correspond to the image capture period. As noted above, image capture may be triggered in a variety of ways, and the image capture signal ICS does not need to have an active period that corresponds to the image capture period. The image capture period simply starts upon being triggered and will last a defined period of time.

As indicated above, the same light that is used for general illumination may be used during the image capture periods for on and off states. When the drive signals are PWM signals, the image capture signals and the drive signals are controlled such that each image capture period falls within an active portion of the PWM drive signal for the LED strings S1, S2, and S3.

In an alternative configuration, only (or a subset of the LED strings) LED string S1 is used for capturing images, and thus, is not used for general illumination. The other two LED strings S2 and S3 are only used for general illumination. The LED string S1 that is only used for capturing images may have one or more LEDs 82. If multiple LEDs 82 are used in the LED string S1, the LEDs 82 may include LEDs that emit the same or different colors of light, such that the composite of the light emitted by the LEDs 82 of LED string S1 has a spectrum that is compatible with the image sensor 38 and has a spectrum that different than that of the light used for general illumination. For example, the LEDs 82 of LED string S1 may have a mixture of red, green, and blue LEDs to make white light; a mixture of BSY and red LEDs to make white light, only red LEDs; only infrared (IR) LEDs; only white LEDs; etc. The output level of the light emitted by LED string S1 can be fixed or varied as needed based on ambient lighting conditions, which may also be determined using the image sensor 38.

Figure 16:
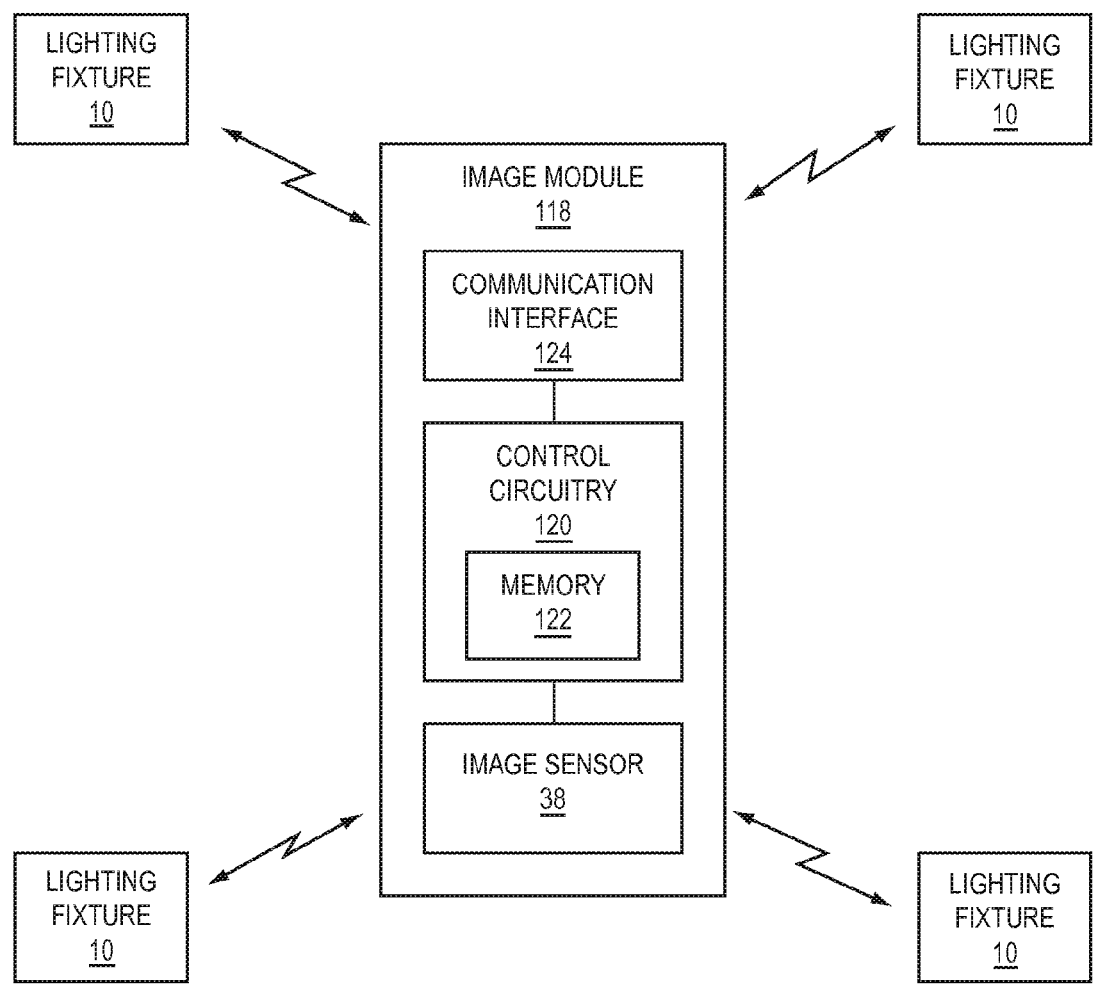
FIG. 16 illustrates a block diagram of an image module according to one embodiment of the disclosure.

With reference to FIG. 16, one or more lighting fixtures 10 may be associated with a remotely located image module 118. The image module 118 will include an image sensor 38 and is configured to communicate with the lighting fixtures 10 over a wired or wireless network to facilitate operation that is analogous to that described above. Assuming the lighting fixtures 10 and the image module 118 are located in the same general vicinity, such as a conference room or outdoor parking lot, the image module 118 may capture image data and send the image data to the lighting fixtures 10 for processing. As such, the image module 118 can act as an ambient light sensor, occupancy sensor, security camera, or any combination thereof for the lighting fixtures 10. The lighting fixtures 10 will individually or collectively process the image data and make lighting decisions based on the image data. Alternatively, the image module 118 may process the image data, make lighting decisions based on the image data, and send instructions to the lighting fixtures 10, wherein the lighting fixtures 10 will control their light output based on the instructions.

The image module 118 and the associated lighting fixtures 10 may communicate with each other to ensure that images are captured at appropriate times. For example, the images may need to be captured when the lighting fixtures are:
 a. in the on state;
 b. in the off state;
 c. emitting light that is the same as the light used for general illumination;
 d. emitting light that is specially configured with a desired output level, color spectrum, or both for image capture (and different from the general illumination light); and
 e. emitting light during an active period when using PWM drive signals.

The timing of image capture and the characteristics of the light emitted during image capture may be controlled by the image module 118, the lighting fixtures 10, or combination thereof. The synchronization of the image capture periods at the image modules 118 with emission of light with the desired characteristics at the lighting fixtures 10 can be done with various synchronization techniques, as will be appreciated by those skilled in the art.

One method to synchronize the image capture and light is to calibrate the clocks of the image module 118 and the lighting fixtures 10. A calibration sequence can measure the communication latency by pulsing 'on' one lighting fixture 10 at a time and recognizing the change in light level with the image sensor 38. In normal operation, the time of image capture is coordinated between the image module 118 and lighting fixtures 10 using the communication latency to synchronize the local clocks.

The image module 118 will include control circuitry 120 that has memory 122 that is sufficient to hold the software and data necessary for operation. The control circuitry 120 is associated with the image sensor 38 and at least one communication interface 124 that is configured to support wired or wireless communications directly or indirectly through an appropriate network (not shown) with the lighting fixtures 10.

Figure 17:
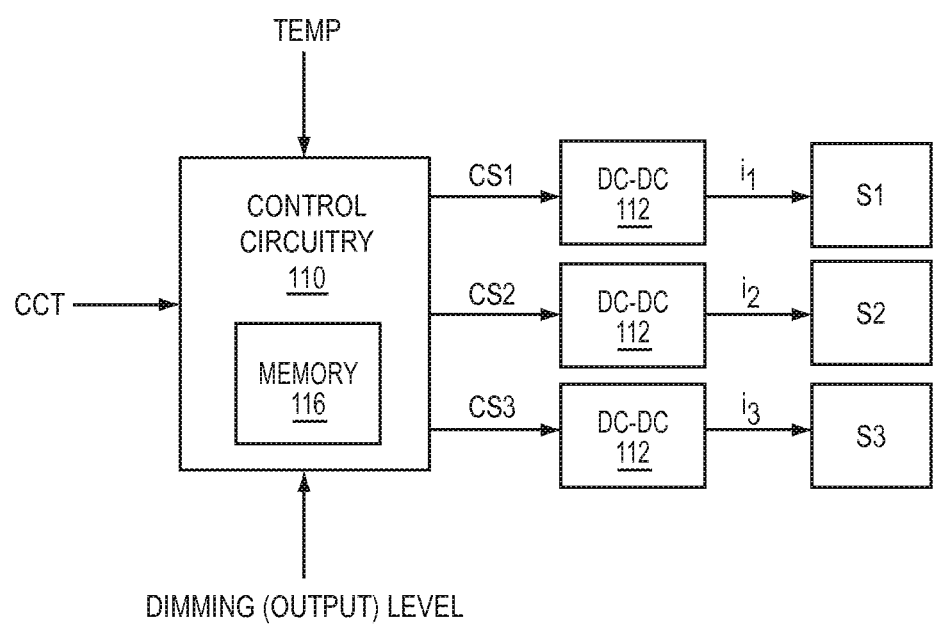
FIG. 17 illustrates a functional schematic of the driver module of FIG. 14.

With reference to FIG. 17, an exemplary way to control the currents $i_1$, $i_2$, and $i_3$, which are provided to the respective LED strings S1, S2, and S3 is illustrated, such that the color and CCT of the overall light output can be finely tuned over a relatively long range and throughout virtually any dimming level. As noted above, the control circuitry 110 generates control signals CS1, CS2, and CS3, which control the currents $i_1$, $i_2$, and $i_3$. Those skilled in the art will recognize other ways to control the currents $i_1$, $i_2$, and $i_3$.

In essence, the control circuitry 110 of the driver circuitry 40 is loaded with a current model in the form of one or more functions (equations) or look up tables for each of the currents $i_1$, $i_2$, and $i_3$. Each current model is a reference model that is a function of dimming or output level, temperature, and CCT. The output of each model provides a corresponding control signal CS1, CS2, and CS3, which effectively sets the currents $i_1$, $i_2$, and $i_3$ in the LED strings S1, S2, and S3. The three current models are related to each other. At any given output level, temperature, and CCT, the resulting currents $i_1$, $i_2$, and $i_3$ cause the LED strings S1, S2, and S3 to emit light, which when combined, provides an overall light output that has a desired output level and CCT, regardless of temperature. While the three current models do not need to be a function of each other, they are created to coordinate with one another to ensure that the light from each of the strings S1, S2, and S3 mix with one another in a desired fashion.

Figure 18:
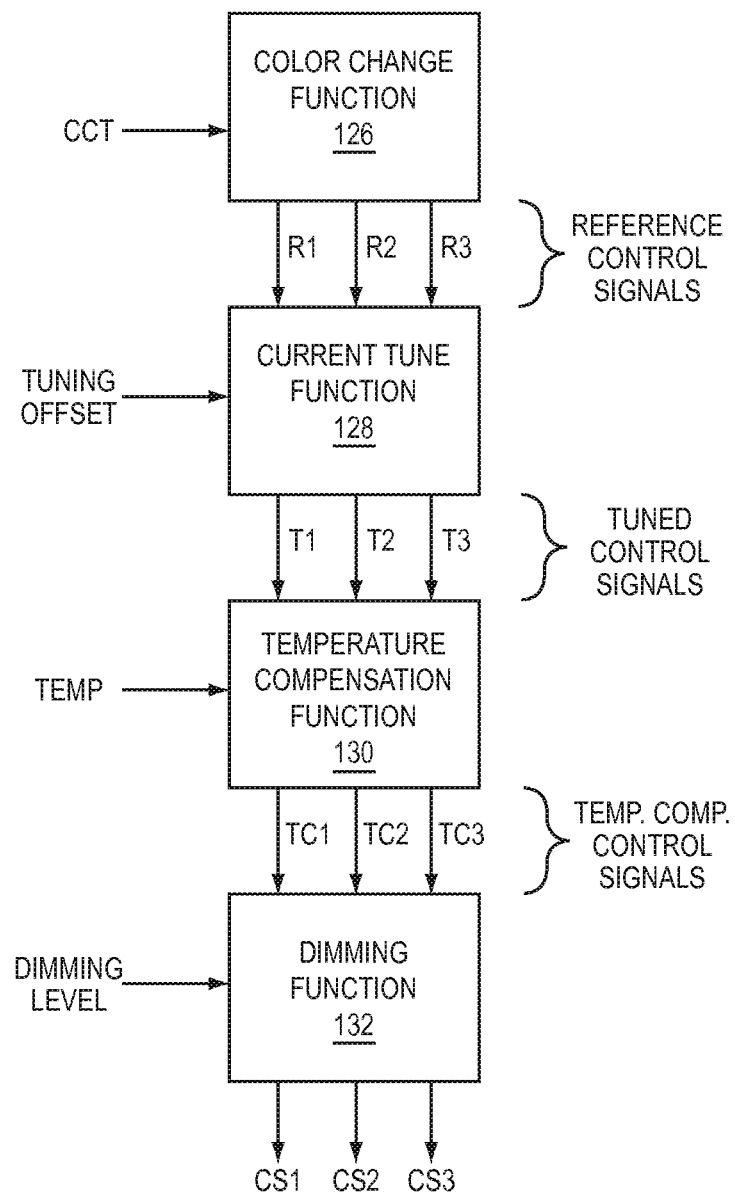
FIG. 18 is a flow diagram that illustrates the functionality of the driver module according to one embodiment.

With reference to FIG. 18, an exemplary process for generating the control signals CS1, CS2, and CS3 is provided. Initially, assume that the current models are loaded in the memory 116 of the control circuitry 110. Further assume that the current models are reference models for the particular type of lighting fixture 10.

Further assume that the desired CCT is input to a color change function 126, which is based on the reference models. The color change function 126 selects reference control signals R1, R2, and R3 for each of the currents $i_1$, $i_2$, and $i_3$ based on the desired CCT. Next, the reference control signals R1, R2, and R3 are each adjusted, if necessary, by a current tune function 128 based on a set of tuning offsets. The turning offsets may be determined through a calibration process during manufacturing or testing and uploaded into the control circuitry 110. The tuning offset correlates to a calibration adjustment to the currents $i_1$, $i_2$, and $i_3$ that should be applied to get the CCT of the overall light output to match a reference CCT. Details about the tuning offsets are discussed further below. In essence, the current tune function 128 modifies the reference control signals R1, R2, and R3 based on the tuning offsets to provide tuned control signals T1, T2, and T3.

In a similar fashion, a temperature compensation function 130 modifies the tuned control signals T1, T2, and T3 based on the current temperature measurements to provide temperature compensated control signals TC1, TC2, and TC3. Since light output from the various LEDs 82 may vary in intensity and color over temperature, the temperature compensation function 130 effectively adjusts the currents $i_1$, $i_2$, and $i_3$ to substantially counter the effect of these variations. The temperature sensor $S_T$ may provide the temperature input and is generally located near the LED array 19.

Finally, a dimming function 132 modifies the temperature compensated control signals TC1, TC2, and TC3 based on the desired dimming (output) levels to provide the controls signals CS1, CS2, and CS3, which drive the DC-DC converters 112 to provide the appropriate currents $i_1$, $i_2$, and $i_3$ to the LED strings S1, S2, and S3. Since light output from the various LEDs 82 may also vary in relative intensity and color over varying current levels, the dimming function 132 helps to ensure that the CCT of the overall light output corresponds to the desired CCT and intensity at the selected dimming (output) levels.

A wall controller, commissioning tool 42, or other lighting fixture 10 may provide the CCT setting and dimming levels. Further, the control circuitry 110 may be programmed to set the CCT and dimming levels according to a defined schedule, state of the occupancy and ambient light sensors $S_O$ and $S_A$, other outside control input, time of day, day of week, date, or any combination thereof. For example, these levels may be controlled based on a desired efficiency or correlated color temperature.

These levels may be controlled based the intensity (level) and/or spectral content of the ambient light, which is measured by analyzing image data retrieved from the image sensor 38. When controlled based on spectral content, the dimming or CCT levels may be adjusted based on the overall intensity of the ambient light. Alternatively, the dimming levels, color point, or CCT levels may be adjusted to either match the spectral content of the ambient light or help fill in spectral areas of the ambient light that are missing or attenuated. For example, if the ambient light is deficient in a cooler area of the spectrum, the light output may be adjusted to provide more light in that cooler area of the spectrum, such that the ambient light and light provided by the lighting fixtures 10 combine to provide a desired spectrum. CCT, dimming, or color levels may also be controlled based on power conditions (power outage, battery backup operation, etc.), or emergency conditions (fire alarm, security alarm, weather warning, etc.).

Figure 19:
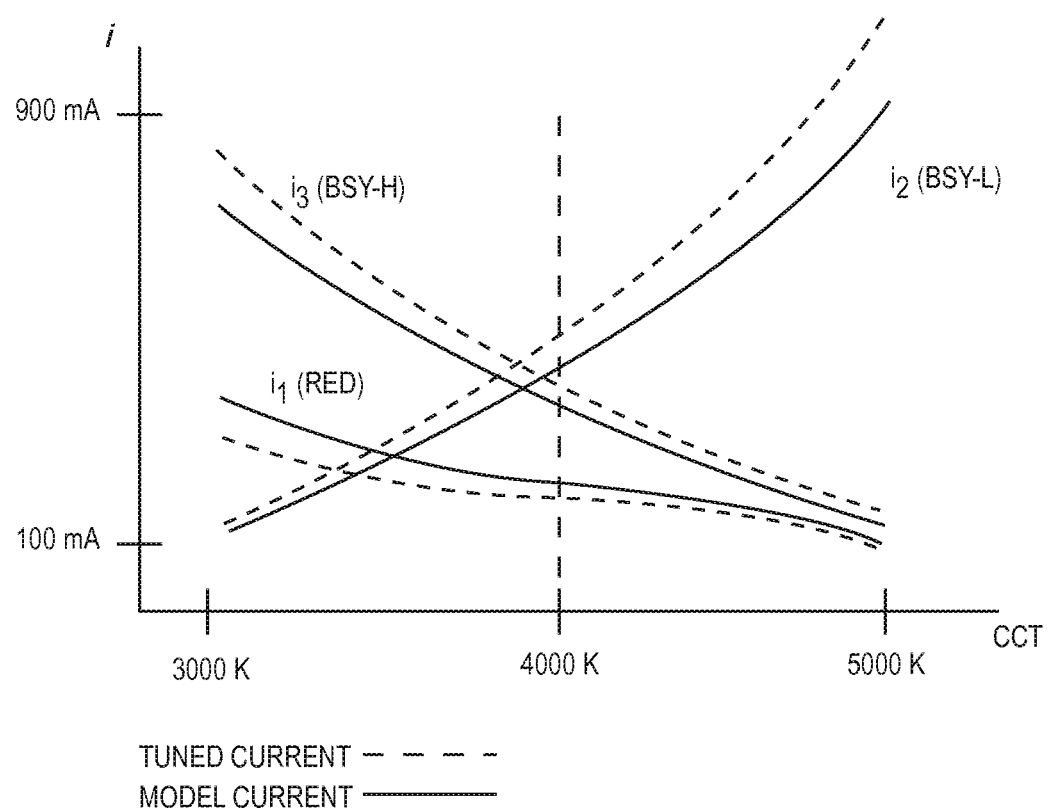
FIG. 19 is a graph that plots individual LED current versus CCT for overall light output according to one embodiment.

As noted, the tuning offset is generally determined during manufacture, but may also be determined and loaded into the lighting fixture 10 in the field. The tuning offset is stored in memory 116 and correlates to a calibration adjustment to the currents $i_1$, $i_2$, and $i_3$ that should be applied to get the CCT of the overall light output to match a reference CCT. With reference to FIG. 19, exemplary current curves are provided for reference (pre-tuned) currents and tuned (post-tuned) currents $i_1$, $i_2$, and $i_3$ over a CCT range of about 3000 K to 5000 K. The reference currents represent the currents $i_1$, $i_2$, and $i_3$ that are expected to provide a desired CCT in response to the reference control signals R1, R2, and R3 for the desired CCT. However, the actual CCT that is provided in response to the reference currents $i_1$, $i_2$, and $i_3$ may not match the desired CCT based on variations in the electronics in the driver circuitry 40 and the LED array 19. As such, the reference currents $i_1$, $i_2$, and $i_3$ may need to be calibrated or adjusted to ensure that the actual CCT corresponds to the desired CCT. The tuning offset represents the difference between the curves for the model and tuned currents $i_1$, $i_2$, and $i_3$.

For single-point calibration, the tuning offset may be fixed multipliers that can be applied over the desired CCT range for the corresponding reference currents $i_1$, $i_2$, and $i_3$. Applying the fixed multipliers represents multiplying the reference currents $i_1$, $i_2$, and $i_3$ by corresponding percentages. In FIG. 12, the tuning offsets for the reference currents $i_1$, $i_2$, and $i_3$ may be 0.96 (96%), 1.04 (104%), and 1.06 (106%), respectively. As such, as reference currents $i_2$, and $i_3$ increase, the tuned currents $i_2$, and $i_3$ will increase at a greater rate. As reference current $i_1$ increases, the tuned current $i_1$ will increase at a lessor rate.

For example, a single calibration may take place at 25 C and a CCT of 4000 K wherein the tuning offsets are determined for each of the currents $i_1$, $i_2$, and $i_3$. The resultant tuning offsets for the currents $i_1$, $i_2$, and $i_3$ at 25 C and 4000 K may be applied to the respective model current curves. The effect is to shift each current curve up or down by a fixed percentage. As such, the same tuning offsets that are needed for currents $i_1$, $i_2$, and $i_3$ at 4000 K are applied at any selected CCT between 3000 K and 5000 K. The tuning offsets are implemented by multiplying the reference control signals R1, R2, and R3 by a percentage that causes the currents $i_1$, $i_2$, and $i_3$ to increase or decrease. As noted above, the reference control signals R1, R2, and R3 are altered with the tuning offsets to provide the tuned control signals T1, T2, and T3. The tuned control signals T1, T2, and T3 may be dynamically adjusted to compensate for temperature and dimming (output) levels.

While the fixed percentage-based tuning offsets may be used for calibration and manufacturing efficiency, other tuning offsets may be derived and applied. For example, the tuning offsets may be fixed magnitude offsets that are equally applied to all currents regardless of the CCT value. In a more complex scenario, an offset function can be derived for each of the currents $i_1$, $i_2$, and $i_3$ and applied to the control signals CS1, CS2, and CS3 over the CCT range.

The lighting fixture 10 need not immediately change from one CCT level to another in response to a user or other device changing the selected CCT level. The lighting fixture 10 may employ a fade rate, which dictates the rate of change for CCT when transitioning from one CCT level to another. The fade rate may be set during manufacture, by the commissioning tool 42, wall controller, or the like. For example, the fade rate could be 500 K per second. Assume the CCT levels for a 5% dimming level and a 100% dimming level are 3000 K and 5000 K, respectively. If the user or some event changed the dimming level from 5% to 100%, the CCT level may transition from 3000 K to 5000 K at a rate of 500 K per second. The transition in this example would take two seconds. The dimming rate may or may not coincide with the CCT fade rate. With a fade rate, changes in the selected CCT level may be transitioned in a gradual fashion to avoid abrupt switches from one CCT level to another.

Figure 20:
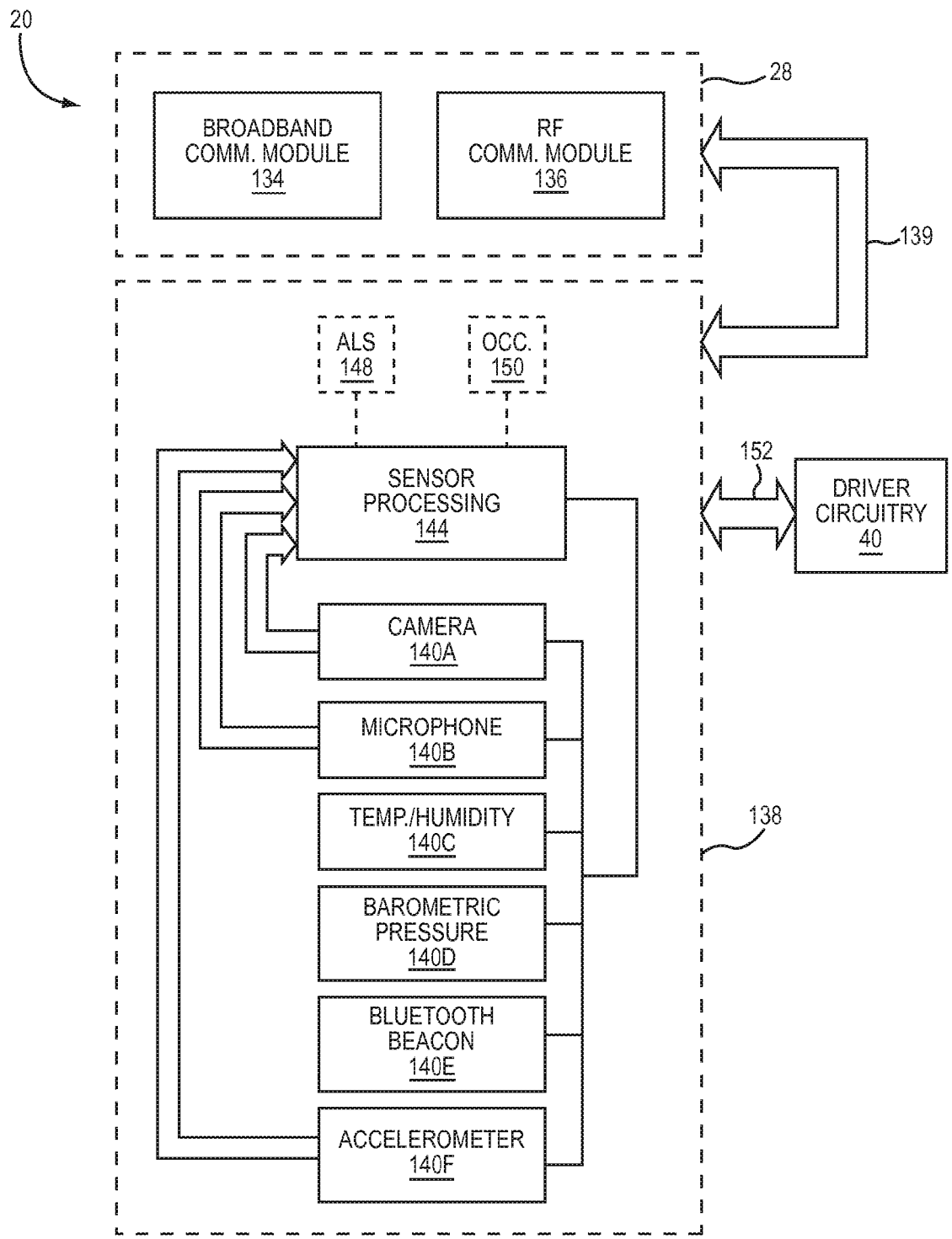
FIG. 20 illustrates a sensor module according to one embodiment of the present disclosure.

FIG. 20 shows the sensor module 20 according to an additional embodiment of the present disclosure. As shown in FIG. 20, the sensor module 20 includes the communications circuitry 28, which may include a broadband connectivity module 134 and a radio frequency (RF) communications module 136. The broadband connectivity module 134 may provide wired and/or wireless communication capability to the sensor module 20 for example, via WiFi, Bluetooth, Ethernet, or the like. The RF communications module 136 may provide additional wired and/or wireless connectivity, for example, via IEEE 802.15.4 lightweight mesh networking or any other network protocol. In general, the communications circuitry 28 may include any number of connectivity modules, which may provide additional communications capability in the sensor module 20.

The sensor module 20 also includes a sensor module 138, which may be coupled to the communications circuitry 28 via a communications bus 139 and may include any number of sensors 140. For example, the sensor module 138 may include a camera 140A, a microphone 140B, a temperature and/or humidity sensor 140C, a barometric pressure sensor 140D, an optional Bluetooth low energy (LE) beacon sensor 140E, and an accelerometer 140F. The various sensors 140 may be connected to sensor processing circuitry 142, for example, via a serial communications bus 142 such as an I²C communications bus. Further, certain ones of the sensors 140, such as the camera 140A, the microphone 140B, and the accelerometer 140F may be separately coupled to the sensor processing circuitry 144 via separate high-bandwidth busses 146, as required by the particular output of the sensors 140. An optional ambient light sensor (ALS) 214 and occupancy (OCC) sensor 150 may also be coupled to the sensor processing circuitry 144, and may be used to debug and/or configure one or more aspects of the sensor module 138. For example, the ALS 148 and the OCC sensor 150 may be used to calibrate the camera 140A in order to ensure that the camera 140A correctly measures ambient light and/or occupancy as discussed in detail above. In another embodiment, the ALS 148 and OCC sensor 150 may be used in conjunction with the camera 140A in order to enable more accurate or complete measurements of ambient light and/or occupancy. In yet another embodiment, the ALS 148 and the OCC sensor 150 may be used in place of the camera 140A for ambient light and/or occupancy sensing. In such an embodiment, the camera 140A may be used to perform other functions, or may be disabled altogether. The sensor module 138 may additionally be coupled to the driver circuitry 40 via a combined power and communications bus 152, such that the driver circuitry 40 supplies power to the sensor module 138. In some embodiments, the driver circuitry 40 may be included in the sensor module 20, such that the driver circuitry 40 either replaces or supplements driver circuitry 40 already found in the lighting fixture 10.

While the embodiments above are primarily discussed with respect to the lighting fixture 10 discussed above in FIGS. 1A through 3C, these concepts can be used in any number of different lighting fixtures. FIG. 21 is a perspective view of an additional type of lighting fixture 154 that may be used along with the principles of the present disclosure. The lighting fixture 154 shown in FIG. 21 is built to fit into a rectangular opening in a ceiling having a length-to-width ratio of 1:1, although it is understood that other systems may be designed for openings having other shapes and dimensions. In particular, the lighting fixture 154 is built to be recessed into a drop-tile ceiling, such as that found in many commercial establishments, with a bottom surface of the lighting fixture 154 resting on a horizontal lip of a T-grid, which supports the ceiling tiles. Here, a ceiling tile 156 remains as a functional part of the lighting fixture 154, serving as a reflective back surface of the lighting fixture 154.

FIG. 22 is a perspective view of the lighting fixture 154 removed from the ceiling. A housing 158 is mounted to the ceiling around the perimeter of the ceiling opening. The housing 158 can comprise multiple discrete segments and provides the base structure to which one or more light panels 160 can be attached. In this embodiment, the housing 158 comprises four segments, namely, four side frames 158A that are arranged along only the perimeter of the lighting fixture 154, defining an open central area 162 inside the housing 158. Thus, this particular lighting fixture 154 is a 2 ft. by 2 ft. lighting fixture with four 2 ft. light panels 160 around the interior perimeter of the lighting fixture. Here, the light panels 160 substantially span the entire interior edge of the perimeter of the ceiling opening. These light panels 160 are shaped and positioned to emit at least some light toward the central area 162 and into the room below. The four light panels 160 are arranged to provide a perimeter-in light distribution that is characterized by an even quadrilateral floor distribution with minimal light output at high angles.

It may be desirable in some applications to paint visible portions of the housing 158. The housing 158 may be painted to match the ceiling environment or a particular color scheme, or it may be painted white to improve reflectivity.

The lighting fixture 154 (and some of the other lighting fixtures discussed herein) illuminates a room from the edge of the T-grid rather than from the center of the lighting fixture, which offers a more uniform output. The central area 162 of inside the lighting fixture 154 remains open. As shown in FIG. 21, the ceiling tile 156 may be laid over the top of the lighting fixture 154 such that light that passes through the open space will be reflected back into the room environment. That is, the ceiling tile 156 may be used as a reflective back surface. In some embodiments, it may be desirable to dispose a reflective sheet or panel between the housing 158 and the ceiling tile 156 to provide a more reflective back surface, especially if the ceiling tile 156 is a poor reflector. In other embodiments, other materials may be used between the housing 158 and the ceiling tile 156 such as gels, filters, or diffusers, for example. These materials may be employed as lay-ins, or they may be applied directly to a surface of the ceiling tile 156 or another surface.

In this rectangular configuration, the light panels 160 abut one another at their ends in a mitered corner. An angled joint cap 164 is positioned at each joint to finish the lens and create a more visually appealing transition between the light panels 160. As noted, the ceiling tile 156 can remain as a functional component in the lighting fixture 154, for example, as a reflective illuminated surface. The housings of other embodiments disclosed herein have additional types of frame components, such as side frames and end frames, for example.

Figure 23:
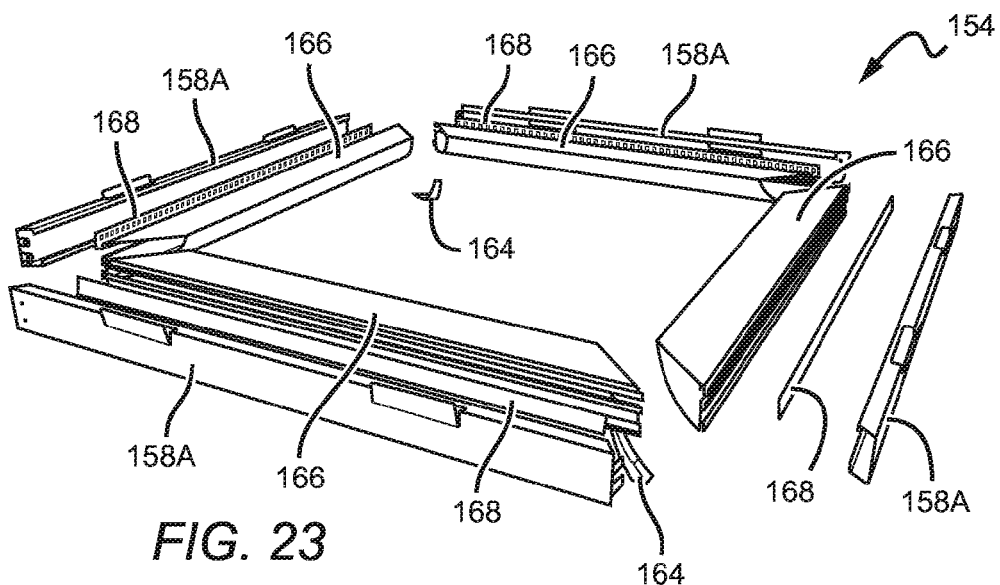
FIG. 23 illustrates a lighting fixture according to one embodiment of the present disclosure.
Figure 25:
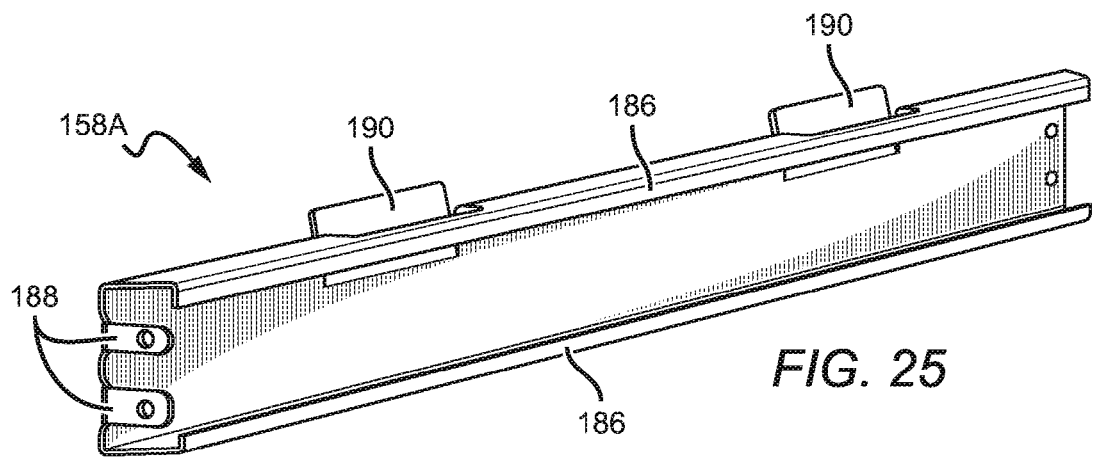
FIG. 25 illustrates a portion of a lighting fixture according to one embodiment of the present disclosure.

FIG. 23 is an exploded view of the lighting fixture 154. As shown, the housing 158, which in this embodiment comprises four side frames 158A arranged in a rectangular configuration, defines the perimeter of the structure. Other embodiments include different types of housing segments as discussed below. The modular versatility of the housing 158 assembly allows lighting fixtures to be arranged in a variety of configurations, several of which are discussed herein. The light panels 160 are mounted to the interior-facing portion of the side frames 158A. Each light panel 160 comprises an elongated lens 166 and a light strip 168 which is held in place by the lens 166 as best shown in FIG. 25.

Figure 24:
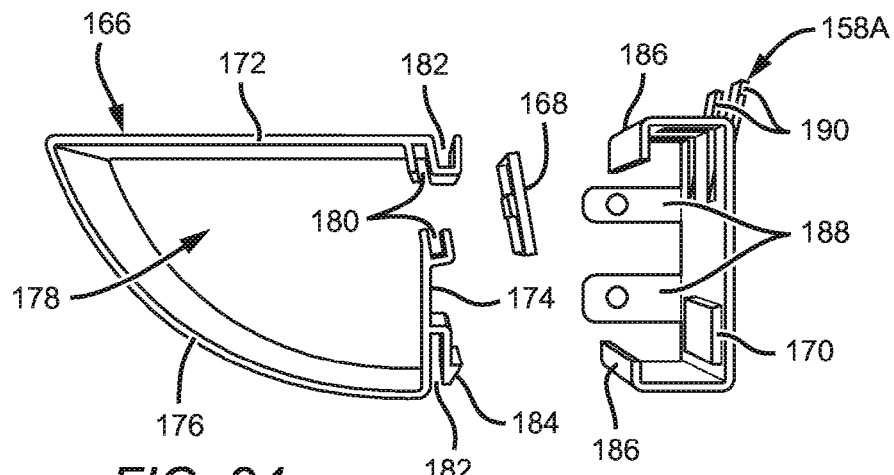
FIG. 24 illustrates a portion of a lighting fixture according to one embodiment of the present disclosure.

FIG. 24 is an exploded view of the light panel 160 (i.e., the lens 166 and the light strip 168) and the side frame 158A, and further showing driver circuitry 170 that may be provided in the side frame 158A. The lens 166 includes a first structural side 172, a second structural side 174, and a light-transmissive exit side 176. The first structural side 172, the second structural side 174, and the light-transmissive exit side 176 define a partially enclosed interior optical cavity 178. The distal ends of the first structural side 172 and the second structural side 174 (i.e., the ends not joined to the exit side 116) are cooperatively shaped to form a slot 180 that receives the light strip 168. The light strip 168 may be slid into the slot 180 prior to or after fastening the lens 166 to the side frame 158A, providing for easy maintenance or replacement of the light strip 168 or individual sources thereon. The first structural side 172 and the second structural side 174 also comprise flanges that define channels 182 for receiving the side frame 158A. The flange on the second structural side 174 comprises a barbed leg 184 for snap-fit attachment to the side frame 158A.

In some embodiments, the light strips 168 can comprise a linear array of light emitting diodes (LEDs), although it is understood that other light sources can also be used. Details of operation of the LEDs are discussed above.

The side frame 158A may have a c-shaped cross section as shown. The side frame 158A includes flanges 186 shaped to mate with the channels 182 of the lens 166. The side frame 158A also includes tabs 188 for mounting the lighting fixture to an external surface or for connecting to other housing components. A number of stops 190 protrude above the top surface of the side frame 158A to provide a surface for the ceiling tile 156 to rest against, holding it in place above the lighting fixture 154, as best shown in FIG. 25.

FIG. 25 is a cross sectional view of one side of the lighting fixture 154. Here, the light panel 160 is attached to and supported by the side frame 158A. The flanges 186 of the side frame 158A are mated with the channels 182 of the lens 166. The barbed leg 184 may engage with a hole on the side frame 158A (not shown) to provide a snap-fit attachment mechanism.

Figure 26:
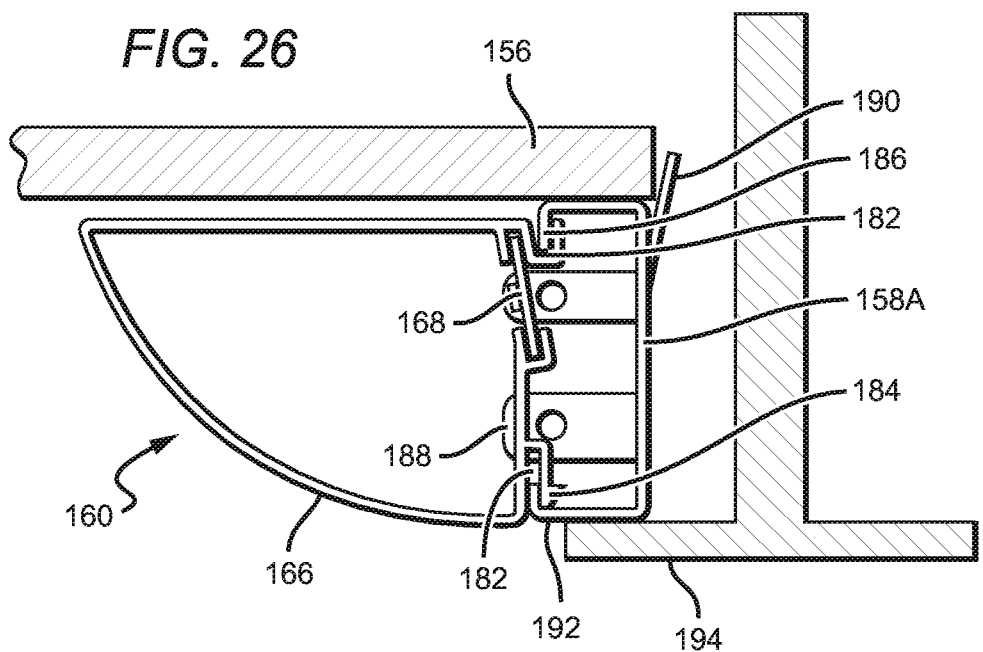
FIG. 26 illustrates a portion of a lighting fixture according to one embodiment of the present disclosure.

FIG. 26 is a perspective view of the side frame 158A which may be used in embodiments of the present disclosure. The side frame 158A is shown recess mounted in a drop-tile ceiling such that a bottom surface 192 of the housing 158 is resting on a horizontal lip 194 of the ceiling T-grid. It is understood that the lighting fixture 154 can be mounted in other ways including surface mount, suspension mount, or pendant mount, for example. In this particular embodiment, the ends of the side frame 158A are beveled to 45° so that they can attach with adjacent segments of the housing 158 with a miter joint. The c-shaped cross section provides an interior space that can house, for example, the light panel 160, driver circuitry 170 (as shown above in FIG. 25), and/or various other components. The side frame 158A may be constructed of various materials, with some suitable materials being sheet metal or polycarbonate (PC), for example.

Figure 27:
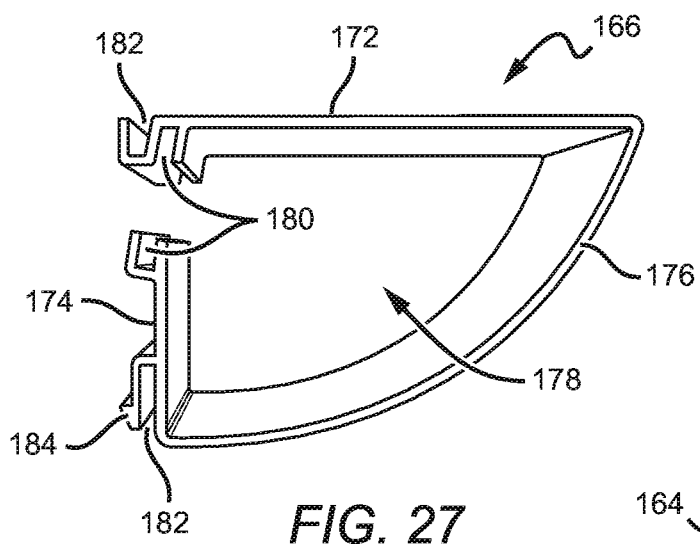
FIG. 27 illustrates a portion of a lighting fixture according to one embodiment of the present disclosure.

FIG. 27 is a close-up perspective view of one end of the elongated lens 166 which may be used in embodiments of the present disclosure. The lens 166 comprises the first structural side 172, the second structural side 174, and the light-transmissive exit side 176, which join to define the partially enclosed optical cavity 178. The distal ends of the first structural side 172 and the second structural side 174 are cooperatively shaped to form a slot 180 that receives the light strip 168. The first structural side 172 and the second structural side 174 also comprise the flanges 186 that define the channels 182 for receiving the side frame 158A. The flange 186 on the second structural side 174 comprises a barbed leg 184 for snap-fit attachment to the side frame 158A. The lens 166 may be constructed using various materials, with one suitable material being polycarbonate, for example. The lens 166 may be extruded to different lengths to accommodate lighting fixtures of various sizes and configurations. In some embodiments, the lens 166 may include diffusive elements.

The lens 166 performs a dual function; it both protects components within the optical cavity 178 and shapes and/or diffuses the outgoing light. In one embodiment, the lens 166 comprises a diffusive element. The diffusive lens 166 functions in several ways. For example, it can prevent direct visibility of the components within the lens 166 and provide additional mixing of the outgoing light to achieve a visually pleasing uniform source. However, a diffusive exit lens can introduce additional optical loss into the system. Thus, in embodiments where the light is sufficiently mixed internally by other elements, a diffusive exit lens may be unnecessary. In such embodiments, a transparent or slightly diffusive exit lens may be used, or the lens may be removed entirely. In still other embodiments, scattering particles may be included in the exit lens 166.

Diffusive elements in the lens 166 can be achieved with several different structures. A diffusive film inlay (not shown) can be applied to a surface of the exit side 116 of the lens 166. It is also possible to manufacture the lens 166 to include an integral diffusive layer, such as by coextruding the two materials or by insert molding the diffuser onto the exterior or interior surface. A clear lens 166 may include a diffractive or repeated geometric pattern rolled into an extrusion or molded into the surface at the time of manufacture. In another embodiment, the lens 166 material itself may comprise a volumetric diffuser, such as an added colorant or particles having a different index of refraction, for example.

In certain embodiments, the lens 166 may be used to optically shape the outgoing beam with the use of microlens structures, for example. Microlens structures are discussed in detail in U.S. patent application Ser. No. 13/442,311 to Lu, et al., which is commonly assigned with the present application to Cree, Inc. and incorporated by reference in its entirety herein.

Figure 28:
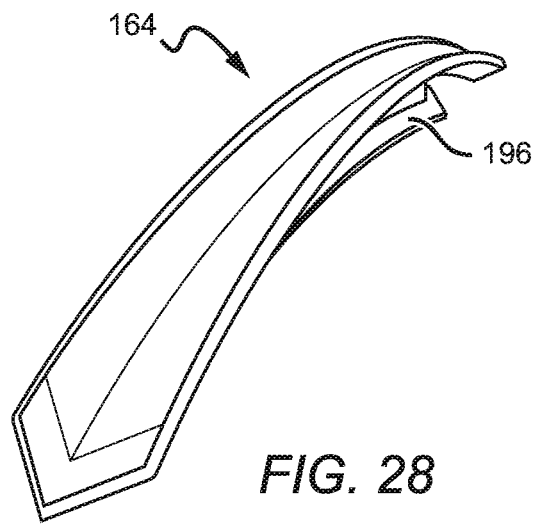
FIG. 28 illustrates a portion of a lighting fixture according to one embodiment of the present disclosure.

FIG. 28 is a close-up perspective view of an angled joint cap 164 that may be used in embodiments of the present disclosure. When assembled, as in the lighting fixture 154, the angled joint caps 164 are arranged between the adjacent light panels 160. The curve of the joint caps 164 mimics the curve of the exit side 116 of the lenses 166 with grooves 196 on both sides to receive the lenses 166. The joint caps 164 are used to finish the lenses 166, preventing light leakage from the ends of the lenses 166 and providing a smooth transition from one light panel 160 to the next. The joint caps 164 also allow for some manufacturing tolerance in the length of the lenses 166 used in the lighting fixture 154. Thus, the lenses 166 may have lengths that slightly deviate from the nominal length and still be incorporated into the assembly without sacrificing visual aesthetics. The joint caps 164 may be constructed from an opaque plastic for example and painted to match components of the housing 158. In other embodiments where the light panels do not abut one another, flat end caps (shown in FIG. 31) may be used to finish the lenses 166 at one or both ends.

Figure 29:
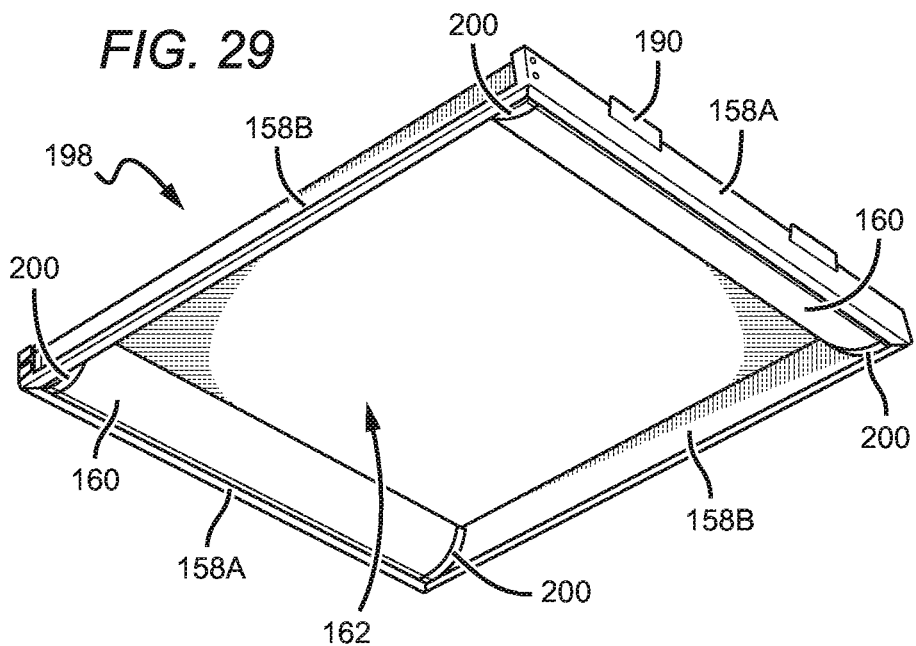
FIG. 29 illustrates a lighting fixture according to one embodiment of the present disclosure.

FIG. 29 is a perspective view of another lighting fixture 198 according to an embodiment of the present disclosure. The lighting fixture 198 has many common elements and is similar to the lighting fixture 154 in some respects. For ease of reference, the same reference numerals will be used to identify similar elements even though those elements are used in different embodiments. The lighting fixture 198 comprises two light panels 160 arranged at opposite ends of the rectangular housing 158. The light output of the lighting fixture 198 is characterized by an elliptical, symmetrical floor distribution, with the majority of the light along a linear path perpendicular to the lenses 166 and minimal light output at high angles.

In this embodiment, the housing 158 comprises two side frames 158A of a first type and two side frames 158B of a second type. The side frames 158B of the second type are connected to the side frames 158A of the first type at the respective ends and run there between, providing additional structure and shape to the housing 158. The light panels 160 are supported by the side frames 158A of the first type at both ends and are positioned on the interior side of the housing 158. In this embodiment, flat end caps 200 cover the ends of the lenses 166. The end caps 200 are used to finish the lenses 166, preventing light leakage from the ends of the lenses 166 and providing a gap-filling element between the lenses 166 and the side frames 158B of the second type. The end caps 200 also allow for some manufacturing tolerance in the length of the lenses 166 used in the lighting fixture 198.

Within the light panel, the light strip 168 (not shown in FIG. 29) is positioned to emit at least some light toward the exit side 116 of the lens 166. Thus, some of the light will be emitted from the light panel 160 into the room in a direction toward the center of the lighting fixture 198. A smaller portion of the light will be emitted in an upward direction, in some embodiments, toward a ceiling tile 156. The lighting fixture 198 provides an elliptical light output pattern, which is desirable in many environments.

Figure 30:
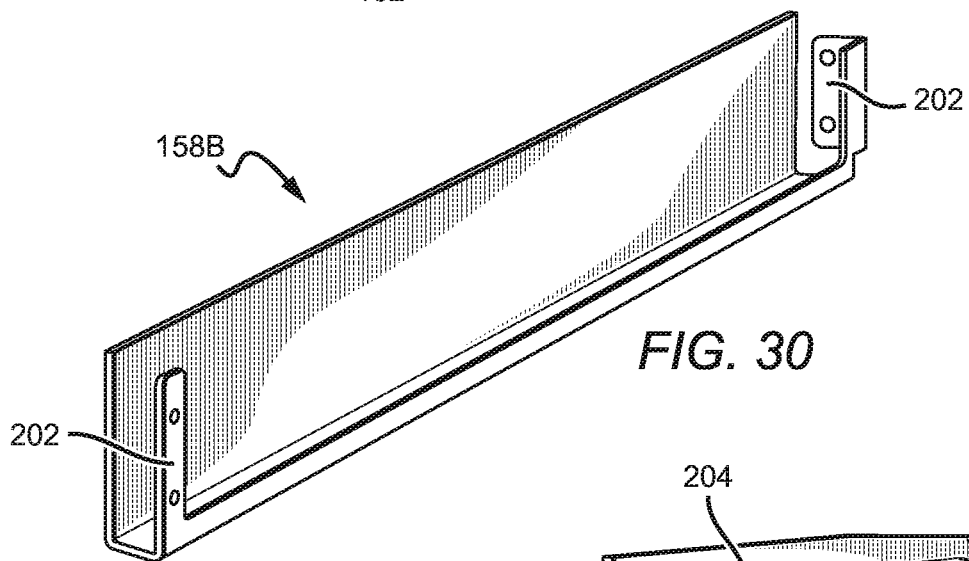
FIG. 30 illustrates a portion of a lighting fixture according to one embodiment of the present disclosure.

FIG. 30 is a close-up perspective view of the side frame 158B of the second type that may be used in embodiments of the present disclosure. The side frame 158B of the second type comprises mount tabs 202 for connecting to side frames 158A of the first type, or any other side frames or end frames. The side frames 158B of the second type add stability to the housing 158 and define the perimeter of the lighting fixture 198.

Figure 31:
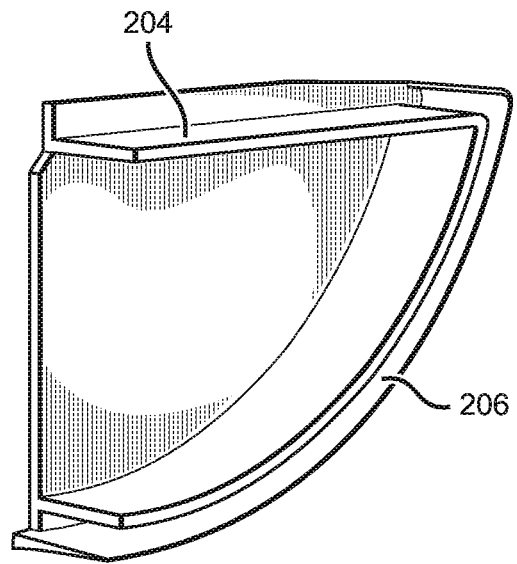
FIG. 31 illustrates a portion of a lighting fixture according to one embodiment of the present disclosure.

FIG. 31 is a close-up perspective view of an end cap 200 that may be used in embodiments of the present disclosure. The flat end caps 200 are used in those embodiments that include a joint between a side frame 158B of the second type and a side frame 158A of the first type, such as the lighting fixture 198, for example. The end caps comprise interior ridges 204 and exterior ridges 206 that mimic the contour of the exit side 116 of the lens 166. The interior ridges 204 and the exterior ridges 206 define a thin channel that is shaped and sized to receive an end of the lens 166. The end cap 200 may be constructed from an opaque material, such as PC, for example, and painted to match the color of the housing 158.

Figure 32:
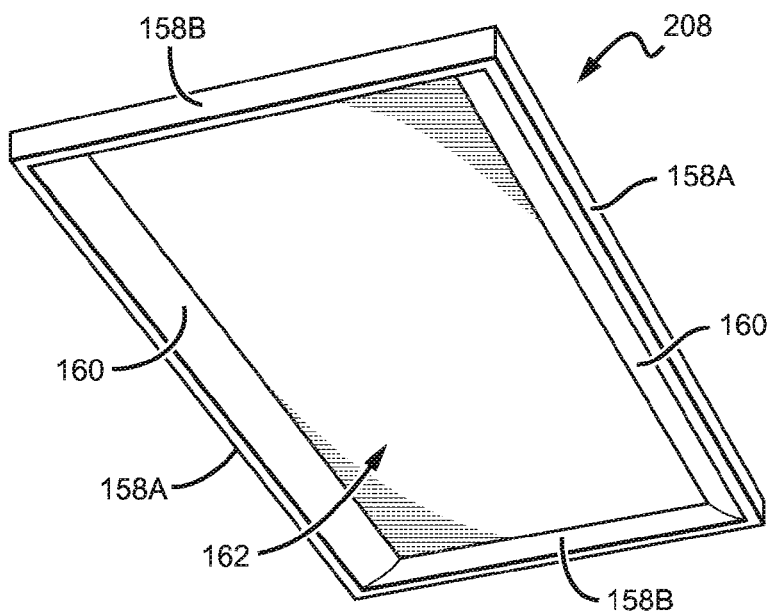
FIG. 32 illustrates a lighting fixture according to one embodiment of the present disclosure.

FIG. 32 is a perspective view of a lighting fixture 208 according to an embodiment of the present disclosure. The lighting fixture 208 is similar to the lighting fixture 198 in many respects and shares several elements in common. The lighting fixture 208 features a housing 158 with a 2:1 aspect ratio, with the side frames 158A of the first type being twice as long as the side frames 158B of the second type. In one embodiment, the side frames 158A of the first type and the light panels 160 attached thereto are 4 ft. long, and the side frames 158B of the second type are 2 ft. long. It is understood that the 2:1 aspect ratio is merely exemplary, and that the various components of the lighting fixtures disclosed herein can be adjusted to nearly any dimensions desired. Thus, lighting fixtures according to embodiments of the present disclosure can be tailored to meet dimensional specifications for many different applications.

Figure 33:
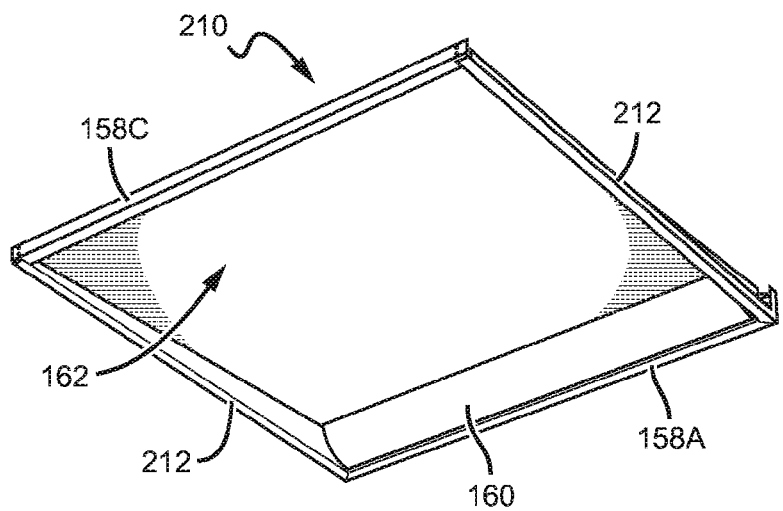
FIG. 33 illustrates a lighting fixture according to one embodiment of the present disclosure.

FIG. 33 is a perspective view of a lighting fixture 210 according to an embodiment of the present disclosure. The lighting fixture 210 is similar in many respects to the lighting fixture 154 and shares several elements in common. The lighting fixture 210 provides a directional light output that emanates from one side of the lighting fixture 210. Because such lighting fixtures are often mounted near a wall-ceiling junction and can disperse light along a wall, the lighting fixture 210 may sometimes be referred to as a "wall wash" configuration. The light output of the lighting fixture 210 is characterized by an asymmetric elliptical floor distribution with the majority of light directed to one side and minimal light emitted at high angles.

In this embodiment, the housing 158 comprises a side frame 158A, two angled side frames 212, and an end frame 158C. The light panel 160 is attached to the side frame 158A on one end of the lighting fixture 210. The angled side frames 210 are connected to the ends of the side frame 158A and extend out to connect the end frame 158C. Similarly as the lighting fixture 154, the lighting fixture 210 can be recess-mounted in the plenum by resting the bottom surface of the housing on the horizontal lip of a T-grid, in which case the light panel 160 would substantially span the entire interior edge of the perimeter of the ceiling opening. The lighting fixture 210 can also be mounted in other ways such as surface mounting, suspension mounting, and pendant mounting, for example.

Figure 34:
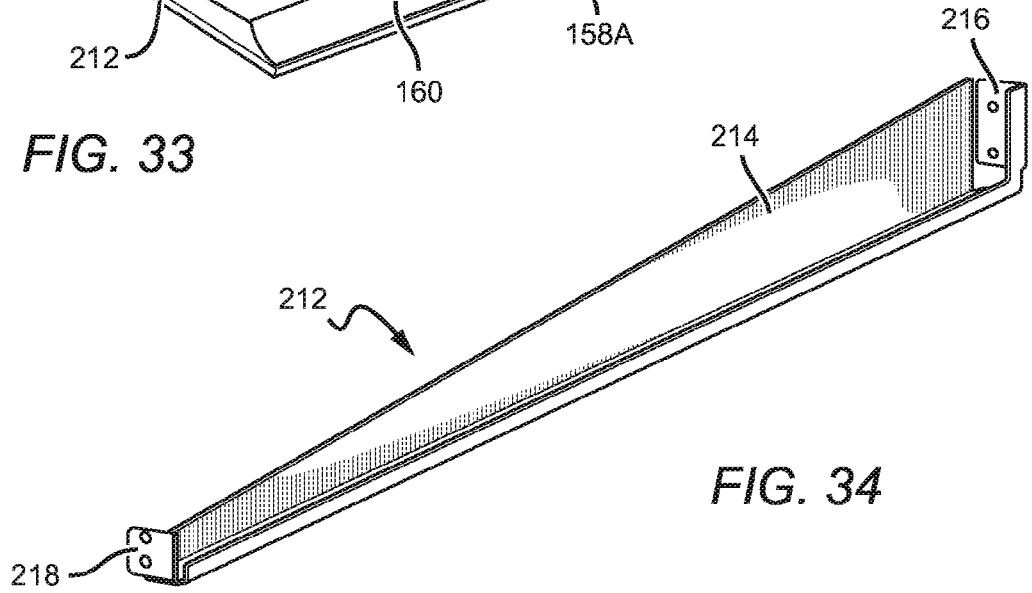
FIG. 34 illustrates a portion of a lighting fixture according to one embodiment of the present disclosure.

FIG. 34 is a close-up view of an angled side frame 212 that may be used in embodiments of the present disclosure. The angled side frame 212 is similar to the side frame 158A of the lighting fixture 154 except that the angled side frame 212 comprises a vertical portion 214 that tapers down as it extends away from a mount tab 216 on the end where the light panel 160 is disposed. A mount tab 218 at the end opposite the light panel 160 is designed to mount to the end frame 158C to complete the lighting fixture 210.

Figure 35:
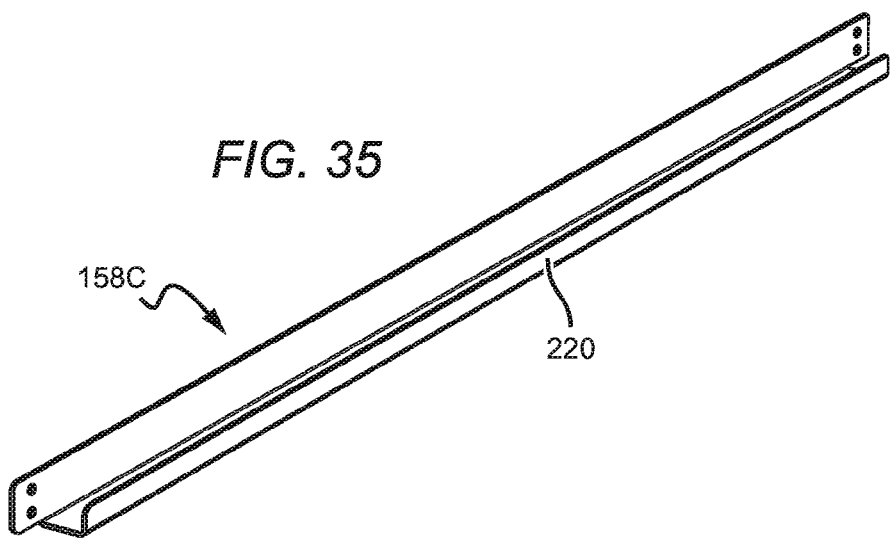
FIG. 35 illustrates a portion of a lighting fixture according to one embodiment of the present disclosure.

FIG. 35 is a close-up view of the end frame 158C that may be used in embodiments of the present disclosure. The end frame 158C is designed to mount at its ends to the angled side frames 212. The end frame 158C comprises a vertical ridge 220 that provides a resting surface for the ceiling tile 156.

Figure 36:
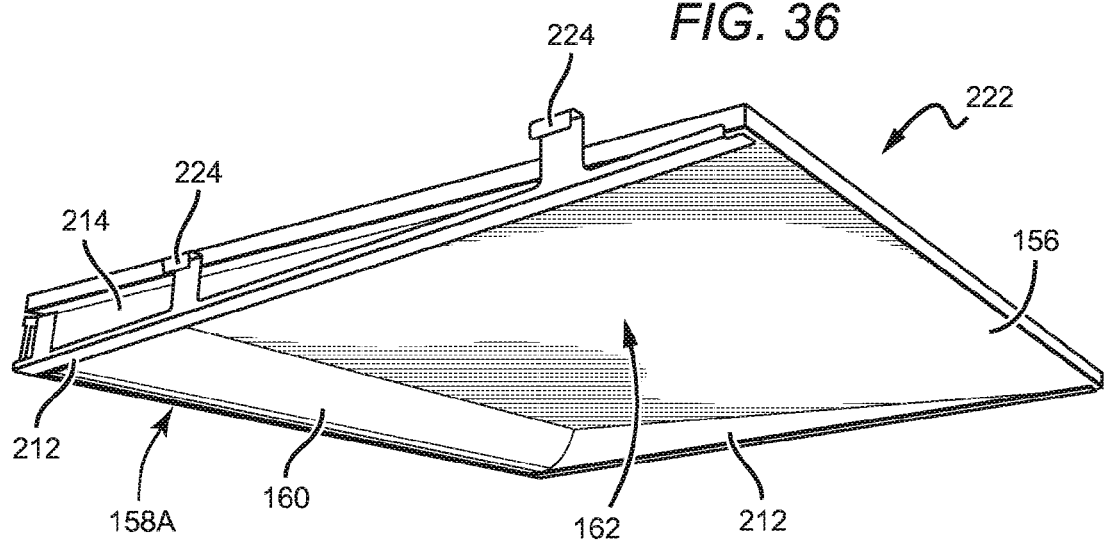
FIG. 36 illustrates a lighting fixture according to one embodiment of the present disclosure.

FIG. 36 is a perspective view of a lighting fixture 222 according to an embodiment of the present disclosure. The lighting fixture 222 is similar to the lighting fixture 210 in many respects and shares several common elements. The housing 158 in this embodiment comprises a side frame 158A and two angled side frames 212 connected at the ends of the side frame 158A and extending therefrom. These three components of the housing 158 define the open central area 162. Rather than close the housing 158 with an end frame 158C, the side of the housing 158 opposite the light panel 160 is left open in this embodiment. Thus, a ceiling tile 156 can rest on a top surface of the vertical portion 214 of the angled side frames 212 and function as a back surface of the lighting fixture 222. Because the angled side frames 212 taper down as they extend away from the side frame 158A, a ceiling tile 156 thereon will rest at an angle. Thus, some embodiments may include additional stop tabs (not shown) at the distal ends of the angled side frames 212 to keep the ceiling tile 156 from sliding down the side frames 212 as a result of vibrations. In this embodiment, the angled side frames 214 comprise hooks 224 that connect to an external structure to provide additional support for the lighting fixture 222 and to keep it from moving around in the presence of jolts or vibrations, such as an earthquake, for example. In some embodiments the hooks 224 can hang over the vertical portion of a T-grid. Other kinds of support or fastening mechanisms may also be used to secure the lighting fixture 222 to an external structure.

Figure 37:
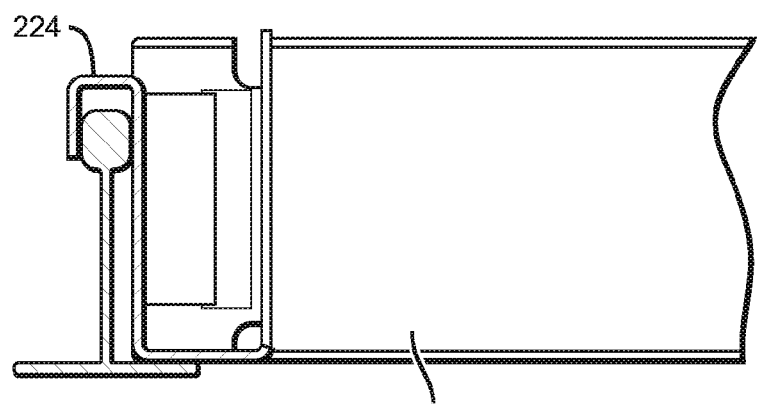
FIG. 37 illustrates a portion of a lighting fixture according to one embodiment of the present disclosure.

FIG. 37 is a cut-away view of a portion of the lighting fixture 222. The hook 224 is shown resting over the vertical portion of the T-grid. It is understood that hooks and other fastening mechanisms (e.g., clamps, clips, etc.) can be used in any lighting fixture according to embodiments of the present disclosure.

Figure 38:
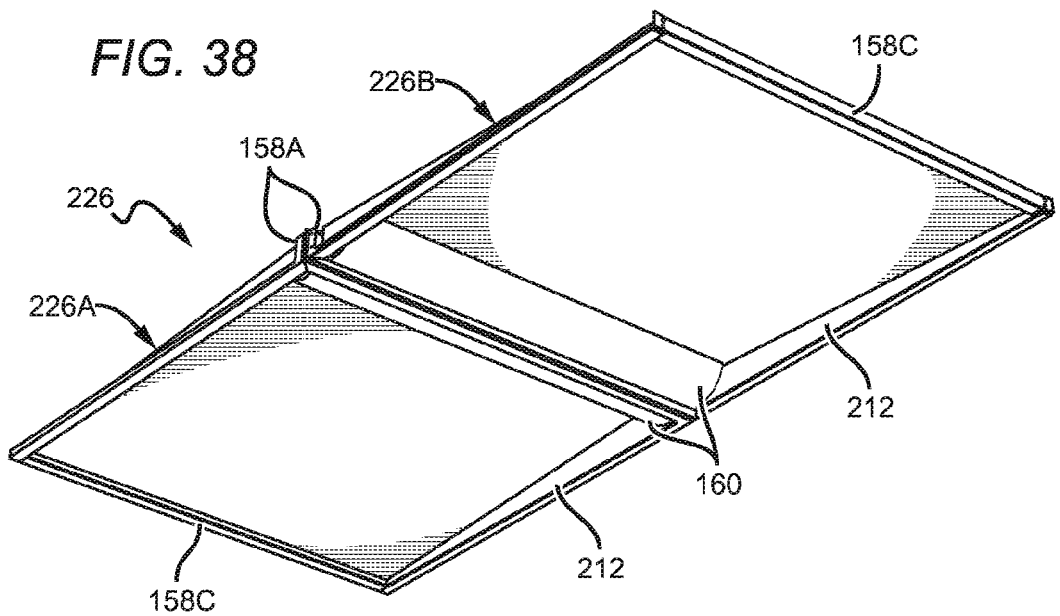
FIG. 38 illustrates a lighting fixture according to one embodiment of the present disclosure.

FIG. 38 is a perspective view of a modular lighting fixture 226 according to an embodiment of the present disclosure. In this embodiment, the modular lighting fixture 226 comprises a first wall-type lighting fixture 226A and a second wall-type lighting fixture 226B, each similar to the lighting fixture 210 in many respects, disposed in a back-to-back arrangement. Here the side frames 158A of both units are mounted to one another such that the light panels face in opposite directions as shown. It is understood that additional lighting fixtures can be added to the sides or the ends of the modular lighting fixture 226 to achieve a desired light output level or distribution. The lighting fixtures which compose the modular lighting fixture 226 can also be rotated to produce various light output profiles.

Figure 39:
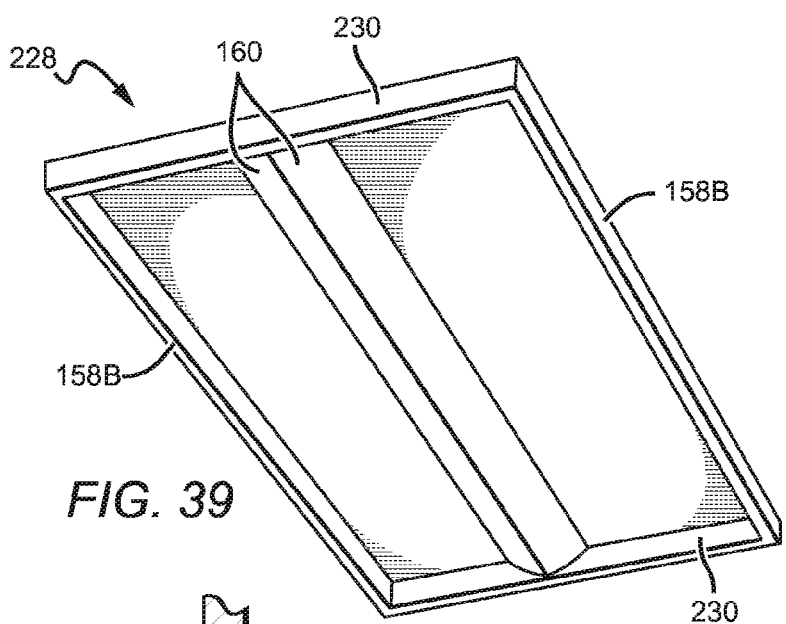
FIG. 39 illustrates a lighting fixture according to one embodiment of the present disclosure.

FIG. 39 is a perspective view of another lighting fixture 228 according to an embodiment of the present disclosure. The lighting fixture 228 comprises two light panels 160 mounted directly to one another in a back-to-back configuration. The housing 158 comprises two lens frames 230 and two side frames 158B of the second type. In this embodiment, the light panels 160 both connect to the lens frames 230 at a central point and extend away in a perpendicular direction, running between the two lens frames 230. Thus, the lighting fixture 228 provides a center-out light distribution as opposed to a perimeter-in distribution as in lighting fixture 154, for example.

Figure 40:
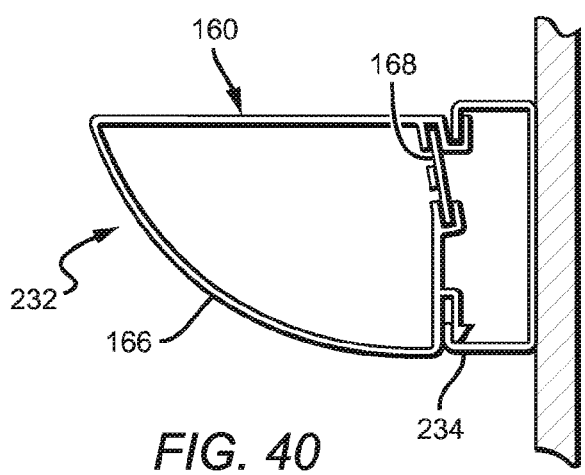
FIG. 40 illustrates a portion of a lighting fixture according to one embodiment of the present disclosure.

FIG. 40 is a cross-sectional view of a lighting fixture 232 according to an embodiment of the present disclosure. Similar to the lighting fixture 154, the lighting fixture 232 comprises a light panel 160 (lens 166 and light strip 168) attached to a lens frame 234. Here, the lens frame 234 is adapted to mount directly to a surface, such as a wall, for example. The lighting fixture 232 may be mounted with screws, adhesive, or the like.

Figure 41:
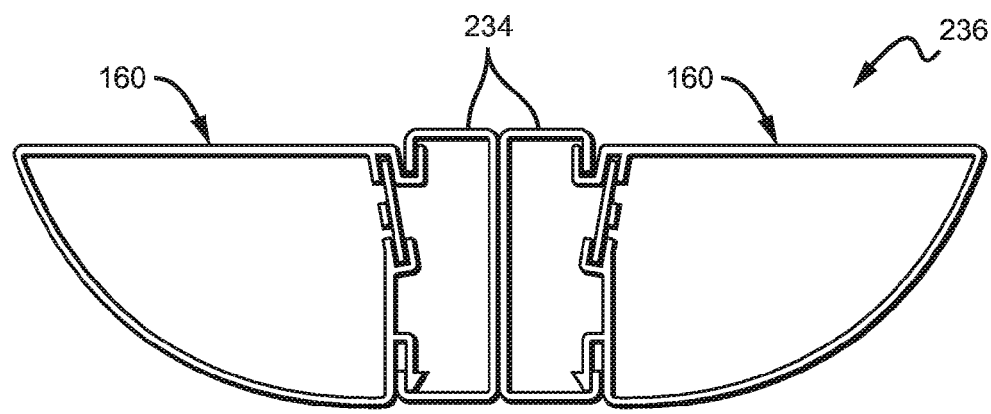
FIG. 41 illustrates a portion of a lighting fixture according to one embodiment of the present disclosure.

FIG. 41 is a cross-sectional view of a lighting fixture 236 according to an embodiment of the present disclosure. The housing 158 comprises two lens frames 234 mounted to one another in a back-to-back configuration such that the light panels 160 face in opposite directions. The top surfaces or the end surfaces of the lens frames 234 may be adapted to mount directly to a surface, or the lighting fixture 236 may be suspension-mounted or pendant-mounted, for example.

Figure 42:
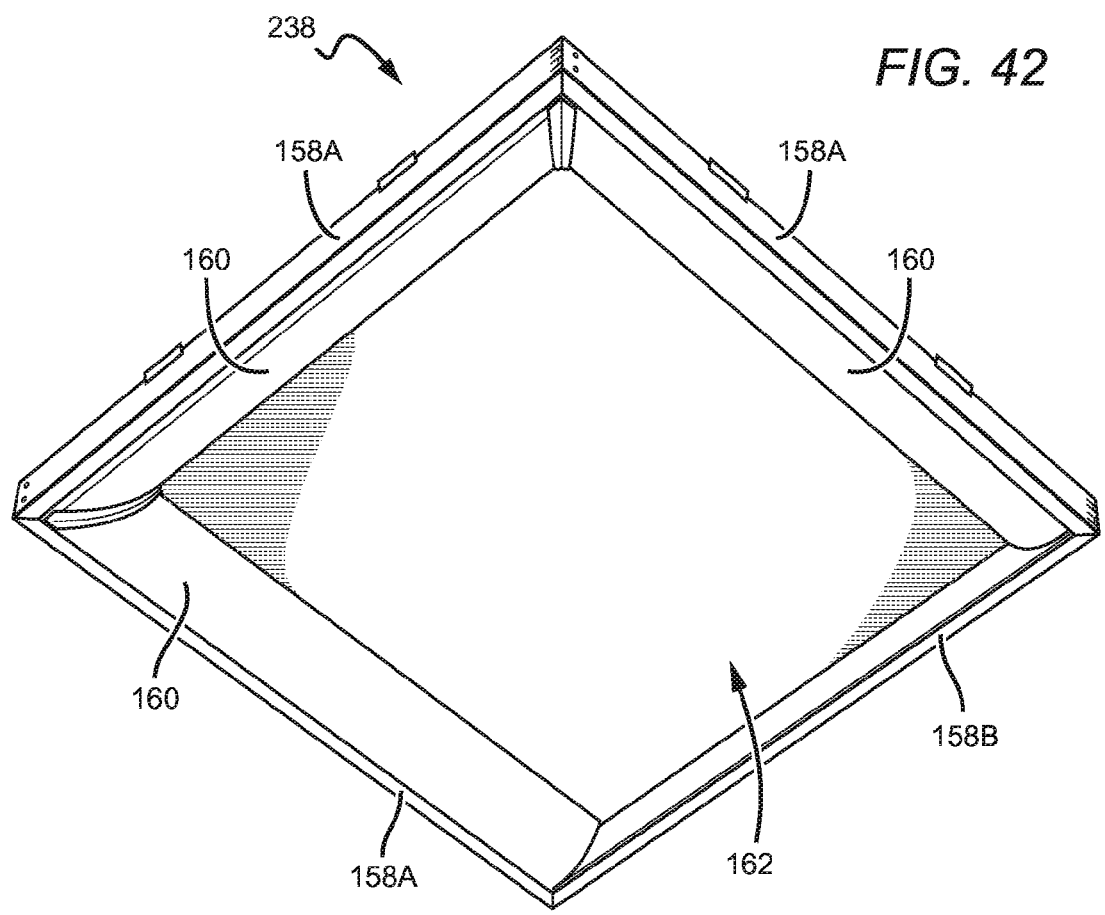
FIG. 42 illustrates a lighting fixture according to one embodiment of the present disclosure.

FIG. 42 is a perspective view of a lighting fixture 238 according to an embodiment of the present disclosure. The lighting fixture 238 is similar in many respects to the lighting fixture 154 and shares several common elements. This particular lighting fixture comprises light panels 160 on three sides of the lighting fixture 238 with each light panel 160 connected to a side frame 158A. The side frame 158B provides structure on the single side without a light panel.

Many additional variations are possible. For example, in another embodiment (not pictured), the entire lighting fixture comprises a light panel attached to a single lens frame, such that the lens frame is the only component of the housing. The housing 158 may sit in the horizontal portion of the T-grid or be attached to an external surface as described herein with respect to similar embodiments. Additionally, the lighting fixtures are not limited to a rectangular shape; the housing may be configured in many different shapes, including triangles and other polygons.

Figure 43:
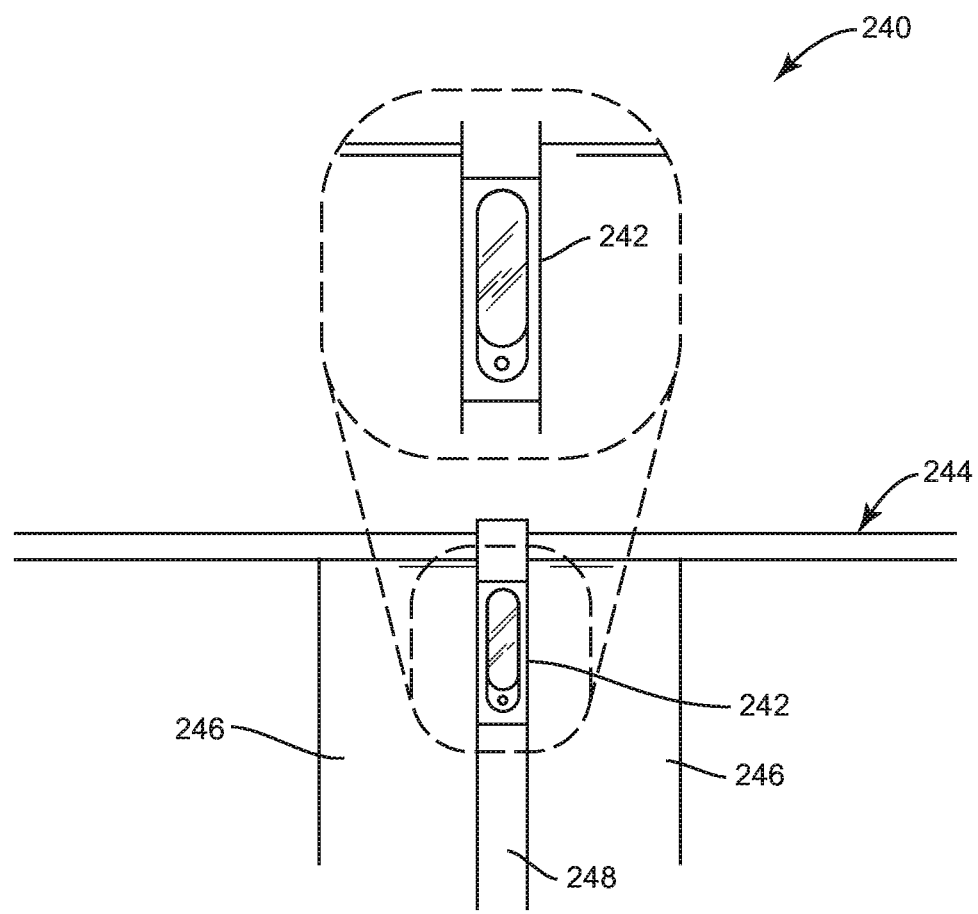
FIG. 43 illustrates a lighting fixture according to one embodiment of the present disclosure.

As discussed above, it may be desirable to add additional functionality to the lighting fixtures discussed above with respect to FIGS. 21 through 42. Accordingly, FIG. 43 illustrates a lighting fixture 240 including a sensor module 242 mounted thereon. Specifically, FIG. 43 shows the sensor module 242 mounted to a T-grid 244 of a drop-ceiling in which the lighting fixture 240 is provided. The lighting fixture 240 is similar to that shown above with respect to FIG. 38, including two lenses 246 joined by a central member 248 of the T-grid 244. In some embodiments, the central member 248 may be replaced with a customized member in order to better conceal the sensor module 242. In other embodiments, the sensor module 242 is configured to attach to (e.g., via a snap-fit mechanism, an adhesive mechanism, or any other suitable mechanism) the central member 248. As discussed above, the sensor module 242 may include sensors, processors, communications circuitry, or the like, which may be used to provide additional functionality in the lighting fixture 240. Accordingly, the core components of the lighting fixture 240 may be kept over time while upgrading the functionality of the lighting fixture.

Figure 44:
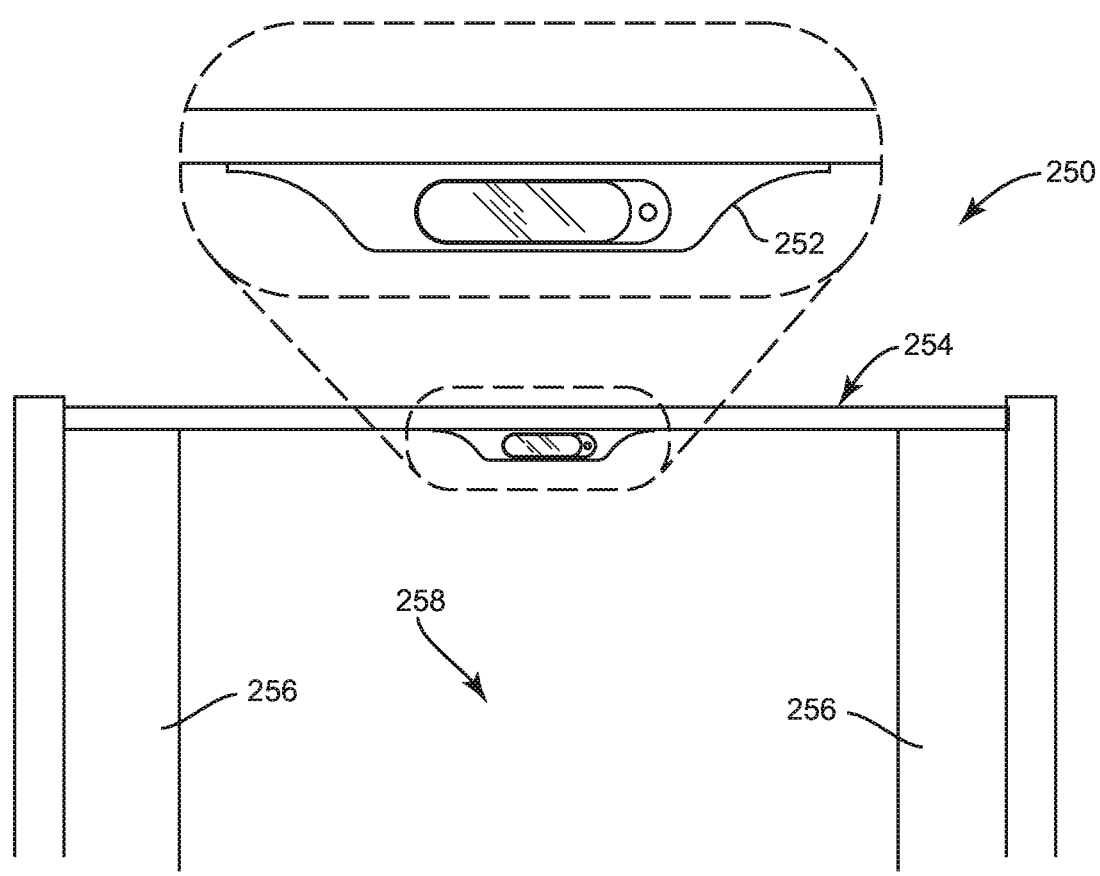
FIG. 44 illustrates a lighting fixture according to one embodiment of the present disclosure.

FIG. 44 shows a lighting fixture 250 including a sensor module 252 according to an additional embodiment of the present disclosure. Specifically, FIG. 44 shows the sensor module 252 mounted to a T-grid 254 of a drop-ceiling in which the lighting fixture 250 is provided. Instead of being mounted directly to the T-grid 254 as shown in FIG. 43, the sensor module 252 is mounted to a side of a particular member of the T-grid 254, such that the sensor module 252 does not obscure any portion of the T-grid 254, but rather is mounted directly adjacent thereto. The lighting fixture 250 is similar to that shown in FIG. 29, wherein two lenses 256 are located opposite one another and provide light towards an open central area 258.

Figure 45:
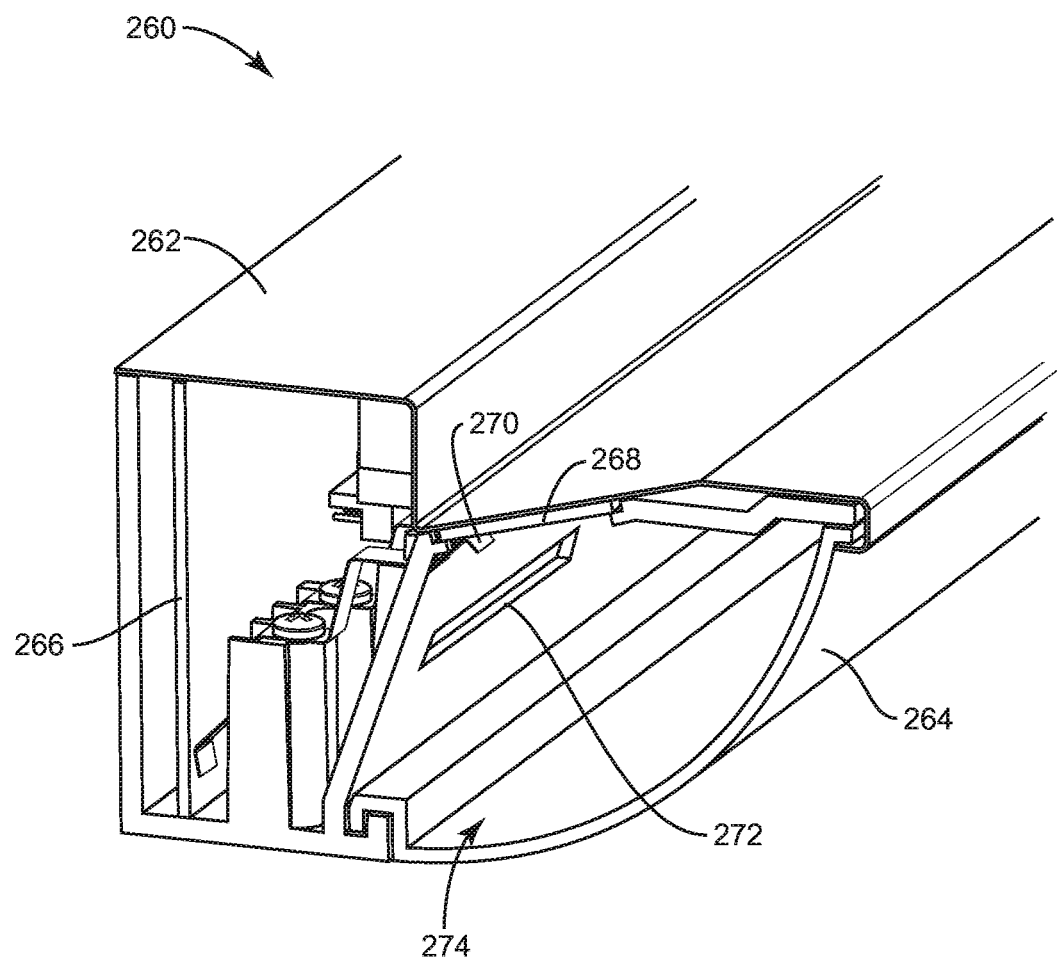
FIG. 45 illustrates a lighting fixture according to one embodiment of the present disclosure.

FIG. 45 is a cross-sectional view of a portion of a lighting fixture 260 according to an embodiment of the present disclosure. The lighting fixture 260 includes a side frame 262 and a lens 264. The side frame 262 houses a printed circuit board (PCB) 266, which may include driver circuitry or any other circuitry for providing the general functionality of the lighting fixture 260. An LED PCB 268 is shown clipped into a top portion of the side frame 262 such that a number of LEDs (not shown) are directed towards the lens 264. A number of LED PCB mounting clips 270 secure the LED PCB 268 in place. Notably, an upgrade slot 272 is located in the side frame 262 such that the upgrade slot 272 provides an opening between an enclosed interior optical cavity 274 and the interior portion of the side frame 262. While not shown, a connector on the PCB 266 may align with the upgrade slot 272 such that upgrade circuitry provided in the upgrade slot 272 connects directly to the PCB 266 for power and communication. Any number of components may be provided in the upgrade slot 272. For example, additional sensors, communications circuitry, processing circuitry, and the like may be provided in the upgrade slot 272. In the case of communications circuitry, the interior of the side frame 262 will generally interfere with wireless communications if it is formed of a metal. Accordingly, one or more antennas associated with the communications circuitry may remain in the enclosed interior optical cavity 274. Due to the placement of the upgrade slot 272, such a protruding antenna will generally not interfere with the light output from the LEDs in the lighting fixture 260.

Figure 46:
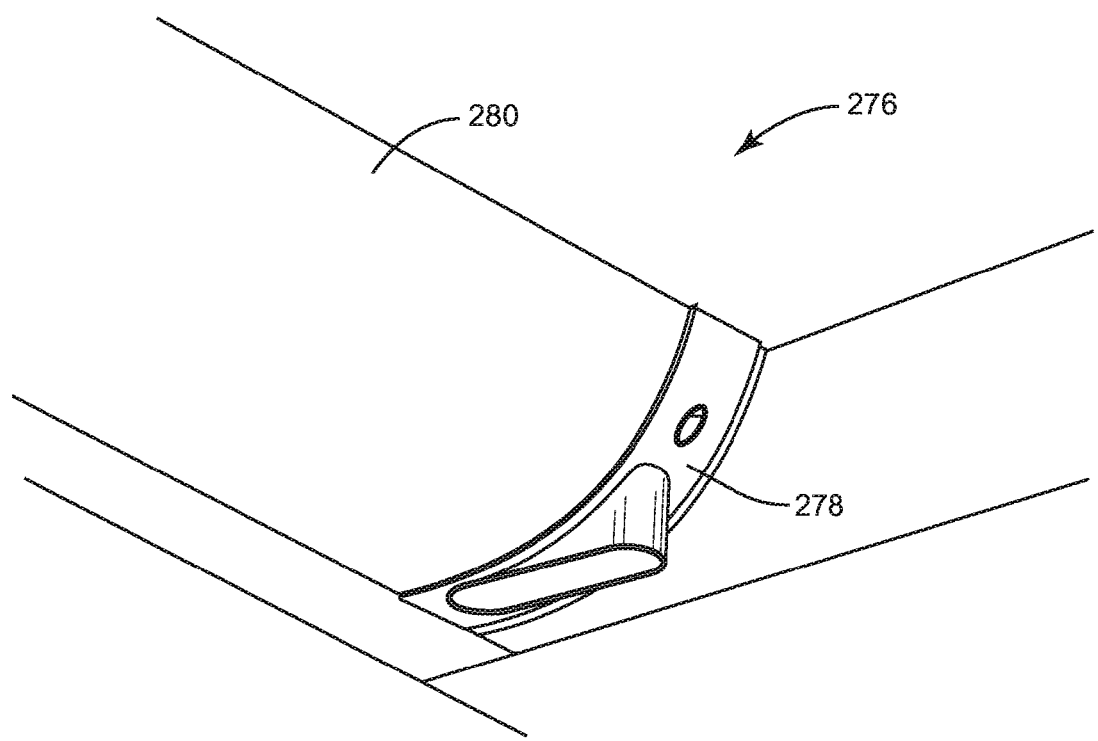
FIGS. 46 and 47 illustrate a lighting fixture according to one embodiment of the present disclosure.
Figure 47:
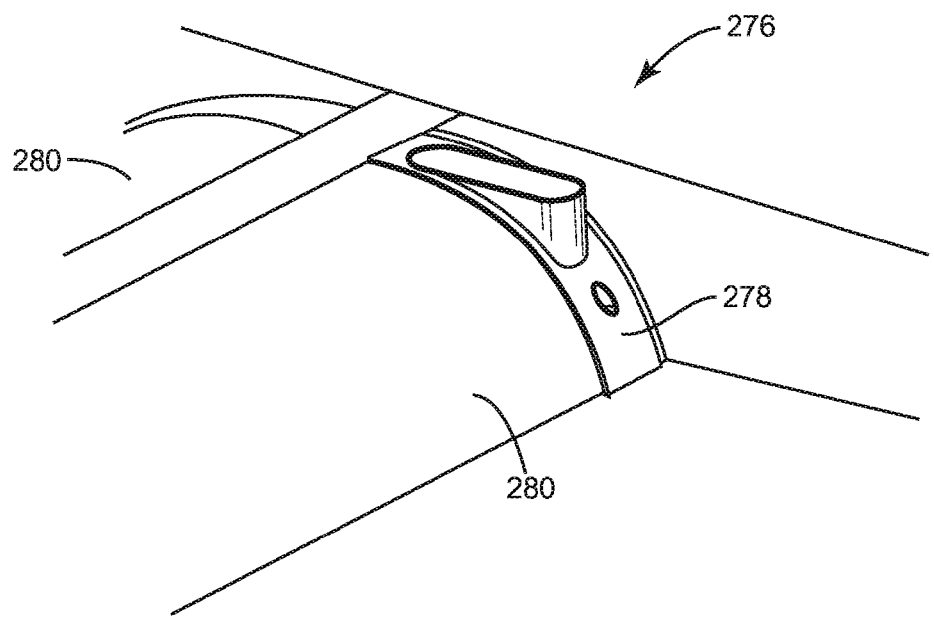

FIGS. 46 and 47 show a lighting fixture 276 including a sensor module 278 according to an embodiment of the present disclosure. Similar to the sensor module 20 described with respect to FIGS. 1A through 3C, the sensor module 278 shown in FIGS. 46 and 47 is contoured to a lens 280 of the lighting fixture 276. The sensor module 278 may connect to one or more internal components of the lighting fixture 276 via a connector similar to that shown in FIGS. 1C and 3C, or may use any other connection mechanism to electrically connect to the lighting fixture 276. If the sensor module 278 is not provided, a sensor module cover (not shown) may cover the place in which the sensor module 278 is shown so as to not disrupt the appearance of the lighting fixture 276.

Those skilled in the art will recognize improvements and modifications to the preferred embodiments of the present disclosure. All such improvements and modifications are considered within the scope of the concepts disclosed herein and the claims that follow.

What is claimed is:
1. A lighting fixture comprising:
an outer frame;
a lens coupled to the outer frame, the lens comprising a main lens portion and a removable sensor module cover;
a solid-state light source configured to provide a desired light output based on one or more drive signals, the solid-state light source coupled to the outer frame and at least partially surrounded by the lens such that at least a portion of the light provided from the light source is transmitted through the lens towards an area of interest;
driver circuitry coupled to the outer frame and configured to provide the one or more drive signals to the solid-state light source; and
a sensor module connector coupled to the outer frame under the removable sensor module cover such that when the removable sensor module cover is removed, the sensor module connector is exposed, wherein the sensor module connector is configured to mate with a connector from a sensor module in order to electrically couple the sensor module and the driver circuitry and the sensor module connector is located such that when the sensor module is installed in the lighting fixture, a surface of the sensor module is facing the area of interest.

2. The lighting fixture of claim 1 wherein the sensor module includes communications circuitry configured to communicate with one or more devices external to the lighting fixture.

3. The lighting fixture of claim 2 wherein the driver circuitry is configured to adjust the one or more drive signals provided to the solid-state light source based on signals provided from the communications circuitry.

4. The lighting fixture of claim 1 wherein the sensor module includes one or more environmental sensors, the environmental sensors comprising one or more of an ambient light sensor, an occupancy sensor, a microphone, a thermometer, a barometric pressure sensor, a camera, and an accelerometer.

5. The lighting fixture of claim 4 wherein at least one of the one or more environmental sensors is exposed through the surface of the sensor module facing the area of interest when the sensor module is installed in the lighting fixture.

6. The lighting fixture of claim 4 wherein the driver circuitry is configured to adjust the one or more drive signals provided to the solid-state light source based on signals provided from the one or more environmental sensors.

7. The lighting fixture of claim 1 wherein the sensor module includes an outer surface that is contoured to match an exterior surface of the lens when installed in the lighting fixture.

8. The lighting fixture of claim 1 wherein the lighting fixture is configured to be installed in a drop tile ceiling comprising a plurality of ceiling tiles supported by a T-grid.

9. The lighting fixture of claim 8 wherein one of the plurality of ceiling tiles forms an integral part of the lighting fixture.

10. The lighting fixture of claim 9 wherein the outer frame of the lighting fixture is supported by the T-grid of the drop tile ceiling.

11. The lighting fixture of claim 8 wherein one of the plurality of ceiling tiles is surrounded by the outer frame of the lighting fixture such that at least a portion of the ceiling tile is exposed through an opening in the outer frame.

12. The lighting fixture of claim 11 wherein light provided by the solid-state light source is at least partially reflected from the one of the plurality of ceiling tiles towards the area of interest.

13. The lighting fixture of claim 1 wherein the solid-state light source comprises a plurality of light emitting diodes (LEDs).

14. The lighting fixture of claim 1 wherein the sensor module includes an outer surface that is contoured to match an exterior surface of the lens when installed in the lighting fixture.

15. The lighting fixture of claim 14 wherein:
the exterior surface of the lens is rounded; and
the exterior surface of the lens faces the area of interest.

16. The lighting fixture of claim 1 wherein the sensor module connector is located such that the sensor module can be installed in the lighting fixture when the lighting fixture is mounted to a ceiling.

17. The lighting fixture of claim 1 wherein when the removable sensor module cover is installed in the lighting fixture, light from the solid-state light source is transmitted through the main lens portion and the removable sensor module cover towards the area of interest.

* * * * *